United States Patent
Saggar et al.

(10) Patent No.: US 11,924,784 B2
(45) Date of Patent: Mar. 5, 2024

(54) LEAN SYNCHRONIZATION SIGNAL TRANSMISSION

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 17/465,469

(22) Filed: Sep. 2, 2021

(65) Prior Publication Data

US 2022/0078735 A1 Mar. 10, 2022

Related U.S. Application Data

(60) Provisional application No. 63/075,721, filed on Sep. 8, 2020, provisional application No. 63/075,726, filed on Sep. 8, 2020.

(51) Int. Cl.
- *H04W 56/00* (2009.01)
- *H04L 5/00* (2006.01)
- *H04W 72/0446* (2023.01)

(52) U.S. Cl.
CPC ......... *H04W 56/0005* (2013.01); *H04L 5/005* (2013.01); *H04W 72/0446* (2013.01)

(58) Field of Classification Search
CPC .......... H04W 56/0005; H04W 72/0446; H04L 5/005; H04L 5/0087; H04L 27/2602; H04L 27/261; H04L 5/001; H04L 5/0012; H04L 5/0023; H04L 5/0048; H04L 5/0091; H04B 7/0632; H04B 7/0695

See application file for complete search history.

(56) References Cited

U.S. PATENT DOCUMENTS

| | | | |
|---|---|---|---|
| 2016/0142989 A1* | 5/2016 | Hashemi | H04W 72/23 370/350 |
| 2017/0332407 A1* | 11/2017 | Islam | H04W 52/42 |
| 2018/0091196 A1* | 3/2018 | Frenne | H04L 5/005 |
| 2018/0302182 A1* | 10/2018 | Ly | H04J 11/0076 |
| 2020/0404600 A1* | 12/2020 | Ly | H04L 1/1614 |
| 2022/0166569 A1* | 5/2022 | Lin | H04L 5/005 |
| 2022/0174651 A1* | 6/2022 | Seo | H04W 76/28 |
| 2022/0248356 A1* | 8/2022 | Landis | H04W 56/001 |
| 2023/0132414 A1* | 5/2023 | Shrestha | H04L 1/1822 370/329 |

* cited by examiner

*Primary Examiner* — Tejis Daya
(74) *Attorney, Agent, or Firm* — Sevan Savsa; Loza & Loza LLP

(57) ABSTRACT

Aspects of the disclosure relate to aperiodic transmission of one or more instances of at least one synchronization signal to a user equipment (UE). For example, the base station may allocate a plurality of time resources for aperiodic transmission of one or more instances of at least one synchronization signal different from a synchronization signal block transmitted by the base station. The base station may further transmit the aperiodic transmission of the one or more instances of the at least one synchronization signal to at least one UE using the plurality of time resources.

30 Claims, 31 Drawing Sheets

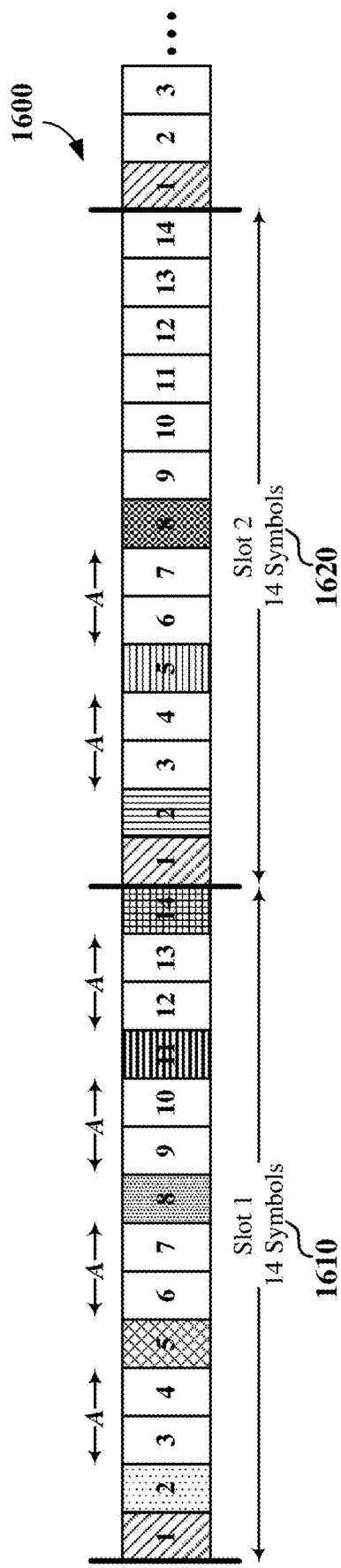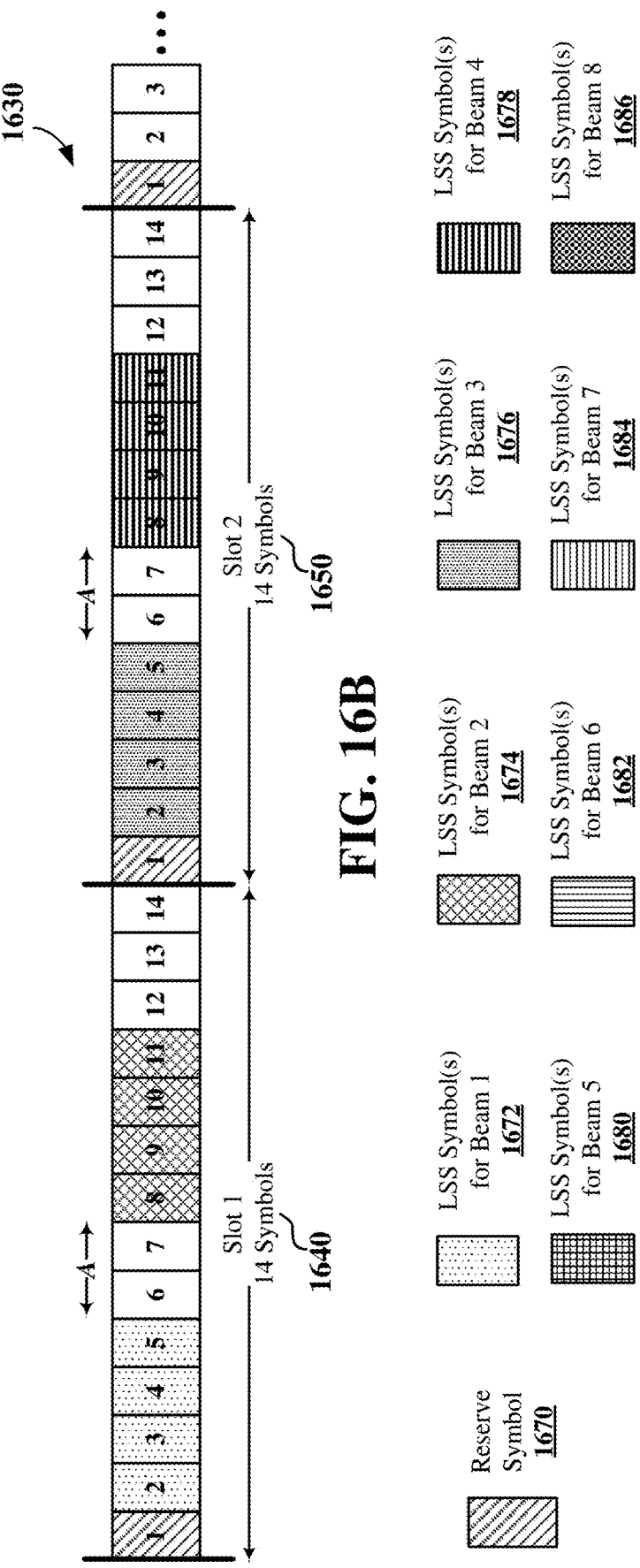
FIG. 16A
FIG. 16B

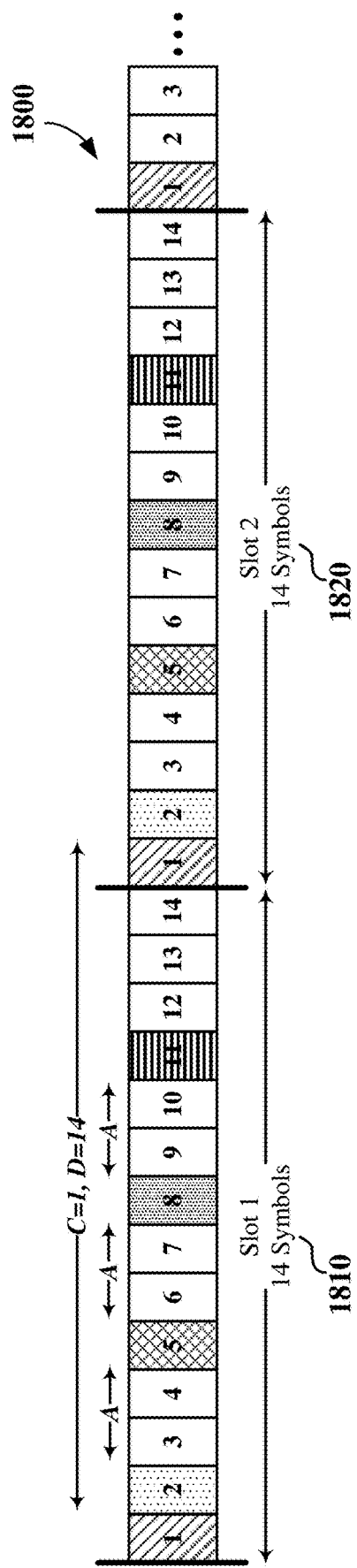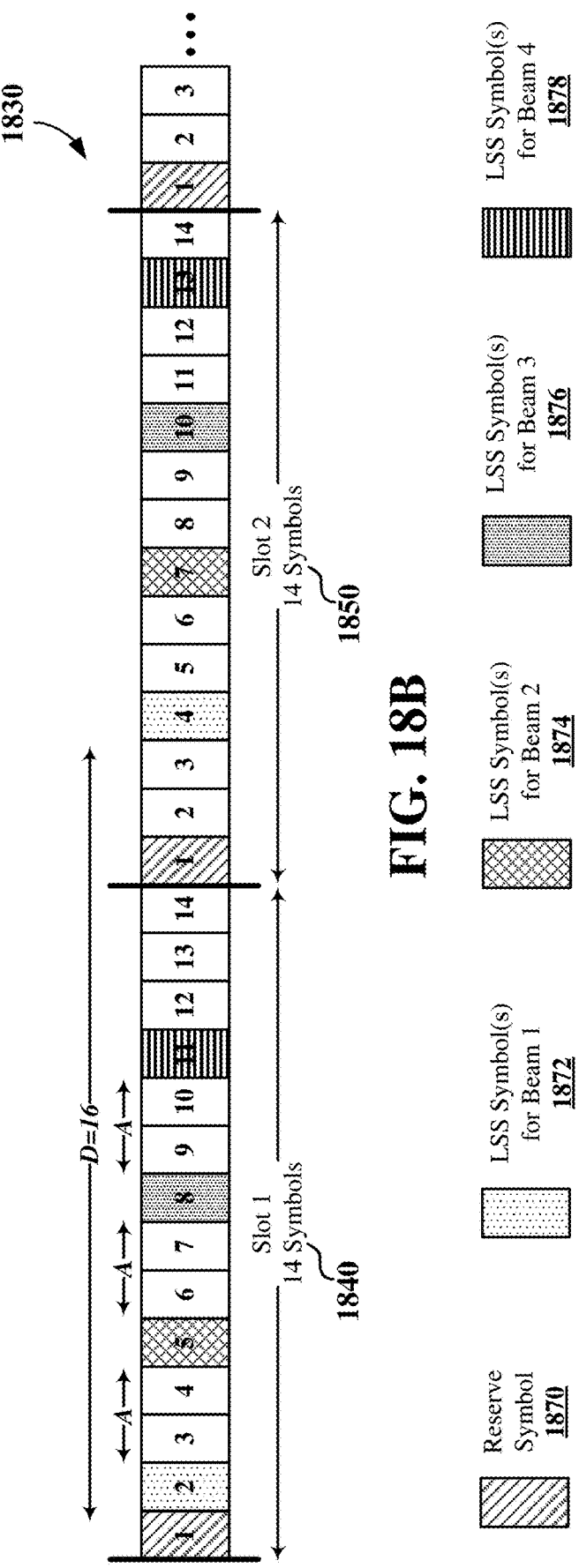

LEAN SYNCHRONIZATION SIGNAL TRANSMISSION

PRIORITY CLAIM

This application claims priority to and the benefit of provisional patent application No. 63/075,721 filed in the United States Patent & Trademark Office on Sep. 8, 2020 and provisional patent application No. 63/075,726 filed in the United States Patent & Trademark Office on Sep. 8, 2020, the entire contents of which are incorporated herein by reference as if fully set forth below in its entirety and for all applicable purposes.

TECHNICAL FIELD

The technology discussed below relates generally to wireless communication networks, and more particularly, to utilizing an aperiodic lean synchronization signal.

INTRODUCTION

In fifth generation (5G) wireless communication networks, such as the New Radio (NR) wireless communication network, a user equipment (UE) may perform a cell search to acquire time and frequency synchronization with the cell and to identify the physical cell identity (PCI) of the cell. The PCI may be carried in a primary synchronization signal (PSS) and secondary synchronization signal (SSS) of a synchronization signal block (SSB). The SSB, which includes the PSS, the SSS, may further include a physical broadcast control channel (PBCH).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a base station is disclosed. The method includes allocating a plurality of time resources for aperiodic transmission of one or more instances of at least one synchronization signal different from a synchronization signal block transmitted by the base station, and transmitting the aperiodic transmission of the one or more instances of the at least one synchronization signal to at least one user equipment (UE) using the plurality of time resources. In an aspect, a number of the plurality of time resources may correspond to a number of slots for transmitting the at least one synchronization signal. In an aspect, each of the at least one synchronization signal may occupy a respective symbol in the time resources.

In another example, a base station for wireless communication is disclosed. The base station may include at least one processor, a transceiver communicatively coupled to the at least one processor, and a memory communicatively coupled to the at least one processor. The at least one processor may be configured to allocate a plurality of time resources for aperiodic transmission of one or more instances of at least one synchronization signal different from a synchronization signal block transmitted by the base station, and transmit the aperiodic transmission of the one or more instances of the at least one synchronization signal to at least one UE using the plurality of time resources.

In another example, a non-transitory computer-readable storage medium having instructions for a base station thereon is disclosed. The instructions, when executed by a processing circuit, may cause the processing circuit to allocate a plurality of time resources for aperiodic transmission of one or more instances of at least one synchronization signal different from a synchronization signal block transmitted by the base station, and per transmit form the aperiodic transmission of the one or more instances of the at least one synchronization signal to at least one UE using the plurality of time resources.

In another example, a base station for wireless communication is disclosed. The base station may include means for allocating a plurality of time resources for aperiodic transmission of one or more instances of at least one synchronization signal different from a synchronization signal block transmitted by the base station, and means for transmitting the aperiodic transmission of the one or more instances of the at least one synchronization signal to at least one UE using the plurality of time resources.

In one example, a method of wireless communication by a UE is disclosed. The method includes receiving aperiodic transmission of one or more instances of at least one synchronization signal from a base station via a plurality of time resources, the at least one synchronization signal being different from a synchronization signal block transmitted by the base station, and communicating with the base station to manage a connection with the base station based at least in part on the received one or more instances of the synchronization signal. In an aspect, each of the at least one synchronization signal may occupy a respective symbol in the time resources.

In another example, a UE for wireless communication is disclosed. The UE may include at least one processor, a transceiver communicatively coupled to the at least one processor, and a memory communicatively coupled to the at least one processor. The at least one processor may be configured to receive aperiodic transmission of one or more instances of at least one synchronization signal from a base station via a plurality of time resources, the at least one synchronization signal being different from a synchronization signal block transmitted by the base station, and communicate with the base station to manage a connection with the base station based at least in part on the received one or more instances of the synchronization signal.

In another example, a non-transitory computer-readable storage medium having instructions for a UE thereon is disclosed. The instructions, when executed by a processing circuit, may cause the processing circuit to receive aperiodic transmission of one or more instances of at least one synchronization signal from a base station via a plurality of time resources, the at least one synchronization signal being different from a synchronization signal block transmitted by the base station, and communicate with the base station to manage a connection with the base station based at least in part on the received one or more instances of the synchronization signal.

In another example, a UE for wireless communication is disclosed. The UE may include means for receiving aperiodic transmission of one or more instances of at least one synchronization signal from a base station via a plurality of time resources, the at least one synchronization signal being different from a synchronization signal block transmitted by the base station, and means for communicating with the base station to manage a connection with the base station based at least in part on the received one or more instances of the synchronization signal.

In some examples, a method of wireless communication at a UE is disclosed, the method comprising: establishing a connection with a network based on a first synchronization signal and based at least in part on a capability of the UE; and transmitting a request for a second synchronization signal in response to at least one of a network condition or a communication condition, wherein the request for the second synchronization signal comprises configuration parameters based at least on part of the capability of the UE.

In some examples, a method of wireless communication at a base station, the method comprising: establishing a connection with a UE based on a first synchronization signal and based at least in part on a capability of the UE; receiving a request from the UE for a second synchronization signal based on at least one of a network condition or a communication condition, wherein the request for the second synchronization signal comprises configuration parameters based at least on part of the capability of the UE; and transmitting the second synchronization signal to the UE.

In some examples, a UE is disclosed, comprising: a transceiver; a memory; and a processor communicatively coupled to the transceiver and the memory, wherein the processor and the memory are configured to: establish a connection with a network based on a first synchronization signal and based at least in part on a capability of the UE; and transmit a request for a second synchronization signal in response to at least one of a network condition or a communication condition, wherein the request for the second synchronization signal comprises configuration parameters based at least on part of the capability of the UE.

In some examples, a base station is disclosed, comprising: a transceiver; a memory; and a processor communicatively coupled to the transceiver and the memory, wherein the processor and the memory are configured to: establish a connection with a UE based on a first synchronization signal and based at least in part on a capability of the UE; receive a request from the UE for a second synchronization signal based on at least one of a network condition or a communication condition, wherein the request for the second synchronization signal comprises configuration parameters based at least on part of the capability of the UE; and transmit the second synchronization signal to the UE.

In some examples, a UE is disclosed, comprising: means for establishing a connection with a network based on a first synchronization signal and based at least in part on a capability of the UE; and means for transmitting a request for a second synchronization signal in response to at least one of a network condition or a communication condition, wherein the request for the second synchronization signal comprises configuration parameters based at least on part of the capability of the UE.

In some examples, a base station is disclosed, comprising: means for establishing a connection with a UE based on a first synchronization signal and based at least in part on a capability of the UE; means for receiving a request from the UE for a second synchronization signal based on at least one of a network condition or a communication condition, wherein the request for the second synchronization signal comprises configuration parameters based at least on part of the capability of the UE; and means for transmitting the second synchronization signal to the UE.

In some examples, an article of manufacture for use by a UE, the article comprising a computer-readable medium having stored therein instructions executable by one or more processors of the user equipment to: establish a connection with a network based on a first synchronization signal and based at least in part on a capability of the UE; and transmit a request for a second synchronization signal in response to at least one of a network condition or a communication condition, wherein the request for the second synchronization signal comprises configuration parameters based at least on part of the capability of the UE.

In some examples, an article of manufacture for use by a base station, the article comprising a computer-readable medium having stored therein instructions executable by one or more processors of the user equipment to: establish a connection with a UE based on a first synchronization signal and based at least in part on a capability of the UE; and receive a request from the UE for a second synchronization signal based on at least one of a network condition or a communication condition, wherein the request for the second synchronization signal comprises configuration parameters based at least on part of the capability of the UE; and transmit the second synchronization signal to the UE.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 16A and 16B are example diagrams of a lean SS configuration that supports aperiodic lean synchronization signal transmission and an implementation of a timing offset between successive beam groups, according to aspects of the disclosure.

FIGS. 18A and 18B are example diagrams of a lean SS configuration that supports aperiodic lean synchronization signal transmission and an implementation of a timing offset and a time repetition offset, according to aspects of the disclosure.

DETAILED DESCRIPTION

Figure 1:
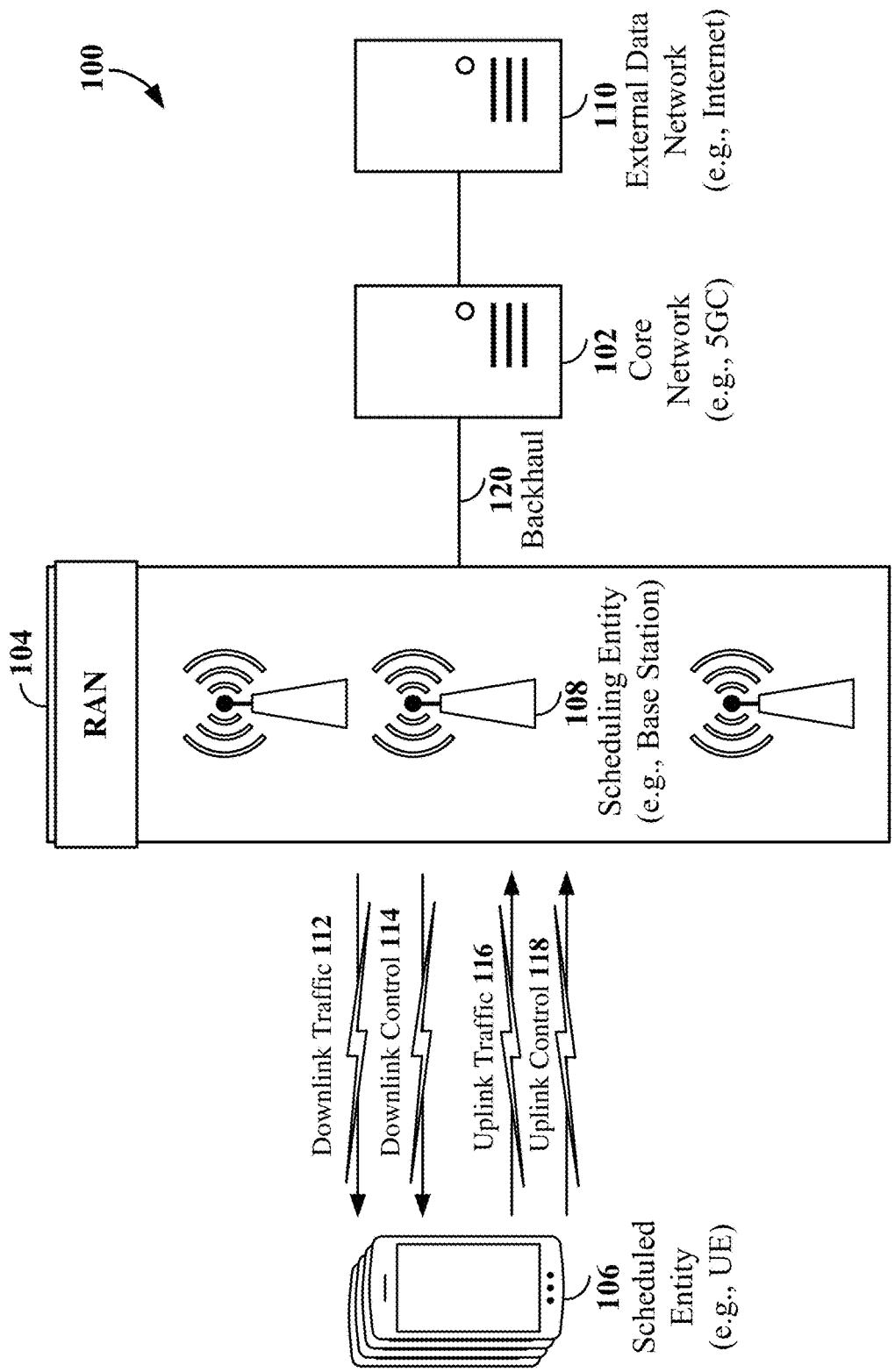
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure relate to aperiodic lean synchronization signal transmission. An aperiodic lean synchronization signal may utilize a reduced bandwidth and may be used to support beam management and/or time-frequency tracking functionality. The lean synchronization signal may consume less power and resources by utilizing a shorter operating bandwidth and/or fewer symbols in time than a synchronization signal block. Further, when one or more lean synchronization signals are aperiodically transmitted instead of being transmitted periodically, such an aperiodic transmission of the lean synchronization signals may further reduce consumptions of power and/or resources.

Some aspects of the disclosure relate to UE-requested transmission of a lean synchronization signal. For example, a UE may transmit to a base station a request for a lean synchronization signal in response to certain network and/or communication conditions. Subsequently, the base station may transmit to the UE a lean synchronization signal based on the request.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
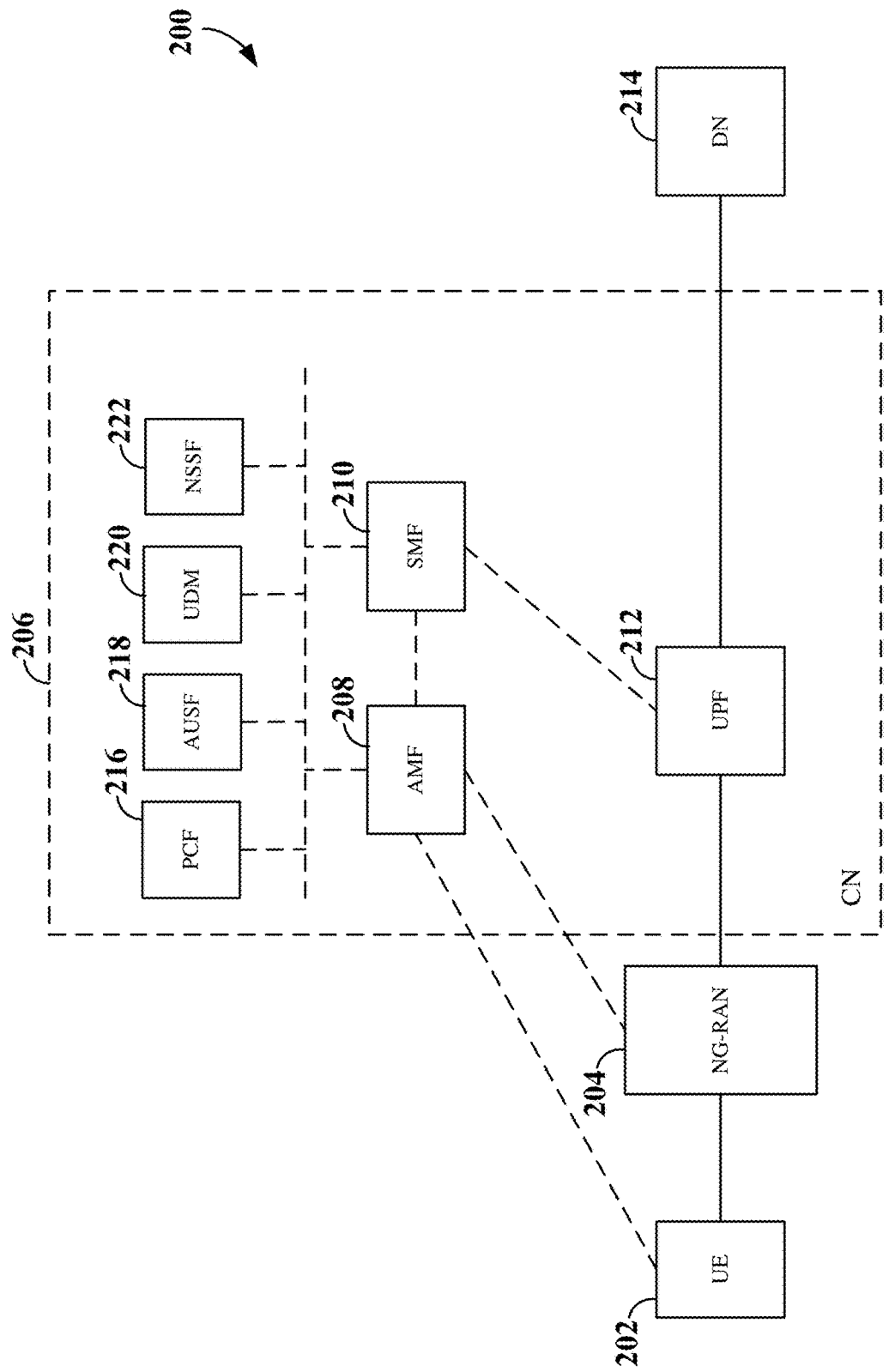
FIG. 2 is a block diagram illustrating an example of a 5G wireless communication system (5GS).

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a NR-RAN 204, and a core network 206. By virtue of the wireless communication system 200, the UE 202 may be enabled to carry out data communication with an external data network 214, such as (but not limited to) the Internet, Ethernet network, or a local area network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external data network (DN) 214). The UPF 212 provides user plane connectivity to route 5G (NR) packets to/from the UE 202 via the NR-RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NG-RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR-RAN 204, the UE 202 may transmit a registration request and PDU session establishment request to the 5G core network 206 via the NR-RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, internet protocol (IP) flows, Ethernet flows and unstructured data flows.

Figure 3:
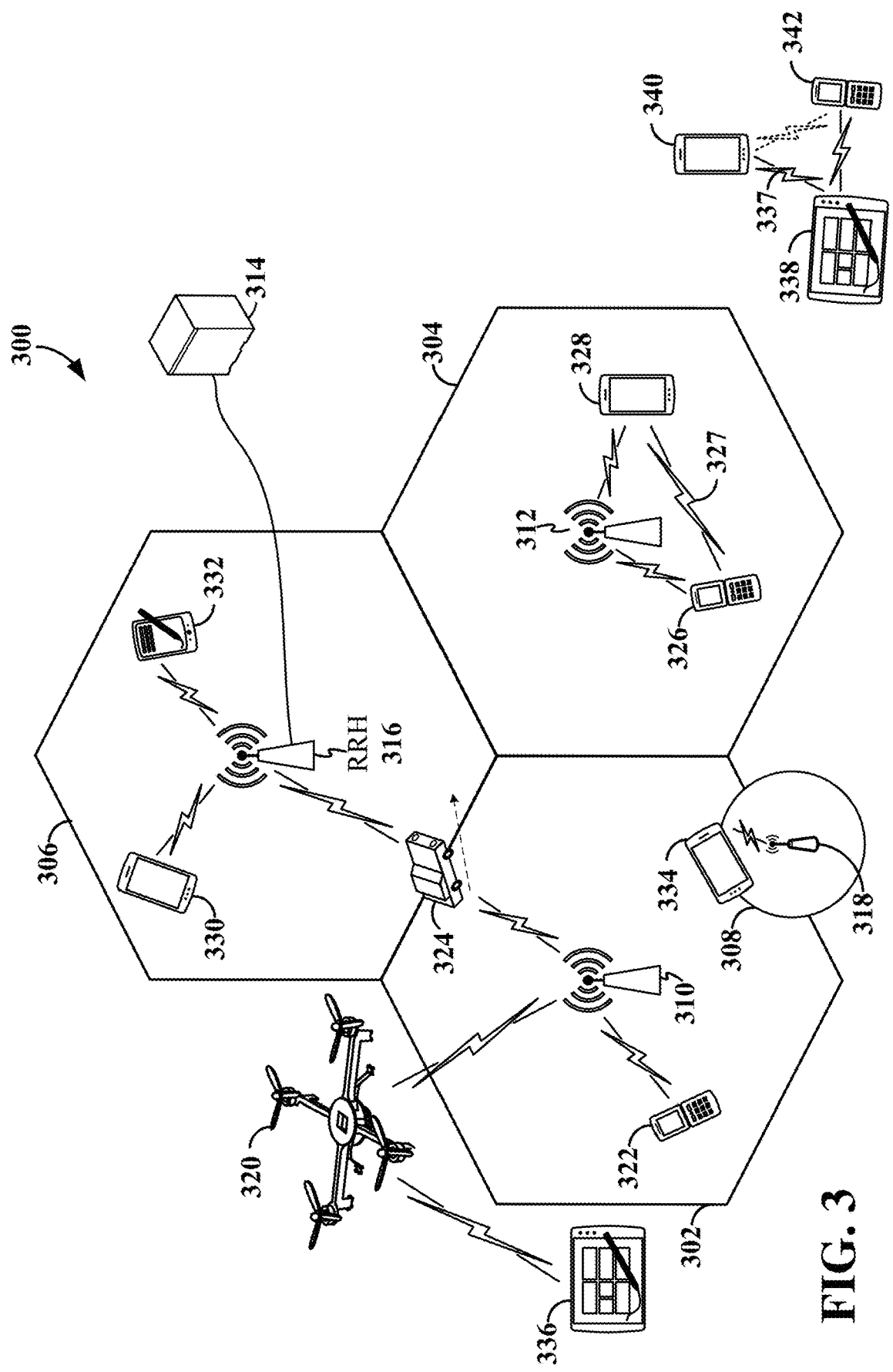
FIG. 3 is a conceptual illustration of an example of a radio access network according to some aspects.

Referring now to FIG. 3, as an illustrative example without limitation, a schematic illustration of a radio access network (RAN) 300 according to some aspects of the present disclosure is provided. In some examples, the RAN 300 may be the same as the RAN 104 described above and illustrated in FIG. 1.

The geographic region covered by the RAN 300 may be divided into a number of cellular regions (cells) that can be uniquely identified by a user equipment (UE) based on an identification broadcasted over a geographical area from one access point or base station. FIG. 3 illustrates cells 302, 304, 306, and 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 3, two base stations, base station 310 and base station 312 are shown in cells 302 and 304. A third base station, base station 314 is shown controlling a remote radio head (RRH) 316 in cell 306. That is, a base station can have an integrated antenna or can be connected to an antenna or RRH 316 by feeder cables. In the illustrated example, cells 302, 304, and 306 may be referred to as macrocells, as the base stations 310, 312, and 314 support cells having a large size. Further, a base station 318 is shown in the cell 308, which may overlap with one or more macrocells. In this example, the cell 308 may be referred to as a small cell (e.g., a microcell, picocell, femtocell, home base station, home Node B, home eNode B, etc.), as the base station 318 supports a cell having a relatively small size. Cell sizing can be done according to system design as well as component constraints.

It is to be understood that the RAN 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as or similar to the scheduling entity 108 described above and illustrated in FIG. 1.

FIG. 3 further includes an unmanned aerial vehicle (UAV) 320, which may be a drone or quadcopter. The UAV 320 may be configured to function as a base station, or more specifically as a mobile base station. That is, in some examples, a cell may not necessarily be stationary, and the geographic area of the cell may move according to the location of a mobile base station, such as the UAV 320.

Within the RAN 300, the cells may include UEs that may be in communication with one or more sectors of each cell. Further, each base station 310, 312, 314, 318, and 320 may be configured to provide an access point to a core network 102 (see FIG. 1) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as or similar to the UE/scheduled entity 106 described above and illustrated in FIG. 1. In some examples, the UAV 320 (e.g., the quadcopter) can be a mobile network node and may be configured to function as a UE. For example, the UAV 320 may operate within cell 302 by communicating with base station 310.

In a further aspect of the RAN 300, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 338, 340, and 342) may communicate with each other using sidelink signals 337 without relaying that communication through a base station. In some examples, the UEs 338, 340, and 342 may each function as a scheduling entity or transmitting sidelink device and/or a scheduled entity or a receiving sidelink device to schedule resources and communicate sidelink signals 337 therebetween without relying on scheduling or control information from a base station. In other examples, two or more UEs (e.g., UEs 326 and 328) within the coverage area of a base station (e.g., base station 312) may also communicate sidelink signals 327 over a direct link (sidelink) without conveying that communication through the base station 312. In this example, the base station 312 may allocate resources to the UEs 326 and 328 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 300, the ability of UEs to communicate while moving, independent of their location, is referred to as mobility. The various physical channels between the UE and the RAN 300 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 324 may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/316 may broadcast unified synchronization signals (e.g., unified Primary Synchronization Signals (PSSs), unified Secondary Synchronization Signals (SSSs) and unified Physical Broadcast Channels (PBCHs)). The UEs 322, 324, 326, 328, 330, and 332 may receive the unified synchronization signals, derive the carrier frequency, and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/316) within the RAN 300. Each of the cells may measure a strength of the pilot signal, and the radio access network (e.g., one or more of the base stations 310 and 314/316 and/or a central node within the core network) may determine a serving cell for the UE 324. As the UE 324 moves through the RAN 300, the RAN 300 may continue to monitor the uplink pilot signal transmitted by the UE 324. When the signal strength or quality of the pilot signal measured by a neighboring cell exceeds that of the signal strength or quality measured by the serving cell, the RAN 300 may handover the UE 324 from the serving cell to the neighboring cell, with or without informing the UE 324.

Although the synchronization signal transmitted by the base stations 310, 312, and 314/316 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 300 may utilize one or more multiplexing techniques and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 300 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
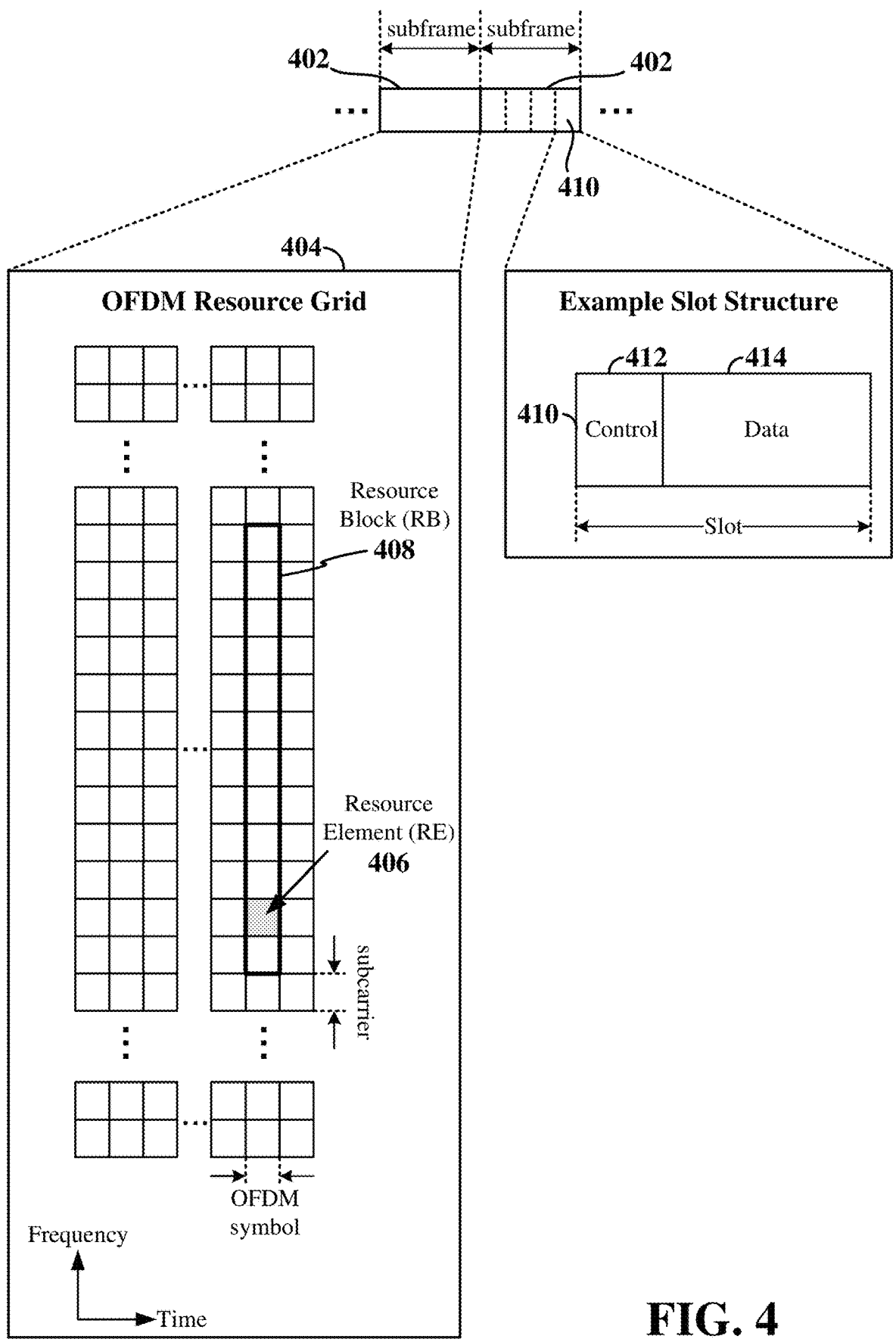
FIG. 4 is a diagram illustrating an example of a frame structure for use in a radio access network according to some aspects.

Referring now to FIG. 4, an expanded view of an exemplary subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, and/or FR5, or may be within the EHF band.

Figure 5:
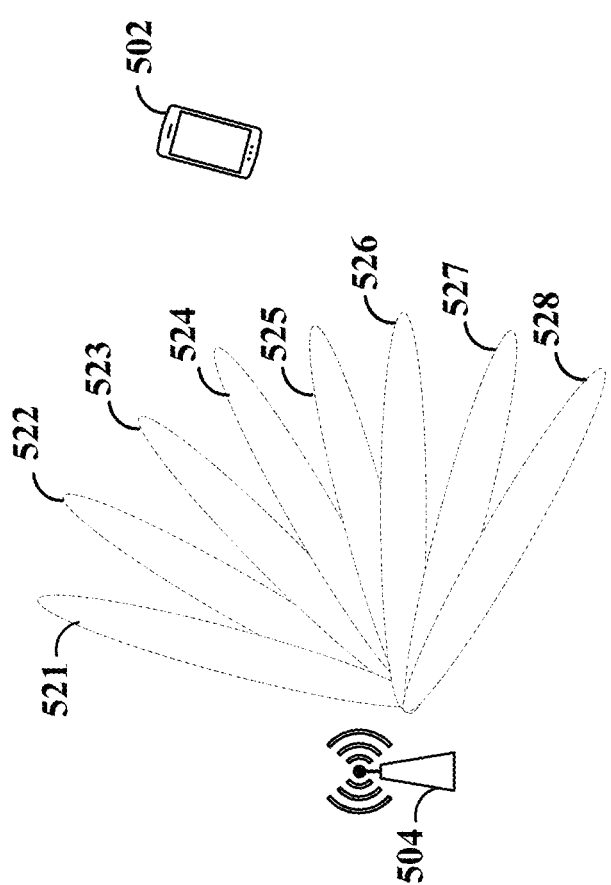
FIG. 5 is a diagram illustrating communication between a radio access network (RAN) node and a wireless communication device using downlink beamformed signals according to some aspects.

FIG. 5 is a diagram illustrating communication between a radio access network (RAN) node 504 and a wireless communication device 502 using downlink beamformed signals according to some aspects of the disclosure. The RAN node 504 may be any of the base stations or scheduling entities illustrated in FIGS. 1 and 2, and the wireless communication device 502 may be any of the UEs or scheduled entities illustrated in FIGS. 1 and 2, or illustrated in any of the embodiments discussed below. It should be noted that while some beams are illustrated as adjacent to one another, such an arrangement may be different in different aspects. In some examples, beams transmitted during a same symbol may not be adjacent to one another. In some examples, the RAN node 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the RAN node 504 may be configured to sweep or transmit each of the beams 521, 522, 523, 524, 525, 526, 527, 528 during a synchronization slot. For example, the RAN node 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)).

The wireless communication device 502 searches for and identifies the beams based on the beam reference signals. The wireless communication device 502 then performs beam measurements (e.g., RSRP, SINR, RSRQ, etc.) on the beam reference signals to determine the respective beam quality of each of the beams. In examples in which the wireless communication device 502 is in an RRC connected state, the wireless communication device 502 may generate and transmit a beam measurement report, including the respective beam index and beam measurement of each beam 521-528 to the RAN node 504. The RAN node 504 may then determine the downlink beam (e.g., beam 524) on which to transmit unicast downlink control information and/or user data traffic to the wireless communication device 502. In some examples, the selected downlink beam has the highest gain from the beam measurement report. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 504 may derive a downlink beam. Derivation of the downlink beam can be based on uplink measurements performed by the RAN node 504, such as by measuring the received power, quality, or other variable of a sounding reference signal (SRS) or other uplink reference signal transmitted by the wireless communication device 502. In some examples, the RAN node 504 may derive the downlink beam based on a combination of the beam measurement report and uplink measurements.

Figure 6:
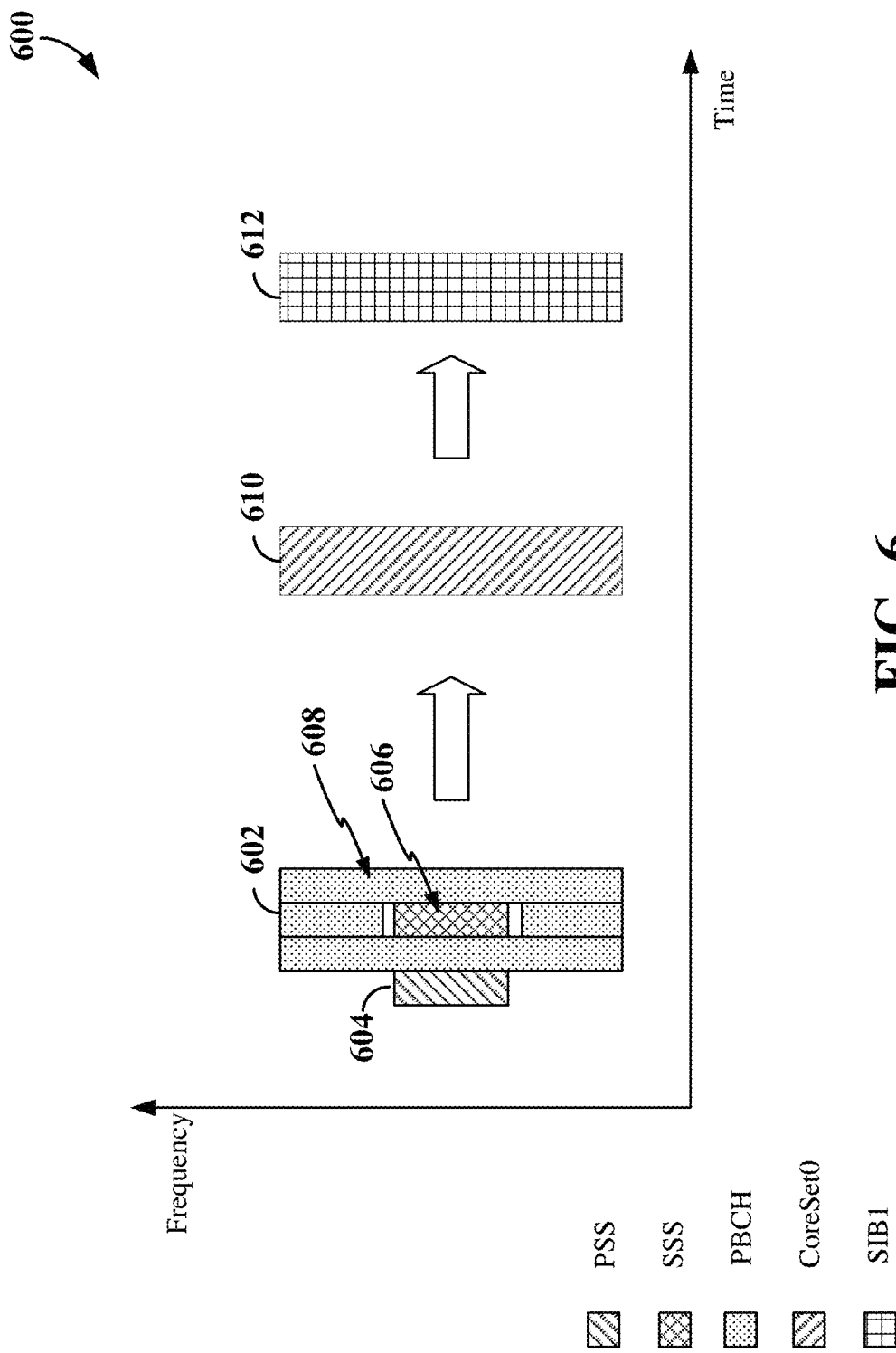
FIG. 6 is a diagram illustrating various broadcast information related to cell access according to some aspects.

FIG. 6 is a diagram illustrating various broadcast information 600 related to cell access according to some aspects. The broadcast information 600 may be transmitted by a RAN node (e.g., a base station, such as an eNB or gNB) on resources (e.g., time-frequency resources) allocated for the transmission of the broadcast information 600 in a cell. The broadcast information 600 includes an acquisition signal 602 that includes cell identifying information. In some examples, the acquisition signal 602 may include a synchronization signal block (SSB). The SSB 602 may be transmitted within, for example, the first four OFDM symbols (e.g., within a control region) of a slot in the time domain and over 20 PRBs in the frequency domain. In addition, the SSB 602 may have a periodicity of, for example, 20 ms or other suitable periodicity. In the example shown in FIG. 6, the broadcast information 600 may further include a CORESET0 610 and a SIB1 612.

The SSB 602 may include a PSS 604, a SSS 606, and a PBCH 608. The PSS 604 may include a PSS sequence selected from a set of PSS sequences. In addition, the SSS 606 may include a SSS sequence selected from a set of SSS sequences. In some examples, the PSS/SSS sequences identify the PCI (e.g., the PCI of the cell within which the SSB 602 is transmitted). In some examples, the cell identifying information may include the PCI.

The PBCH 608 includes the MIB carrying various system information (SI) including, for example, a cell barred indication, the subcarrier spacing, the system frame number, and scheduling information for the CORESET0 610. For example, the PBCH 608 may include scheduling information indicating time-frequency resources allocated for the COERSET0 610. In some examples, the CORESET0 610 may be transmitted within the first four symbols (e.g., within a control region) of a slot. In addition, the CORESET0 610 carries a PDCCH with DCI that contains scheduling information for scheduling the SIB1 612. The SIB1 612 is carried within a physical downlink shared channel (PDSCH) within a data region of a slot. In addition, the SIB1 612 contains remaining minimum system information (SI), including, for example, a set of radio resource parameters providing network identification and configuration. For example, the set of radio resource parameters may include a bandwidth (e.g., number of BWPs) on which a UE may communicate with a base station.

A reduced capability (e.g., RedCap) device may operate with a reduced power, a reduced bandwidth, and/or reduced complexity. For example, the reduced capability devices may be simpler devices and may not be moved frequently. For example, a reduced capability device may be an industrial sensor, a video surveillance device, a wearable device such as a blood pressure monitor, etc. Hence, for reduced capability devices, a synchronization signal that requires less bandwidth and resources than the SSB may be desired. According to an aspect of a disclosure, a lean synchronization signal (SS) that utilizes a reduced bandwidth may be generated and transmitted by the base station, e.g., to support beam management and/or time-frequency tracking functionality, especially for reduced capability devices. The lean SS may consume less power and resources by utilizing a shorter operating bandwidth than the SSB.

The lean SS may support narrow bandwidth part (NBWP) configurations for reduced capability devices. For example, the lean SS may include 12 resource blocks, unlike the SSB that may include 20 resource blocks. As such, a base station may perform a beam sweep using lean SSs in a NBWP, and reduced capability devices may use the lean SSs for beam management purposes. The techniques described herein may further provide for beam grouping for the lean SSs, lean SS repetition, beam management enabled via the lean SSs, and other suitable purposes.

Further, for example, a lean SS may include a synchronization signal (e.g., the PSS or the SSS) within a single symbol, while the SSB may occupy four symbols. As such, lean SSs may make available more symbols in the time domain to provide for synchronization signal repetition (e.g., in case of coverage recovery), more beams for finer beam sweeping granularity (e.g., as lean SSs may allow for narrower beams, better coverage, etc.), more symbols for other channels (e.g., such as for physical downlink shared channel (PDSCH) data), etc. than the SSB. Further, the lean SS and its configuration may maintain compatibility with other devices (e.g., with traditional or full capability devices) and may minimize any physical layer (e.g., L1) disruptions or changes in existing wireless communication systems.

Figure 7:
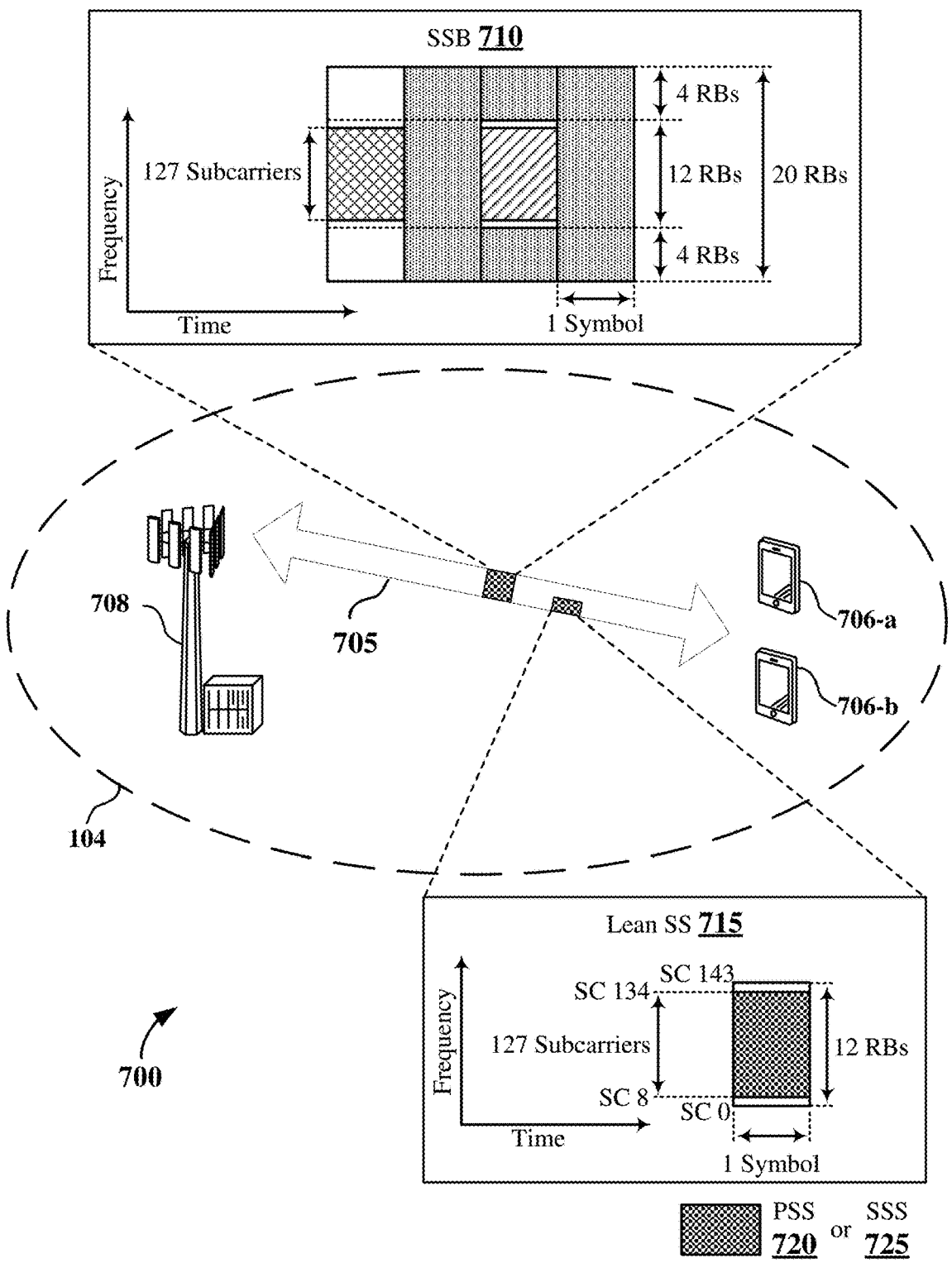
FIG. 7 illustrates an example of a wireless communication system that supports lean synchronization signal (SS) design in accordance with aspects of the disclosure.

FIG. 7 illustrates an example of a wireless communication system 700 that supports lean synchronization signal design in accordance with aspects of the disclosure. In some examples, wireless communication system 700 may implement aspects of wireless communication system 100. Wireless communication system 700 may include a base station 708, a UE 706-a, and a UE 706-b, which may be examples of the base station 708 and the UEs 706, respectively, as described herein. The base station 708, the UE 706-a, and the UE 706-b may be configured to use lean SSs 715 in accordance with the techniques described herein. In some examples, the base station 708 may correspond to any of the base stations or scheduling entities illustrated in FIGS. 1, 2, 3, and/or 5, and the UE(s) 706 may correspond to any of the UEs or scheduled entities illustrated in FIGS. 1, 2, 3, and/or 5.

In some examples, the base station 708 may be an NR base station communicating via link 705 with the UEs 706-a and 706-b within coverage area 704. In some cases, the base station 708 may transmit a SSB 710 (e.g., a generic SSB 710 via a BWP). SSB 710 may be used by a UE 706 to synchronize with a cell (e.g., base station 708). The y-axis of SSB 710 may show frequency while the x-axis shows time. The SSB 710 may include four OFDM symbols (symbol periods). The first symbol may include a PSS 720. In some examples, the PSS 720 may occupy 127 subcarriers. The second and fourth symbols may include a PBCH 730, which may each span the 50 RBs. The third symbol may include SSS 725, which may occupy 127 subcarriers, in between two portions of PBCH 730, each portion spanning 4 RBs. For example, a UE 706 may receive a PSS 720 in a first symbol period of SSB 710 and may identify the SSB 710 based on detection (e.g., peak correlation) of the PSS 720. Accordingly, the UE 706 may proceed to decode the PBCH 730 and SSS 725 of the SSB 710.

In some cases, SSB 710 may be a cell defining SSB. For example, within the frequency span of a carrier, multiple SSBs 710 may be transmitted by the base station 708 to UEs 706. The Physical Cell Identifiers (PCIs) of SSBs 710 transmitted in different frequency locations may not necessarily be unique to the cell. Thus, the PCIs may not be the same, and different SSBs in the frequency domain may have different PCIs. When an SSB 710 is associated with minimum system information (MSI), the SSB may correspond to an individual cell, which may have a unique NR Cell Global Identifier (NCGI). Such an SSB 710 with the unique NCGI may be referred to as a cell-defining SSB. In some cases, cell selection and/or reselection, by a UE 706, may be based on one or more reference signal receive power (RSRP) or reference signal receive quality (RSRQ) measurements of the cell-defining SSB. In some examples, after a UE 706 receives the SSB 710, the UE 706 may decode the SSB 710 to identify the MIB. The MIB may indicate the CORESET and synchronization signal configuration, which may allow the UE 706 to receive and decode the PDCCH. The PDCCH may indicate the PDSCH to the UE 706, which may include the SIB that includes the RMSI.

Further, in some cases, wireless communication system 700 may utilize SSBs 710 to establish and/or maintain synchronization and beam management between base station 708 and UEs 706. For example, SSBs 710 may be used for time/frequency tracking at a UE 706 to allow for time tracking loops and/or frequency tracking loops to be maintained by the UE 706. In other words, a UE 706 may utilize SSBs 710 for beam management procedures, which may include, for example, the UE 706 updating a beam configuration for any downlink resources (e.g., such as one or more updates to time tracking parameters in a time tracking loop, one or more updates to frequency tracking parameters in a frequency tracking loop, etc.). In some cases, updating a beam configuration may include updating from a first set of beams for transmission and reception to a second set of beams for improved transmission and reception. SSBs 710 may be used, in some cases, for time/frequency tracking for a particular bandwidth (or BWP), to measure a delay spread, a delay offset, a power delay profile, a Doppler spread, a Doppler offset, timing information, frequency offset information, receive spatial filtering, etc.

In some cases, a first type of UE, such as a reduced capability UE 706-b (e.g., a low tier UE 706-b, an NR-Light UE 706-b, etc.) may include lower UE capabilities compared to a second type of UE, such as a generic UE 706-a (e.g., a full capability UE 706-a, a premium UE 706-a, etc.). As discussed herein, lean SSs 715 may reduce SSB bandwidth (e.g., compared to SSBs 710) and support beam management functionality for reduced capability UEs (e.g., such as for reduced capability UE 706-b). Lean SSs 715 may provide for reduced bandwidth and lower computational complexity (e.g., and thus reduced power consumption) for a reduced capability UE 706-b, as reduced capability UE 706-b may be configured with a NBWP and may not be configured to decode the larger spanning bandwidth (e.g., 20 resource blocks) associated with SSBs 710.

Lean SSs 715 may be an example of one or more instances of a synchronization signal received by the UE 706. For example, lean SSs 715 may include a synchronization signal over a reduced bandwidth (e.g., compared to SSBs 710). For example, leans SSBs may include a synchronization signal spanning 127 subcarriers in frequency and a single symbol in time (e.g., the y-axis of SSB 715 may show frequency while the x-axis shows time). The synchronization signal may include a PSS 720 or SSS 725 such that lean SSs 715 may be used for beam management and/or time-frequency tracking purposes by reduced capability UEs (e.g., UE 706-b) as described herein. For example, during beam adjustments or beam maintenance (e.g., beam management procedures), the PBCH may be unnecessary, and since a UE 706 may already know the PCI and may already be time aligned with the network, using both PSS 720 and SSS 725 may also not be necessary. As such, lean SSs 715 may include one of PSS 720 or SSS 725 (e.g., instead of including both PSS 720 and SSS 725). In other words, lean SSs 715 may exclude PBCH 730 typically included in SSBs 710 (e.g., which may reduce the bandwidth of lean SSs 715 from 20 resource blocks (RBs) associated with SSBs 710 down to 12 RBs). For instance, excluding the PBCH 730 from a lean SS 715 may leave 12 RBs which may be the same as PSS 720 or SSS 725. As such, lean SSs 715 may include either PSS 720 or SSS 725, as PSS 720 and SSS 725 have similar design (e.g., length-127 M-sequence) and either can be used for the purpose of beam management.

Further, as lean SSs 715 may include PSS 720 or SSS 725 (e.g., with the other of the PSS 720 or SSS 725 and the PBCH excluded), lean SSs 715 may span one symbol in the time domain. In some cases, wireless communication system 700 may maintain time continuity between SSBs 710 and lean SSs 715. As such, more symbols in time may be available when utilizing lean SSs 715 (e.g., as there may be three remaining symbols, in addition to the single symbol of the lean SS 715, for time continuity with the four symbols of a SSB 710). The additional available symbols in time (e.g., the three additional symbols) may be utilized for synchronization signal repetition (e.g., in case of coverage recovery). Additionally or alternatively, the additional available symbols in time may be utilized for more beams to sweep (e.g., may allow for narrower beams and possibly improved coverage). Additionally or alternatively, the additional available symbols in time may be utilized for more symbols for other channels (e.g., the additional symbols may include PDSCH).

The techniques described herein may avoid ambiguity between SSBs 710 and lean SSs 715. For example, generic UEs (e.g., legacy UEs, such as UE 706-*a*) may not detect lean SSs 715 (e.g., generic UEs 706 may not detect peak correlations due to lean SSs 715, which may otherwise result in generic UE 706 detection of the lean SS 715). For instance, center frequencies for lean SSs 715 may not coincide with an SSB 710 synchronization raster, or the PSS 720 associated with lean SSs 715 may use different M-sequence parameters to generate the PSS 720 of a lean SS 715, etc.

As discussed, in some examples, center frequencies for lean SSs 715 may not coincide with the SSB 710 synchronization raster. In some cases, lean SSs 715 may use different M-sequence parameters to generate the lean SS 715 in a NBWP with some mapping to the original SSB 710. For example, in some cases, lean SSs 715 may use different M-sequence parameters to generate a PSS 720 (e.g., of a lean SS 715) in a NBWP with some mapping to the original PSS 720 (e.g., of a SSB 710). For example, $N_{ID_{NB\text{-}BWP}}^{(2)} = N_{ID}^{(2)} + \delta$ (e.g., where $\delta \geq 3$ may be preconfigured by the wireless communication system or may be signaled from base station 708 to UEs 706). For example, the M-sequence parameters to generate a PSS 720 (e.g., for SSBs 710) may include a cell identity within the group ($N_{ID}^{(2)}$), and the M-sequence parameter to generate the PSS 720 for a lean SS 715 may include a cell identity within the group for the NBWP ($N_{ID_{NB\text{-}BWP}}^{(2)}$) which may be some offset $\delta$ from $N_{ID}^{(2)}$.

In some cases, lean SSs 715 may include only the SSS 725 (e.g., such that generic UEs 706 may not detect a PSS 720 and thus may not detect lean SSs 715, however reduced capability UE 706-*b* may be configured to detect the SSS 725 of lean SSs 715). For instance, in examples where lean SSs 715 include only the SSS 725, confusion for UEs 706 performing initial access procedures and generic UEs 706 may be avoided (e.g., as UEs 706 may not be aware that a PSS 720 may not have an associated SSS 725 and PBCH 730 with it). Additionally or alternatively, center frequency offset techniques, M-sequence parameter offset techniques, etc. may be implemented to mitigate undesired detection (e.g., peak correlation detections) of lean SSs 715 in scenarios where such detection may degrade system performance.

For example, during initial acquisition, UEs 706 may search for PSS sequences (e.g., PSS 720) first and then the SSS 725. According to the techniques described herein, UEs 706 doing initial access (e.g., reduced capability UEs 706 doing initial access), and generic UEs 706 in general, may not increase their probability of finding peak correlations within NBWP regions. In some cases, NBWP center frequency adjustments/restrictions, synchronization signal sequence changes (e.g., lean SS M-sequence changes), etc. may be used for lean SS 715 designs including PSS 720 and for lean SS 715 designs including SSS 725. In some cases, lean SS 715 designs including SSS 725 may not necessarily use NBWP center frequency adjustments/restrictions, synchronization signal sequence changes (e.g., lean SS M-sequence changes), etc., as lean SSs 715 including SSS 725 may not result in ambiguity potentially arising from detection of PSS 720 within a NBWP.

If UE 706-*a* is a generic or regular capability UE 706 and a lean SS 715 is associated with reduced capability UEs 706, then UE 706-*a* may not monitor for (e.g., may not detect peak PSS correlation for) the lean SS 715 (e.g., such that lean SSs 715 may be compatible with other UEs 706 such as UE 706-*a*). If UE 706-*b* is a reduced capability or low tier UE 706, the UE 706-*b* may proceed with the synchronization and decoding of the lean SS 715 based on the configuration of the lean SS (e.g., and the NBWP).

For example, for some wireless communication systems (e.g., frequency range 2 (FR2) systems), start symbols for SSBs 710 may be configured such that SSBs 710 may be repeated (e.g., 64 times) where, in some cases, different beams may be used by the base station 708 to beam sweep the SSBs 710. For instance for a 120 kHz subcarrier spacing (SCS) in a FR2 system, the SSB symbol start may be configured as: {4, 8, 16, 20}+28*n, where n=0, 1, 2, 3, 5, 6, 7, 8, 10, 11, 12, 13, 15, 16, 17, 18. Such may result in SSB 710 being repeated 64 times, where each SSB 710 may be associated with a different beam.

As discussed herein, lean SSs 715 may maintain the 12 RB structure (e.g., in the frequency domain) with gaps on either side of the synchronization signal (e.g., on either side of the PSS 720 or SSS 725). That is, lean SSs 715 may include 12 RBs, where the center 127 subcarriers are used for PSS 720 or SSS 725 and the gaps on either side (e.g., subcarrier (SC) 0 though SC7 and SC135 through SC143) may be set to zero (0). In the time domain (e.g., to reduce or minimize impact on other non-SSB channels), the symbol start times and symbols reserve/gaps may be maintained across SSBs 710 and lean SSs 715.

As lean SSs 715 may include a single symbol for the synchronization signal, the remaining three symbols (e.g., in total corresponding in time with four symbols of SSBs 710) may be used advantageously by the wireless communication system 700. For example, wireless communication system 700 may configure synchronization signal repetitions per beam (e.g., the synchronization signal may be repeated up to four times across the four symbols, for enhanced coverage of up to, for example, 6 dB improvement). Additionally or alternatively, wireless communication system 700 may configure an increased number of beams, as NBWPs may support narrower beams for enhanced coverage (e.g., up to 64×4=256 beams may be supported due to the lean SS 715 and the four symbol durations). Additionally or alternatively, wireless communication system 700 may configure other data or information that may be communicated in the additional three symbols (e.g., wireless communication system 700 may configure PDSCH transmission in one or more of the additional three symbols).

In some cases, the base station 708 may configure and signal downlink reference signal resources to UEs 706 with transmission configuration indicator (TCI) states. In some examples, TCI states may indicate a quasi-co-location (QCL) relationship for a downlink transmission (e.g., PDCCH and PDSCH communications) with different reference signals. As such, each TCI state may consist of one reference signal set for different QCL types. As such, wireless communication system 700 may configure lean SSs 715 to be QCL'ed with other reference signals. Also, tracking reference signal (TRS), channel state information reference signal (CSI-RS), and demodulation reference signal (DMRS) (e.g., for PDSCH and PDCCH) may be QCL'ed with lean SSs 715.

For example, wireless communication system 700 may configure one or more of the following QCL relationships:

SSB 710→Lean SS 715
Lean SS 715→TRS
Lean SS 715→CSI-RS for beamforming
Lean SS 715→CSI-RS for CSI
Lean SS 715→DMRS for PDCCH (if no TRS configured)
Lean SS 715→DMRS for PDSCH (if no TRS configured)

The described techniques may provide for lean SSs 715 for reduced capability UEs 706 (e.g., for beam management procedures and/or time-frequency tracking purposes performed by reduced capability UE 706-*b*). Thus, a reduced capability UE 706 may conserve power, reduce bandwidth, etc. by reducing its operating bandwidth otherwise associated with SSBs 710 used for beam management procedures, by avoiding decoding computations associated with PBCH 730, etc. Further, according to techniques described herein, generic or full capability UEs 706 may not detect (e.g., or may ignore) such lean SSs (e.g., within configured NBWP) that are associated with reduced capability UEs, and generic or full capability UEs 706 may instead maintain utilization of SSBs 710 without interruption by (e.g., undesired detection of peak correlation of) lean SSs 715. The example techniques described (e.g., with reference to SSBs 710 and lean SSs 715) may be applied in other examples (e.g., for other transmissions, such as other control transmissions in addition to SSBs) to support reduce capability UEs 706, NBWP configuration, etc.

As discussed above, the base station and UE may utilize an SSB (e.g., a full SSB, such as SSB 600, 710) for downlink beam management. For example, an initial beam establishment procedure may be performed using the full SSB, where the SSB is transmitted on multiple beams in a TDM manner. The UE may measure the beams associated with the SSB and select the best beam as its transmit and/or receive beams. Beam adjustment and recovery procedures may use either the SSB or CSI-RS. For base station transmit beam refinement, the UE measures multiple SSB or CSI-RS instances (with each instance being sent on different beams), and reports back its measurements. The base station uses that report to select the transmit beam. For UE receive beam refinement, the UE may measure multiple repeated CSI-RS instances (sent on the same beam) and select its receive beam accordingly.

In some aspects, the UE may utilize a tracking reference signal (TRS) for timing and/or frequency tracking. The TRS may include a resource set consisting of multiple non-zero power CSI-RS (NZP-CSI-RS) resources. This may include two or four one-port density three (e.g., three in every RB) NZP-CSI-RS resources located in one or two consecutive slots, respectively. There may be a four-symbol time-domain separation between the two CSI-RS resources within a slot. The NZP-CSI-RS resource may have a periodicity of 10, 20, 40, or 80 ms and can use the full BWP bandwidth or a smaller bandwidth.

However, these approaches may be inefficient for a variety of reasons. For example, for NBWP operations, the BWP may be narrower than what NR is using currently. For example, if 12 RB use are used for the NBWP, there may be 3*12 (36) tones of CSI-RS (TRS) in the frequency domain. To increase the processing gain for small BWP allocations, this may increase the density of reference signals in the frequency domain. However, the lean SSB as described in herein may have the density of 127 tones and a 12 RB BWP, which is approximately four times (~4×) the TRS density. For example, the lean SSB may include one reference signal in the time domain. The minimum period density of the SSB may be 5 ms, thus the current SSB design may not work well for frequency tracking for high-speed UEs (e.g., since there may be a need for a more dense SSB design in the time domain). Since the lean SSB may not be used for initial cell acquisition, it can be configured to adapt to the base station deployment scenario (e.g., a base station serving high-speed UEs vs. normal UEs). Moreover, since the full SSB is already configured, it may be reused at least partially with some modified design for time/frequency tracking to reduce the need to configure additional CSI-RS resources. Another option would be to increase the CSI-RS (TRS) density in the frequency domain. However, using the lean SSB design may reduce the need for additional signaling and configuration associated with TRS, may reduce UE implementation changes as it already has PSS/SSS processing, and/or may be used for time and/or frequency tracking as well as beam management.

Accordingly, a base station and UE may establish a connection based at least in part on the SSB of the base station (e.g., the full SSB, such as SSB 600, 710). The base station and/or UE may both identify a configuration for a transmission pattern for a synchronization signal to be transmitted by the base station. In this context, the synchronization signal may refer to the lean SSB described herein. Broadly, the configuration may be identified using various techniques. For example, the configuration for the transmission pattern of the lean SSB may be known beforehand, e.g., adopted in standards and implemented in the wireless communication system. In another example, the base station may configure the UE with the configuration for the transmission pattern via a configuration signal, such as an RRC configuration signal, MAC control element (CE), downlink control information (DCI), etc. In another example, the configuration for the transmission pattern may be implicitly indicated (e.g., linked to some other reference signal/resource set, such as the normal or full SSB).

In some aspects, the lean SS may be preconfigured (e.g., by a base station) for certain periodicities and repetitions per slot, such that the lean SS may be transmitted periodically for an indefinite duration.

Figure 8:
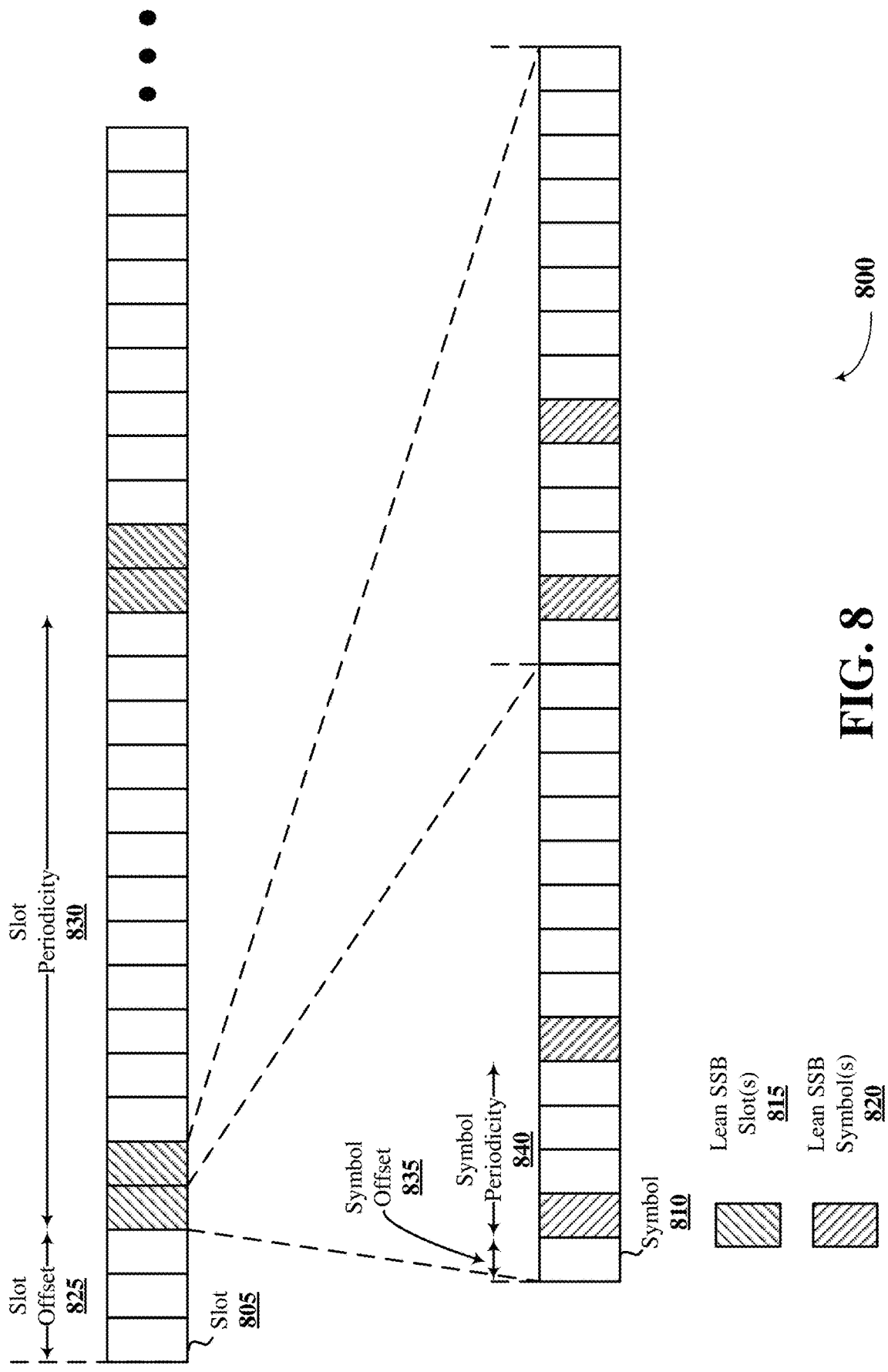
FIG. 8 illustrates an example of a lean synchronization signal block (SSB) configuration that supports periodic lean synchronization signal design in accordance with aspects of the present disclosure.

FIG. 8 illustrates an example of a lean SSB configuration 800 that supports periodic lean synchronization signal design in accordance with aspects of the present disclosure. In some examples, lean SSB configuration 800 may implement aspects of wireless communication systems 100 and/or 200. Aspects of lean SSB configuration 800 may be implemented by a base station and/or UE, which may be examples of corresponding devices described herein.

As discussed above, the base station and UE may utilize an SSB (e.g., a full SSB, such as SSB 600, 710) for downlink beam management. For example, an initial beam establishment procedure may be performed using the full SSB, where the SSB is transmitted on multiple beams in a TDM manner. The UE may measure the beams associated with the SSB and select the best beam as its transmit and/or receive beams. Beam adjustment and recovery procedures may use either the SSB or CSI-RS. For base station transmit beam refinement, the UE measures multiple SSB or CSI-RS instances (with each instance being sent on different beams), and reports back its measurements. The base station uses that report to select the transmit beam. For UE receive beam refinement, the UE may measure multiple repeated CSI-RS instances (sent on the same beam) and select its receive beam accordingly.

In some aspects, the UE may utilize a tracking reference signal (TRS) for timing and/or frequency tracking. The TRS may include a resource set consisting of multiple non-zero power CSI-RS (NZP-CSI-RS) resources. This may include two or four one-port density three (e.g., three in every RB) NZP-CSI-RS resources located in one or two consecutive slots, respectively. There may be a four-symbol time-domain separation between the two CSI-RS resources within a slot. The NZP-CSI-RS resource may have a periodicity of 10, 20, 40, or 80 ms and can use the full BWP bandwidth or a smaller bandwidth.

However, these approaches may be inefficient for a variety of reasons. For example, for NBWP operations, the BWP may be narrower than what NR is using currently. For example, if 12 RB use are used for the NBWP, there may be 3*12 (36) tones of CSI-RS (TRS) in the frequency domain. To increase the processing gain for small BWP allocations, this may increase the density of reference signals in the frequency domain. However, the lean SSB as described in herein may have the density of 127 tones and a 12 RB BWP, which is approximately four times (~4×) the TRS density. For example, the lean SSB may include one reference signal in the time domain. The minimum period density of the SSB may be 5 ms, thus the current SSB design may not work well for frequency tracking for high-speed UEs (e.g., since there may be a need for a more dense SSB design in the time domain). Since the lean SSB may not be used for initial cell acquisition, it can be configured to adapt to the base station deployment scenario (e.g., a base station serving high-speed UEs vs. normal UEs). Moreover, since the full SSB is already configured, it may be reused at least partially with some modified design for time/frequency tracking to reduce the need to configure additional CSI-RS resources. Another option would be to increase the CSI-RS (TRS) density in the frequency domain. However, using the lean SSB design may reduce the need for additional signaling and configuration associated with TRS, may reduce UE implementation changes as it already has PSS/SSS processing, and/or may be used for time and/or frequency tracking as well as beam management.

Accordingly, a base station and UE may establish a connection based at least in part on the SSB of the base station (e.g., the full SSB, such as SSB 600, 710). The base station and/or UE may both identify a configuration for a transmission pattern for a synchronization signal to be transmitted by the base station. In this context, the synchronization signal may refer to the lean SSB described herein. Broadly, the configuration may be identified using various techniques. For example, the configuration for the transmission pattern of the lean SSB may be known beforehand, e.g., adopted in standards and implemented in the wireless communication system. In another example, the base station may configure the UE with the configuration for the transmission pattern via a configuration signal, such as an RRC configuration signal, MAC control element (CE), downlink control information (DCI), etc. In another example, the configuration for the transmission pattern may be implicitly indicated (e.g., linked to some other reference signal/resource set, such as the normal or full SSB).

In some aspects, the configuration for the transmission pattern of the lean SSB may have various associated properties or parameters. For example, a lean SSB set may include one or more lean SSB symbols, with the one or more lean SSB symbols spanning one or more slots. That is, the lean SSB may include a slot offset 825 for a first slot 805 that includes a synchronization signal transmission within the transmission window. Broadly, the transmission window may refer to a window in which the lean SSB set can be configured, which may refer to a frame, half-frame, subframe, etc., or other suitable boundary. In the example illustrated in FIG. 8, the slot offset 825 for the lean SSB configuration 800 may span three slots 805, by way of example only. The lean SSB set may then span two adjacent lean SSB slots 815 (also by way of example only).

In some aspects, the lean SSB parameter may also include a slot periodicity 830 within the transmission window. Broadly, the slot periodicity 830 refers to the number of times and/or how often the lean SSB slots 815 are repeated within the transmission window (e.g., the distribution of lean SSB slots 815 within the transmission window). In the example illustrated in FIG. 8, the slot periodicity 830 may span 14 slots 805. That is, the transmission window may start with a first slot 805 at the relevant boundary, followed by two lean SSB slots 815. Twelve slots 805 later (after the two lean SSB slots 815), the lean SSB set may include another two lean SSB slots 815. This pattern or distribution may be repeated throughout the transmission window with two lean SSB slots 815 occurring every 14 slots 805.

Within a lean SSB slot 815, the parameters for the transmission pattern may also include a symbol offset 835 for the first synchronization signal transmission within a lean SSB slot 815 occurring within the transmission window. That is, each slot 805 may span a number of symbols 810, with 14 symbols 810 being shown by way of example only. The symbol offset 835 may correspond to the number of symbols 810 within a lean SSB slot 815 before the first instance of the lean SSB symbol 820 occurs. In the example illustrated in FIG. 8, the symbol offset 835 spans one symbol 810. Another parameter for the transmission pattern may include the symbol periodicity 840. Broadly, the symbol periodicity 840 identifies the number and/or pattern of lean SSB symbols 820 occurring within the lean SSB slot 815 (e.g., the distribution of lean SSB symbols 820 within the lean SSB slot 815). In the example illustrated in FIG. 8, the symbol periodicity 840 spans four symbols 810. That is, a first instance of a lean SSB symbol 820 may occur in the second symbol 810 of the lean SSB slot 815. The next instance of the lean SSB symbol 820 may occur four symbols 810 later. This pattern or distribution (e.g., the symbol periodicity 840) may be repeated within each lean SSB slot 815.

In some aspects, the lean SSB configuration 800 may be configured (e.g., the configuration for the transmission pattern of the synchronization signals) for one or more BWPs. That is, the BWP for the synchronization signal (e.g., the lean SSB configuration 800) may be different than the BWP utilized for the SSB used to establish a connection. In some aspects, the lean SSB configuration 800 may be configured as UE-specific (e.g., for a particular UE and/or a group of UEs) or cell specific.

In some aspects, the lean SSB configuration 800 may be dynamically (e.g., using MAC CE or DCI) and/or semi-statically (e.g., using RRC signaling) activated/deactivated. For example, the base station may transmit a signal to the UE activating or deactivating the one or more instances of the synchronization signal according to the transmission pattern. The signal may activate or deactivate the one or more instances of the synchronization signal for at least one UE, a group of UEs that include the UE, for a particular BWP, and/or for the whole cell (e.g., for the base station). Accordingly, the lean SSB configuration 800 may be turned on/off by the base station via dynamic or semi-static signaling.

Moreover, in some aspects, the lean SSB configuration 800 may be activated/deactivated based on a request from the UE. For example, the UE may transmit a signal (e.g., a physical uplink control channel (PUCCH) and/or physical uplink shared channel (PUSCH)) to the base station requesting activation or deactivation of the one or more instances of the synchronization signal according to the transmission pattern. The UE may explicitly request activation/deactivation using a bit, field, etc., and/or may implicitly request activation/deactivation (e.g., based on a feedback report, associated with a particular buffer status report (BSR), based on a request for beam management/recovery, etc.). In its request, the UE may request certain configuration parameters for the lean SSB configuration 800, e.g., such as a particular slot offset 825, slot periodicity 830, symbol offset 835, and/or symbol periodicity 840. Other parameters the UE may request may include, but are not limited to, a particular BWP for the SSB configuration 800.

Accordingly, the UE may receive one or more instances of the synchronization signal according to the transmission pattern (e.g., may receive one or more instances of a lean SSB symbol 820). The UE may modify a connection with the base station based on the received instances of the synchronization signal. For example, the UE may perform beam management and/or time/frequency tracking for its established connection with the base station using the lean SSB configuration 800 described herein.

Figure 9:
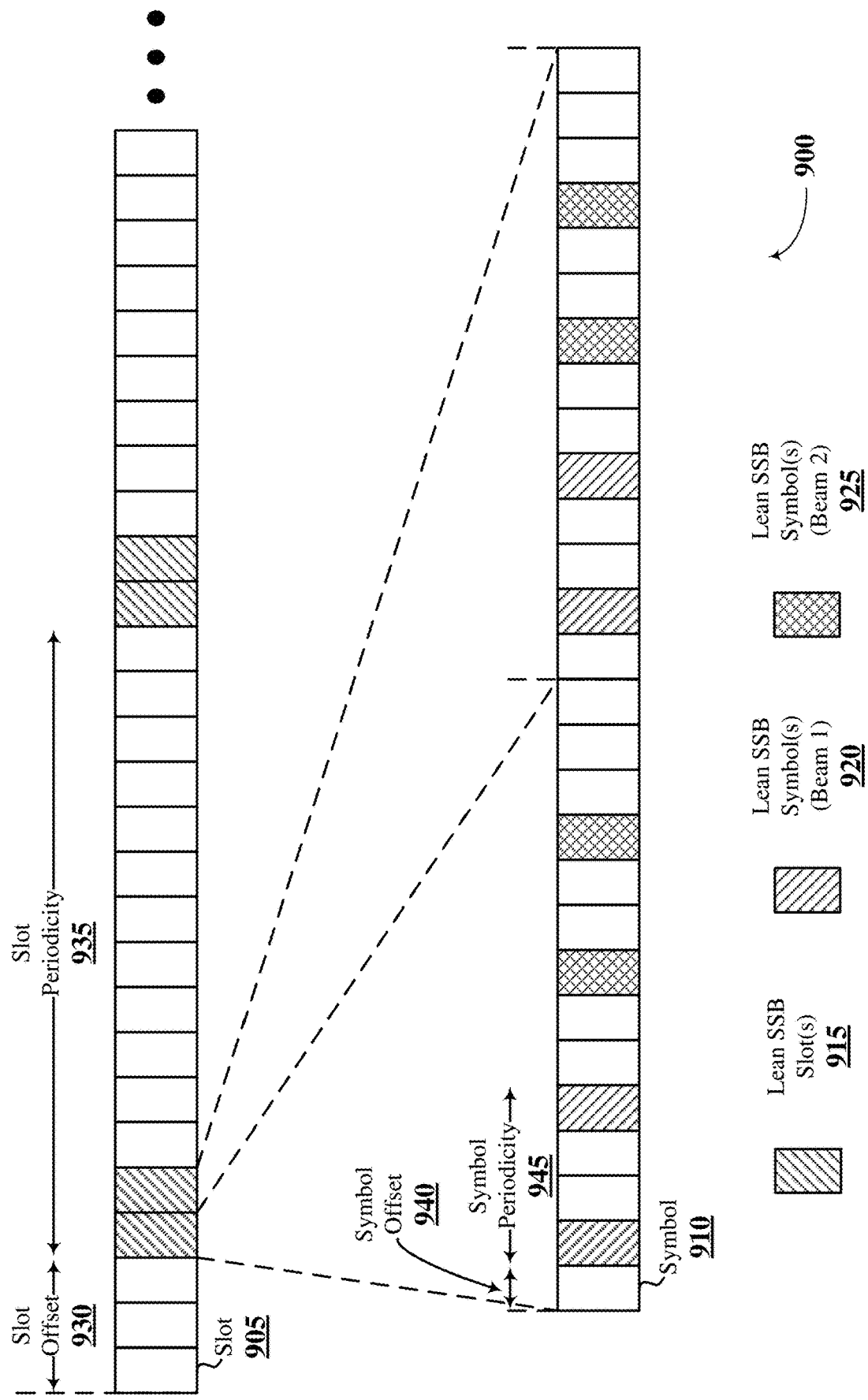
FIG. 9 illustrates an example of a lean SSB configuration that supports periodic lean synchronization signal design in accordance with aspects of the present disclosure.

FIG. 9 illustrates an example of a lean SSB configuration 900 that supports periodic lean synchronization signal design in accordance with aspects of the present disclosure. In some examples, lean SSB configuration 900 may implement aspects of wireless communication systems 100 and/or 200, and/or lean SSB configuration 800. Aspects of lean SSB configuration 900 may be implemented by a base station and/or UE, which may be examples of the corresponding devices described herein.

As discussed above, the base station and UE may establish a connection using an SSB (e.g., a normal or full SSB, such as SSB 600, 710) of the base station. The connection may be established as part of an initial connection establishment procedure or cell reselection procedure. The base station and UE may identify a configuration for a transmission pattern for a synchronization signal (e.g., the lean SSB) to be transmitted by the base station. The configuration for the transmission pattern may include various parameters, such as a slot periodicity 935 within a transmission window, slot offset 930 with respect to the beginning of a transmission window, a symbol offset 940 within a lean SSB slot 915, and/or a symbol periodicity 945 within a lean SSB slot 915, as discussed above. The configuration of the transmission pattern may be dynamically and/or semi-statically activated/deactivated, which may be based on a UE request in some examples. Accordingly, the base station may transmit synchronization signals according to the transmission pattern. The transmission pattern for the lean SSB (e.g., the synchronization signals) may include one or more slots 905, with each slot 905 spanning a number of symbols 910 (with 14 symbols 910 per slot 905 shown by way of example only).

In some aspects, the configuration for the transmission pattern may be based on different transmit beams of the base station. That is, the synchronization signals transmitted by the base station according to the transmission pattern may be transmitted on a single transmit beam of the base station (as shown in lean SSB configuration 800) and/or may be transmitted on multiple transmit beams of the base station (as shown in lean SSB configuration 900). Such beam multiplexing may be implemented according to different options. One option may include one set of lean SSB transmissions per base station transmit beam (e.g., lean SSB symbols for the set belonging to the same transmit beam), with different symbol offsets within a lean SSB slot 915 and slot offset. This option may include a first set of lean SSB transmissions using transmit beam 1 of the base station and a second set of lean SSB transmissions using transmit beam 2 of the base station. Another option may include multiple beams per set of lean SSB transmissions (e.g., lean SSB symbols for the set belonging to different transmit beams of the base station). This option may include the first set of lean SSB transmissions using the first transmit beam and second transmit beam of the base station. Lean SSB configuration 900 illustrates an example where two different transmit beams are used for synchronization signal transmissions according to the configuration for the transmission pattern.

That is, the first set (and second set, depending on which option is adopted) of lean SSB transmission (e.g., synchronization signal transmissions) may be transmitted in lean SSB symbols 920 of a lean SSB slot 915 using a first transmit beam of the base station while a second set of lean SSB transmissions are transmitted in lean SSB symbols 925 of the lean SSB slot 915 using a second transmit beam of the base station. The configuration for the transmission pattern may indicate which option is selected for the synchronization signal transmissions. The UE may receive a first one or more instances of the synchronization signals (e.g., lean SSB transmissions) associated with a first beam (e.g., transmit beam 1 of the base station) and a second one or more instances of the synchronization signal associated with a second beam (e.g., transmit beam 2 of the base station) that is different than the first beam. As discussed, the first beam and second beam may be associated with the same set of the one or more instances of the synchronization signal, or with different sets, depending on the configuration for the transmission pattern.

Accordingly, the UE may receive the first one or more instances of the synchronization signal associated with the first beam and the second one or more instances of the synchronization signal associated with the second beam. The UE may update its established connection (e.g., modify various parameters of the established connection) with the base station based on any or all of the received instances of the synchronization signal transmissions using the first and/or second beams. For example, the UE may perform beam management and/or time/frequency tracking for its established connection with the base station. This may include updating its active transmit/receive beam of the UE, transmitting an updated feedback report to the base station indicating parameters for the first and/or second transmit beams of the base station, updating its timing synchronization with the base station, updating its frequency synchronization with respect to the base station, and the like.

Figure 10:
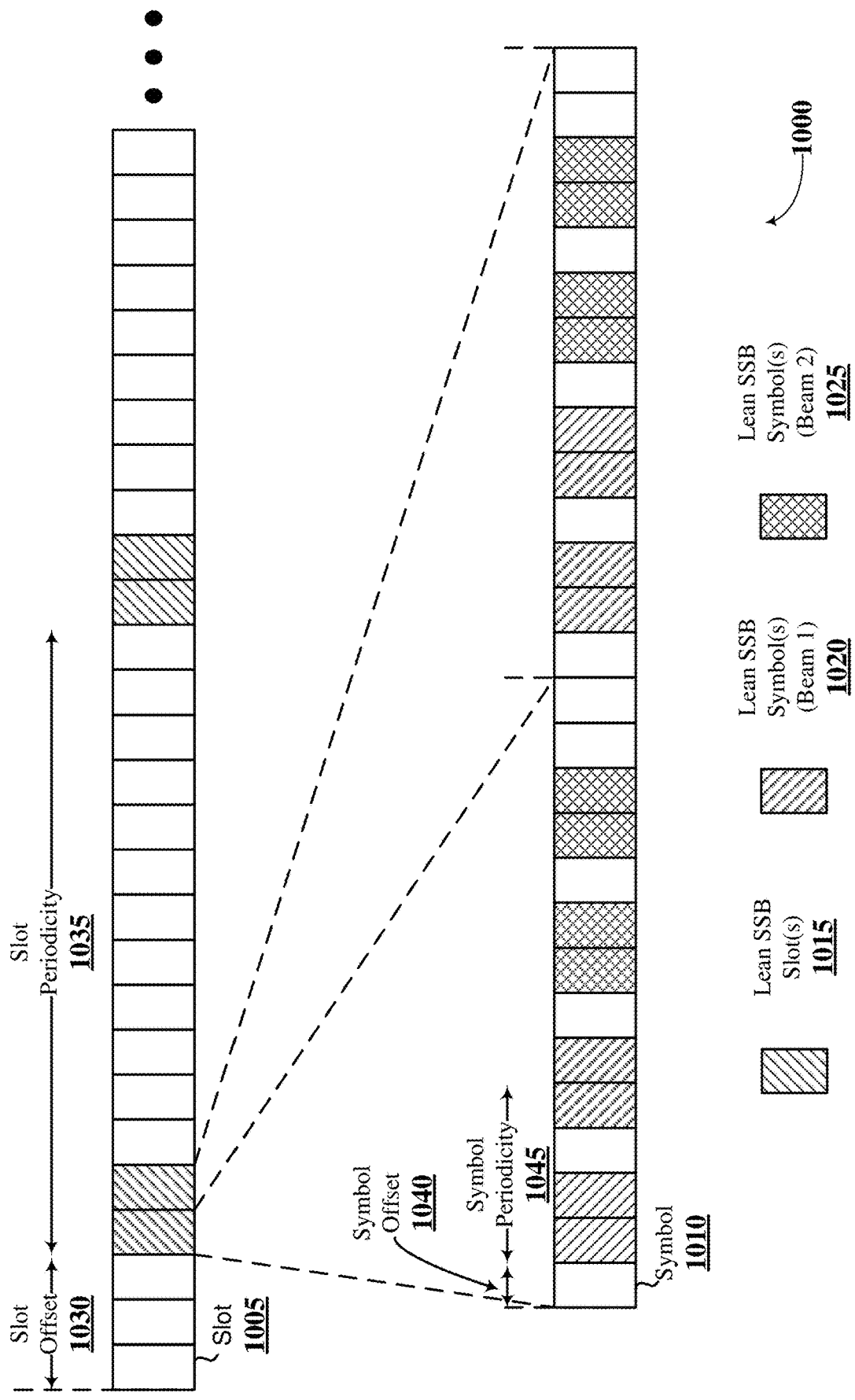
FIG. 10 illustrates an example of a lean SSB configuration that supports periodic lean synchronization signal design in accordance with aspects of the present disclosure.

FIG. 10 illustrates an example of a lean SSB configuration 1000 that supports periodic lean synchronization signal design in accordance with aspects of the present disclosure. In some examples, lean SSB configuration 1000 may implement aspects of wireless communication systems 100 and/or 200, and/or lean SSB configurations 800 and/or 900. Aspects of lean SSB configuration 1000 may be implemented by a base station and/or UE, which may be examples of the corresponding devices described herein.

As discussed above, the base station and UE may establish a connection using an SSB (e.g., a normal or full SSB, such as SSB 600, 710) of the base station. The connection may be established as part of an initial connection establishment procedure or cell reselection procedure. The base station and UE may identify a configuration for a transmission pattern for a synchronization signal (e.g., the lean SSB) to be transmitted by the base station. The configuration for the transmission pattern may include various parameters, such as a slot periodicity 1035 within a transmission window, slot offset 1030 with respect to the beginning of a transmission window, a symbol offset 1040 within a lean SSB slot 1015, and/or a symbol periodicity 1045 within a lean SSB slot 1015, as discussed above. The configuration of the transmission pattern may be dynamically and/or semi-statically activated/deactivated, which may be based on a UE request in some examples. Accordingly, the base station may transmit synchronization signals according to the transmission pattern. The transmission pattern for the lean SSB (e.g., the synchronization signals) may include one or more slots 1005, with each slot 1005 spanning a number of symbols 1010 (with 14 symbols 1010 per slot 1005 shown by way of example only).

In some aspects, the configuration for the transmission pattern may be based on different transmit beams of the base station. Moreover, and to support receive beam refinement of the UE, the base station may indicate whether a beam repetition pattern has been enabled for the synchronization signal transmissions. The base station indicates that beam repetition is enabled, the number of repetitions (N) may be indicated. Accordingly, the lean SSB symbols may be repeated in N consecutive symbols 1010 (e.g., transmitted from the same base station transmit beam N times). Lean SSB configuration 1000 illustrates an example where N is equal to two. Accordingly, the UE may determine that beam repetition has been enabled for transmissions of the synchronization signal, and identify the beam repetition pattern based on beam repetition being enabled. That is, the configuration for the transmission pattern may also indicate whether beam repetition is enabled and, if so, the beam repetition pattern used.

That is, a first set of the lean SSB transmissions (e.g., synchronization signal transmissions) may be transmitted in two consecutive lean SSB symbols 1020 of a lean SSB slot 1015 using a first transmit beam of the base station while a second set of lean SSB transmissions are transmitted in two consecutive lean SSB symbols 1025 of the lean SSB slot 1015 using a second transmit beam of the base station. The configuration for the beam repetition pattern may indicate which option is selected for the synchronization signal transmissions, e.g., whether each set of lean SSB transmissions are associated with the same beam, or with different beams. The UE may receive a first one or more instances of the synchronization signals (e.g., lean SSB transmissions) associated with a first beam (e.g., transmit beam 1 of the base station) and a second one or more instances of the synchronization signal associated with a second beam (e.g., transmit beam 2 of the base station) that is different than the first beam. As discussed, the first beam and second beam may be associated with the same set of the one or more instances of the synchronization signal, or with different sets, depending on the configuration for the transmission pattern and/or beam repetition pattern.

Accordingly, the UE may receive the first one or more instances of the synchronization signal associated with the first beam and the second one or more instances of the synchronization signal associated with the second beam. The UE may update its established connection (e.g., modify various parameters of the established connection) with the base station based on any or all of the received instances of the synchronization signal transmissions using the first and/or second beams. For example, the UE may perform beam management and/or time/frequency tracking for its established connection with the base station. This may include updating its active transmit/receive beam of the UE, transmitting an updated feedback report to the base station indicating parameters for the first and/or second transmit beams of the base station, updating its timing synchronization with the base station, updating its frequency synchronization with respect to the base station, and the like.

Figure 11:
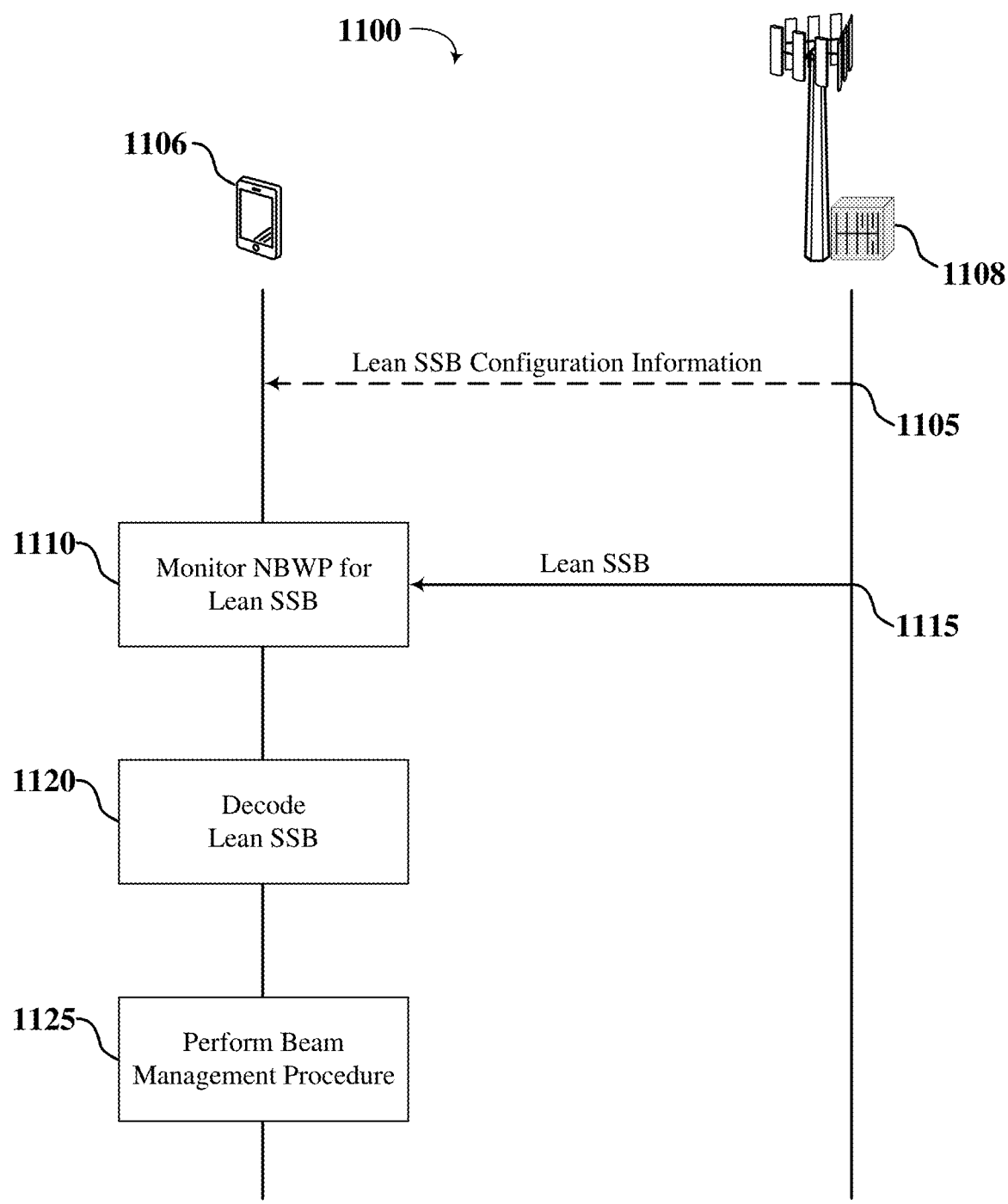
FIG. 11 illustrates an example of a process flow that supports lean SSBs for reduced capability devices in accordance with aspects of the present disclosure.

FIG. 11 illustrates an example of a process flow 1100 that supports lean SSBs for reduced capability devices in accordance with aspects of the present disclosure. In some examples, process flow 1100 may implement aspects of wireless communications system 100 and/or wireless communications system 200 and may be implemented by a UE 106 and a base station 108, which may be examples of a UE and a base station described with reference to FIGS. 1-2, 4, 5, and elsewhere in this disclosure. In some cases, UE 106 may be an example of a reduced capability UE. In the following description of the process flow 1100, the operations between UE 106 and base station 108 may be transmitted in a different order than the order shown, or the operations performed by base station 108 and UE 106 may be performed in different orders or at different times. Certain operations may also be left out of the process flow 1100, or other operations may be added to the process flow 1100. It is to be understood that while base station 108 and UE 106 are shown performing a number of the operations of process flow 1100, any wireless device may perform the operations shown.

At 1105, in some examples, base station 108 may transmit lean SSB configuration information to UE 106. For example, lean SSB configuration information may include an indication of whether a lean SSB includes a PSS or a SSS, an indication of a center frequency offset between lean SSBs and other SSBs configured within the wireless communications system, an indication of a parameter of a M-sequence for generation of synchronization signals of lean SSBs, various other parameters for configuration of lean SSBs (e.g., N B-BWP, a generator function, etc. In some cases, the lean SSB configuration information may be transmitted via RRC signaling, a MAC CE, DCI, etc.

In some examples, UE 106 may, for initial acquisition, monitor the second bandwidth region for the second synchronization block. In such cases, for the initial acquisition procedure, UE 106 may decode the second synchronization block based on monitoring the second bandwidth region to obtain PCI, time alignment etc. After initial acquisition, UE 106 may monitor the first bandwidth region (e.g., a configured NBWP) for the first synchronization block based on decoding the second synchronization block and the capability of the UE 106 (e.g., UE 106 may reduce bandwidth and monitor for lean SSBs, such as the first synchronization block, based completing initial acquisition).

In some cases, at 1105, base station 108 may transmit a TCI state indicating a QCL relationship for lean SSBs (e.g., including the first synchronization block). For example, QCL relationship for lean SSBs that may be indicated or configured by base station 108 may include one or more of a SSB and lean SSB QCL relationship, a lean SSB and TRS QCL relationship, a lean SSB and CSI-RS (for beamforming) QCL relationship, a lean SSB and CSI-RS (for channel state information) QCL relationship, a lean SSB and DMRS (for downlink control channel) QCL relationship, or a lean SSB and DMRS (for downlink shared channel) QCL relationship.

At 1110, UE 106 may monitor a first bandwidth region (e.g., a NBWP) for a first synchronization block (e.g., a lean SSB) based on a capability of the UE 106. As discussed herein, the first synchronization block (e.g., the lean SSB) may include a subset of signals (e.g., one of either a PSS or a SSS) of a second synchronization block (e.g., a SSB) associated with a second bandwidth region (e.g., a BWP). That is, the first synchronization block may include a subset of the PSS, SSS, and PBCH of the second synchronization block (e.g., the subset including one of either a PSS or a SSS).

In some cases, UE 106 may identify a first center frequency corresponding to the first synchronization block, where the first bandwidth region may be monitored for the first synchronization block based on the identified first center frequency (e.g., where the first center frequency is different from a second center frequency corresponding to the second synchronization block). In some cases, UE 106 may a first M-sequence associated with the first synchronization block (e.g., $N_{ID_{NB\text{-}BWP}}^{(2)}$) where the first synchronization block is decoded based on the identified first M-sequence. As described herein, in some cases, UE 106 may identify a second M-sequence associated with the second synchronization block (e.g., $N_{ID}^{(2)}$), and the UE 106 may identify a parameter of the second M-sequence (e.g., δ), where the first M-sequence (e.g., $N_{ID_{NB\text{-}BWP}}^{(2)}$) is identified based on the identified second M-sequence and the identified parameter. As discussed herein, the first M-sequence, the second M-sequence, the parameter of the second M-sequence, etc. may be preconfigured, may be transmitted to the UE 106 at 1105, etc.

At 1115, base station 108 may transmit one or more lean SSBs, including the first synchronization block, (e.g., which may be preconfigured, which may be based on lean SSB configuration information transmitted at 1105, etc.). For example, base station 108 may transmit a lean SSB in accordance with the techniques described herein (e.g., where the lean SSB may be transmitted at a different center frequency than SSBs, at same starting symbols as other SSBs, etc.).

At 1120, UE 106 may decode the first synchronization block based on monitoring the first bandwidth region (e.g., the UE 106 may decode a lean SSB based on monitoring a configured NBWP). In some cases, the first synchronization block and the subset of signals in the second synchronization block may be associated with a same resource block structure. In some cases, the first synchronization block and the subset of signals in the second synchronization block may be associated with a same symbol start time and a same symbol gap (e.g., SSB and lean SSBs may be associated with a same symbol start time and a same symbol gap, as described herein with reference to 120 kHz SCS examples). In some cases, UE 106 may decode the first synchronization block based on a QCL relationship received at 1105.

In some examples, the first synchronization block includes one or more repetitions of the subset of signals in the second synchronization block. In some examples, the first synchronization block is associated with one or more additional beams than the subset of signals in the second synchronization block. In some examples, the first synchronization block includes downlink shared channel data in addition to the subset of signals in the second synchronization block.

At 1125, UE 106 may perform a beam management procedure based on decoding the first synchronization block. For example, UE 106 may perform such beam management procedures to receive one or more downlink transmissions (e.g., PDCCH and/or PDSCH transmissions) at time(s) and/or frequencies indicated or calibrated by the estimated timing and frequency from the first synchronization block. UE 106 may use the first synchronization block for beam tracking, beam management, frequency tracking, time tracking, etc., as described herein. For instance, UE 106 may use the first synchronization block to perform one or more radio resource management (RRM) measurements.

Figure 12:
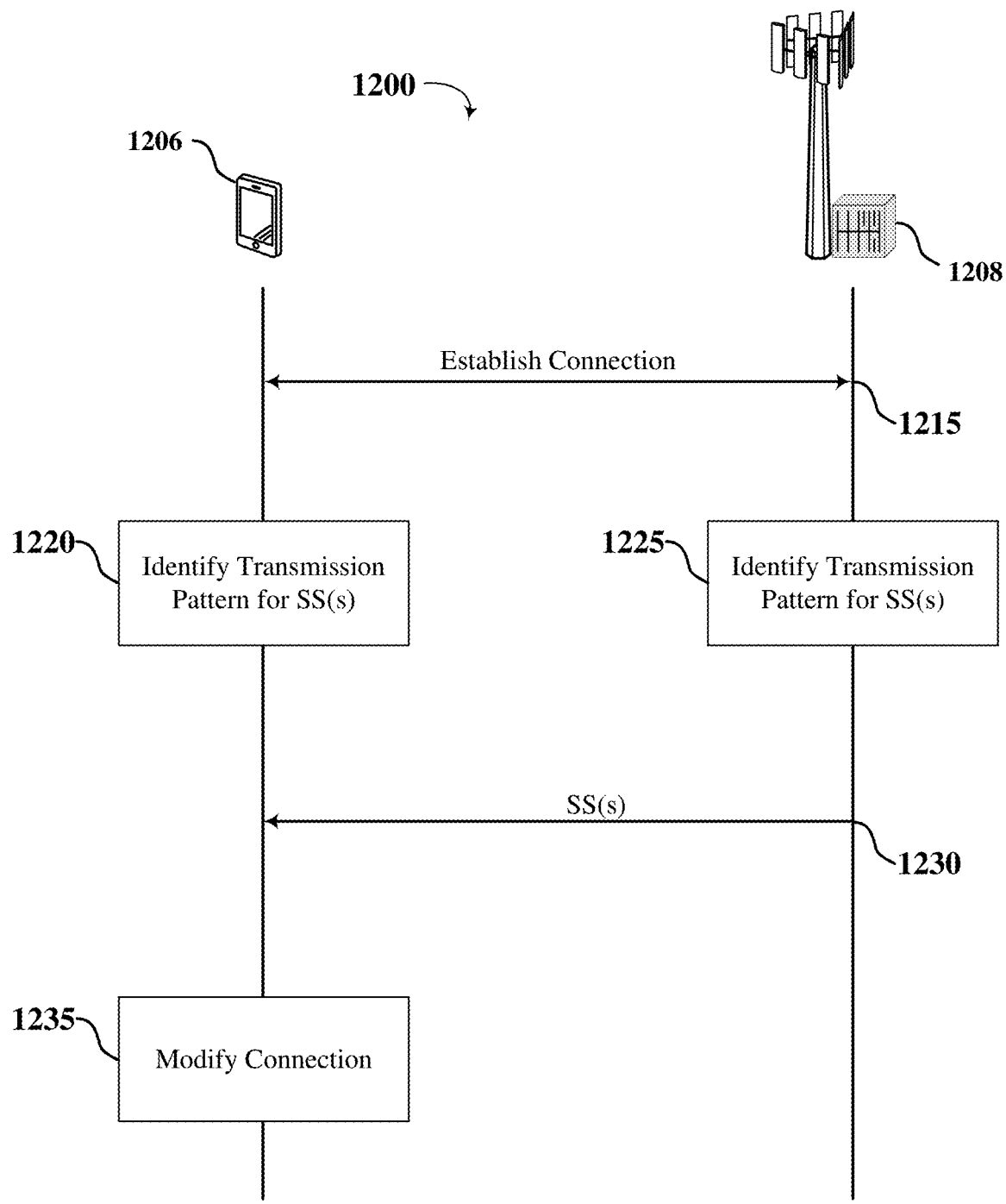
FIG. 12 illustrates an example of a process that supports periodic lean synchronization signal design in accordance with aspects of the present disclosure.

FIG. 12 illustrates an example of a process 1200 that supports periodic lean synchronization signal design in accordance with aspects of the present disclosure. In some examples, process 1200 may implement aspects of wireless communication systems 100 and/or 200, and/or lean SSB configurations 800, 900, and/or 1000. Aspects of process 1200 may be implemented by UE 106 and/or base station 108, which may be examples of corresponding devices described herein.

At 1215, UE 106 and base station 108 may establish a connection. The connection may be established based on an SSB of base station 108, such as a full SSB as illustrated in SSB 210 of FIG. 2. The connection may be established during an initial cell selection procedure or as part of a cell reselection procedure.

At 1220, UE 106 may identify a configuration for a transmission pattern for a synchronization signal (e.g., lean SSB) to be transmitted by base station 108. Similarly, and at 1225, base station 108 may also identify the configuration for the transmission pattern for the synchronization signal (e.g., lean SSB). In some aspects, the configuration for the transmission pattern may be known by UE 106 and/or base station 108 (e.g., adopted in standards and implemented within the wireless communication system that UE 106 and/or base station 108 are operating in). In some aspects, the configuration of the transmission pattern may be configured by base station 108 for UE 106. For example, base station 108 may transmit (and UE 106 may receive) a configuration signal (e.g., an RRC signal, MAC CE, or the like) indicating the configuration for the transmission pattern. In some aspects, the configuration for the transmission pattern may be implicitly configured by base station 108. For example, base station 108 may configure UE 106 with a different reference signal, a resource set, or other configuration, that is associated with the configuration for the transmission pattern for the synchronization signal transmissions.

At 1230, base station 108 may transmit synchronization signals (e.g., lean SSB transmissions) according to the transmission pattern. Accordingly, UE 106 may receive one or more instances of the synchronization signals according to the transmission pattern. In some aspects, transmission of the synchronization signals according to the transmission pattern may be dynamically (e.g., DCI, MAC CE, etc.) and/or semi-statically (e.g., RRC signaling) activated/deactivated by base station 108. That is, base station 108 may turn lean SSB transmissions on or off for UE 106 using various signaling. In some aspects, UE 106 may request lean SSB transmissions from base station 108. For example, UE 106 may transmit (and base station 108 may receive) a signal requesting activation or deactivation of the lean SSB transmissions. In some examples, the UE request may indicate various parameters requested for the synchronization signal transmissions.

As discussed, in some examples the synchronization signal transmissions may utilize one or more beams (e.g., different transmit beams a base station 108. That is, one or more sets of synchronization signal transmissions may be configured for UE 106, with each set using unique transmit beams or with different sets using the same transmit beam. As also discussed, the synchronization signal transmissions (e.g., lean SSB transmission) according to the transmission pattern may be associated with various parameters, e.g., offsets, periodicity, etc. The configuration for the transmission pattern may indicate the parameters for the synchronization signal transmissions.

Accordingly, and at 1235, UE 106 may modify the established connection with base station 108 based on the received one or more instances of the synchronization signal (e.g., based on received instances of lean SSB transmissions from base station 108). For example, UE 106 may perform beam management, time tracking, frequency tracking, and the like, for its established connection with base station 108.

Figure 13:
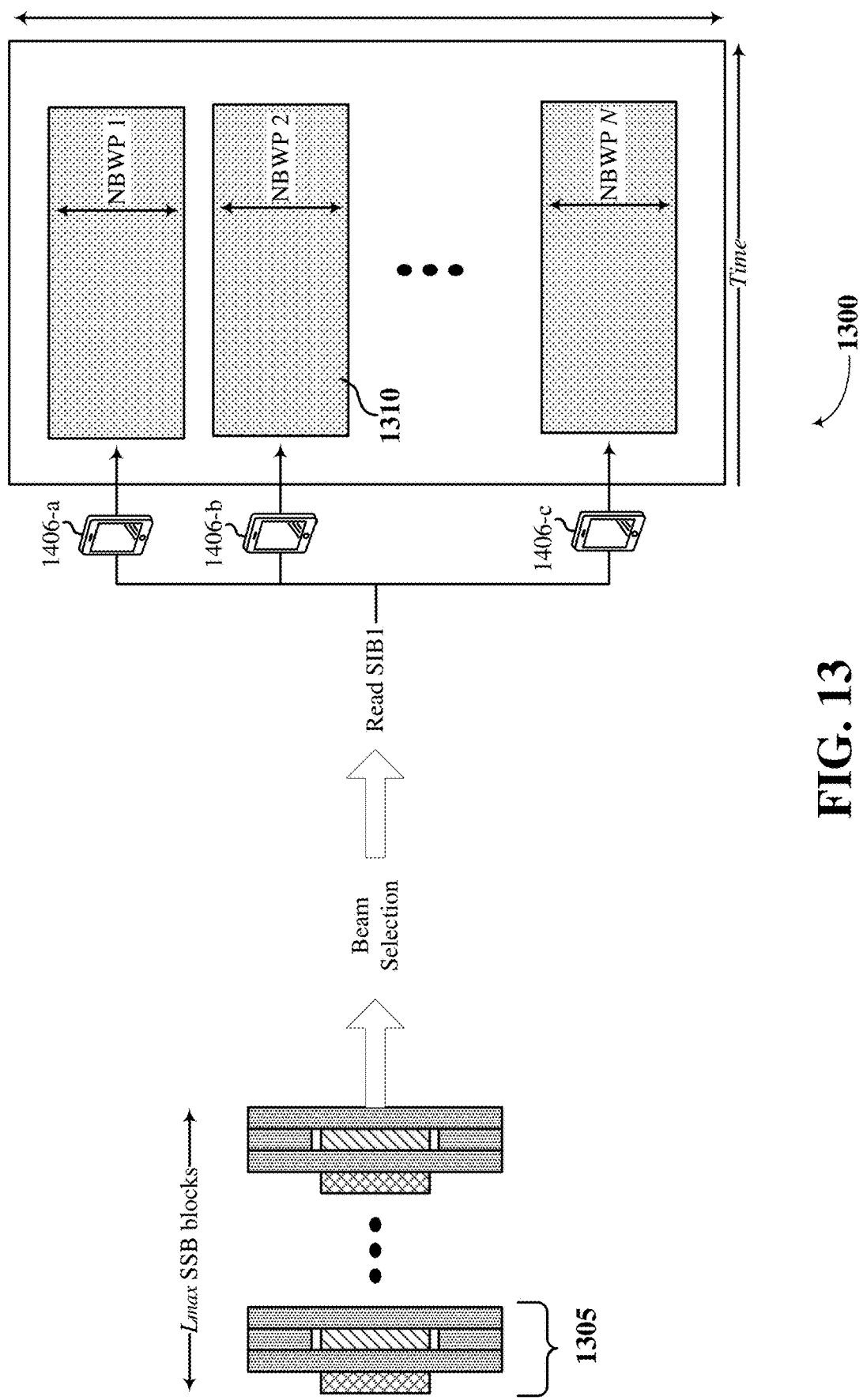
FIG. 13 illustrates an example of a NBWP transition diagram that supports NBWP transitions for reduced capability devices in accordance with aspects of the present disclosure.

FIG. 13 illustrates an example of a NBWP transition diagram 1300 that supports NBWP transitions for reduced capability devices in accordance with aspects of the present disclosure. In some examples, NBWP transition diagram 1300 may implement aspects of wireless communications system 100 and/or wireless communications system 200. For example, NBWP transition diagram 1300 may include UE 106-a, UE 106-b, and UE 106-c, which may be examples of UEs 106 as described with reference to FIG. 1. UE 106-a, UE 106-b, and UE 106-c (e.g., reduced capability UEs 106) may be configured to use NBWPs 1310 in accordance with the techniques described herein. NBWP transition diagram 1300 may illustrate aspects of initial NBWP transition (e.g., initial transition to a NBWP 1310 after detection of a SSB 1305) as well as subsequent NBWP transitioning (e.g., subsequent transitions to other NBWPs 1310).

Some wireless communications systems may utilize SSBs 1305 with beam sweeping for synchronization purposes. For example, a base station may beam sweep some set of SSBs 1305 (e.g., $L_{max}$ SSBs 1305) in a carrier bandwidth. The number of different beams used by a base station may be determined based on how many SSBs 1305 are transmitted within a SSB Burst Set (e.g., a set of SSBs 1305 being transmitted in 5 ms window of SSB transmission). The parameter defining the maximum number of SSBs 1305 within a SSB set may be referred to as $L_{max}$. In some examples, UEs 106 may monitor some bandwidth region for SSBs 1305 (e.g., a set of physical resource blocks corresponding to SSBs 1305) when searching for a cell. In such cases, for a cell acquisition procedure, a UE 106 may receive an SSB 1305 based on monitoring the bandwidth region for SSBs 1305 to obtain PCI, time alignment, select a beam, etc.

In the example of FIG. 13, a UE 106 (e.g., a reduced capability UE 106) may monitor for and receive a SSB 1305. For example, a UE 106 may monitor some bandwidth region for SSBs 1305, may receive a PSS, and may detect the presence of the SSB 1305 based on decoding the PSS (e.g., the PSS may indicate the SSB 1305 and may result in UE 106 decoding of PBCH and SSS of the SSB 1305). A reduced capability UE 106 may then select a beam based on one or more detected SSBs 1305 (e.g., based on RSRP or RSRQ measurements of beam swept cell defining SSBs 1305). The UE 106 may read SIB1, and may transition to an initial SSB in accordance with the techniques described herein. Such is shown for illustrative purposes and, as discussed, generally the described techniques provide for UE initial transitions to a NBWP 1310 at various stages of cell acquisition (e.g., after a random access channel (RACH) procedure, after RMSI reading, etc., in addition to after reading SIB1 as illustrated by the present example). In some examples, SIB1 or RRC signaling may include NBWP configuration information (e.g., NBWP 1310 indices, NBWP 1310 center frequencies, NBWP 1310 bandwidths, etc.). As discussed, NBWPs 1310 may be distributed across a carrier bandwidth and may include some N number of NBWPs 1310 (e.g., where, in some cases, N>4).

In some examples, the initial transition of a UE 106 to a NBWP 1310 (e.g., and by extension the distribution of several UEs 106 into NBWPs 1310) may be configured by the network (e.g., by a base station 105). For example, in some cases, the network may signal an indication of an initial NBWP 1310 (e.g., such as a target NBWP index, a NBWP frequency location and bandwidth, etc.) per UE 106, or per group of UEs 106, via RRC signaling, DCI, or MAC CE. For example, UE 106-a, UE 106-b, and UE 106-c may transition to NBWP 1, NBWP 2, and NBWP N, respectively, based on such network signaling (e.g., for load balancing of the UEs 106 across the N NBWPs 1310. In some cases, the signaled indications of initial NBWPs 1310 for a UE 106 may be indicated by the network after the initial cell search (e.g., after beam selection, after reading a SIB, after a RACH procedure, etc., depending on implementation). In some cases, the network may select initial NBWPs 1310 for initial UE transition based on load balancing considerations, identified frequency interference (e.g., if interference is identified in a frequency band associated with some NBWP 3, the network may avoid indicating NBWP 3 to UEs 106 for initial transitions), etc.

In other examples, the initial transition of a UE 106 to a NBWP 1310 may be UE 106 initiated. For instance, a UE 106 may select a NBWP 1310 for initial transition to the NBWP 1310 based on a hashing function (e.g., between a NBWP index and an international mobile subscriber identity (IMSI) of the UE and/or a radio network temporary identifier (RNTI) of the UE), or the UE may randomly select an available NBWP based on a probability distribution (e.g., that may be preconfigured by the network or otherwise indicated by the network). In some cases, by extension to other reduced capability UEs acquiring the cell, the distribution of several UEs 106 into NBWPs may be relatively balanced. For example, upon detecting the cell, each of UE 106-a, UE 106-b, and UE 106-c may initiate transition to a NBWP 1310 and may identify which NBWP 1310 index to transition to (e.g., using their independent UE IMSI and/or RNTI in the hashing function, respectively). In other examples, each of UE 106-a, UE 106-b, and UE 106-c may initiate transition to a NBWP 1310 and may identify which NBWP 1310 index to transition to randomly according to a probability distribution, such that UE 106-a, UE 106-b, and UE 106-c may (e.g., probabilistically) randomly select different NBWPs 1310 for initial transitions. In other words, probability distributions using for random (e.g., pseudo random) selection of NBWPs 1310 may be uniform across UE 106-a, UE 106-b, and UE 106-c.

In cases where initial transition of UE 106 to NBWPs 1310 is UE initiated, hashing functions and/or probability distributions may be preconfigured by the network (e.g., and UE 106-a, UE 106-b, and UE 106-c may reference a look-up table (LUT) upon detecting a cell and preparing to perform an initial transition to an initial NBWP 1310) or may be signaled by the network.

According to other aspects of the described techniques, a UE 106 may (e.g., after initial transition to a NBWP 1310) subsequently transition amongst other NBWPs 1310. For example, UE 106-*a* may initially transition to NBWP 1, and may subsequently transition to, for example, NBWP 2 according to the techniques described herein. Such subsequent transitions between NBWPs 1310 may be configured semi-persistently, periodically, aperiodically, randomly, or some combination thereof (e.g., wireless communications systems may support, as an example, periodic UE 106 transitions between NBWPs for frequency hopping gains in addition to aperiodic UE 106 transitions to an indicated NBWP based on load balancing configurations by the network).

For semi-persistent configuration of subsequent UE 106 transition amongst NBWPs 1310, the network may signal a new target NBWP index (or explicit NBWP location and bandwidth) using either RRC signaling, DCI, or MAC CE (e.g., which can be done per UE 106 or for a group of UEs 106). For semi-persistent configuration, in some cases, a UE 106 may remain on (e.g., continue monitoring, utilizing, etc.) the indicated NBWP 1310 until the network changes it.

For aperiodic configuration of subsequent UE 106 transition amongst NBWPs 1310, the network may signal a new target NBWP index (or explicit NBWP location and bandwidth) per UE 106 per grant. For example, an uplink or downlink grant for a UE 106 may include an indication of a NBWP 1310 to aperiodically transition the UE 106 to a subsequent NBWP 1310 for the uplink or downlink communication associated with the grant. For such an aperiodic configuration, in some cases, a UE 106 may remain on (e.g., continue monitoring, utilizing, etc.) the indicated NBWP 1310 until the network changes it For random (e.g., NBWP hopping) configuration of subsequent UE 106 transition amongst NBWPs 1310, UEs 106 may randomly select and transition into one of the available NBWPs 1310 based on a predefined/signaled probability distribution. For periodic configuration of subsequent UE 106 transition amongst NBWPs 1310, the network may define a NBWP pattern in time (e.g., NBWP 1→NBWP 3→NBWP 4→NBWP 1→NBWP 3→NBWP 4, as well as some time for remaining on each NBWP).

As such, UE 106-*a*, UE 106-*b*, and UE 106-*c* may detect a cell and initially transition to a NBWP 1310 according to the various techniques described herein. Further, UE 106-*a*, UE 106-*b*, and UE 106-*c* may subsequently transition amongst NBWPs 1310 according to the various techniques described herein. Generally, the network may signal various NBWP hopping patterns, various hashing functions, various probability distributions, various explicit indications of an initial NBWP 1310 for a UE initial transition, various explicit indications of subsequent NBWP 1310 for a UE transition, etc. based on the number of UEs 106 on the cell, based on the number of NBWPs 1310, based current distributions of UEs 106 across the NBWPs 1310, based on load balancing techniques, based on identified frequency interference that may be associated with any of the NBWPs 1310, based on target gains from frequency hopping, based on UEs 106 entering or leaving the cell, based on priority or services associated with certain UEs 106, based on measured channel conditions or quality conditions associated with the NBWPs 1310, etc.

Figure 14:
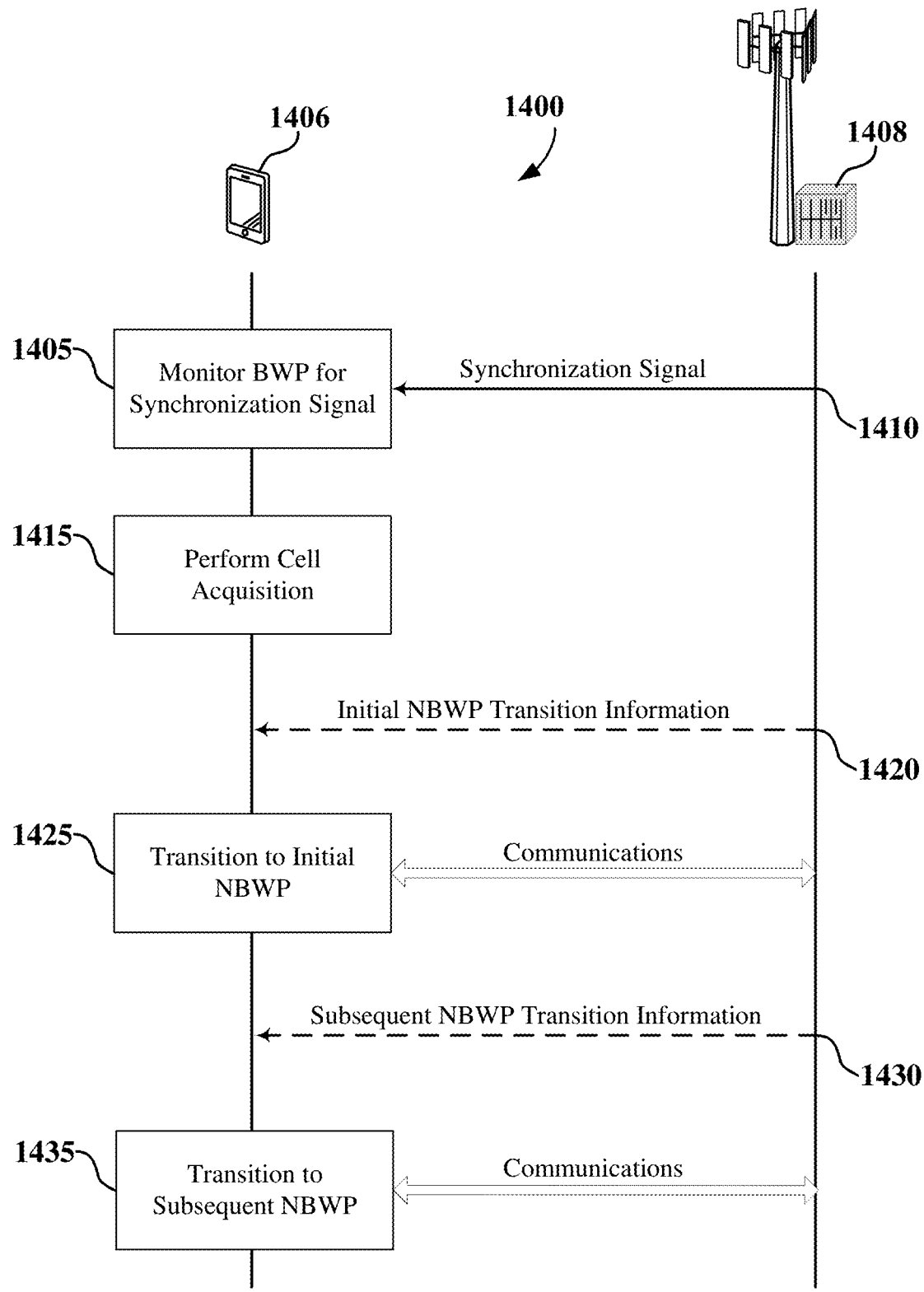
FIG. 14 illustrates an example of a process flow that supports NBWP transitions for reduced capability devices in accordance with aspects of the present disclosure.

FIG. 14 illustrates an example of a process flow 1400 that supports NBWP transitions for reduced capability devices in accordance with aspects of the present disclosure. In some examples, process flow 1400 may implement aspects of wireless communications system 100, wireless communications system 200, and/or NBWP transition diagram 1300. Process flow 1400 may be implemented by a UE 106 and a base station 108, which may be examples of a UE 106 and a base station 105 described with reference to FIGS. 1-3. In some cases, UE 106 may be an example of a reduced capability UE. In the following description of the process flow 1400, the operations between UE 106 and base station 108 may be transmitted in a different order than the order shown, or the operations performed by base station 108 and UE 106 may be performed in different orders or at different times. Certain operations may also be left out of the process flow 1400, or other operations may be added to the process flow 1400. It is to be understood that while base station 108 and UE 106 are shown performing a number of the operations of process flow 1400, any wireless device may perform the operations shown.

At 1405, UE 106 may monitor a first set of physical resource blocks (e.g., a first BWP, a carrier bandwidth, etc.). For example, in some cases UE 106 may monitor the first set of physical resource blocks in search of a cell (e.g., for initial cell search) associated with base station 108). At 1410, UE 106 may receive a synchronization signal (e.g., a PSS, SSB, etc.) based at least in part on monitoring the first set of physical resource blocks.

At 1415, UE 106 may perform cell acquisition based on the received synchronization signal. Generally, cell acquisition may refer to detecting the cell, a beam selection procedure, obtaining PCI, a time alignment procedure, reading SIB1, performing a RACH procedure, or some combination thereof. For instance, in some examples, UE 106 may detect the cell, select a beam (e.g., based on RSRP measurements performed during 1405 of beam swept SSBs from base station 108), and proceed to 1425. In other examples, UE 106 may detect the cell, select a beam, perform a RACH procedure with base station 108, and then proceed to 1425.

For instance, in some examples, UE 106 may perform a RACH procedure with the base station based on the performed cell acquisition and proceed to 1425 (e.g., transition to the first NBWP) based on performing the RACH procedure. In other examples, UE 106 may decode one or more SIBs (e.g., at 1405) and may proceed to 1425 based on the decoding of the one or more SIBs (e.g., and further, in such examples, UE 106 may perform a RACH procedure with base station 108 after the transitioning to the first NBWP). In some examples, UE 106 may transition to a RRC connected mode or a RRC idle mode, based on the performed cell acquisition at 1415, may proceed to 1425 based on the RRC connected mode or the RRC idle mode.

At 1420, in some cases, base station 108 may transmit initial NBWP transition information to UE 106. As discussed in the various examples described herein, base station 108 may transmit both initial NBWP transition information and subsequent NBWP transition information (e.g., at 1430) using different methods (e.g., such as via RRC, MAC CE, DCI, etc.) or in some cases may not transmit one or both of initial NBWP transition information and subsequent NBWP transition information at all. In some cases, transmission of initial NBWP transition information at 1420 and transmission of synchronization signal at 1410 may be a single operation.

For example, in cases where a SIB includes an indication of an initial NBWP index and the cell acquisition at 1415 includes SIB decoding, the initial NBWP transition information may be identified during the cell acquisition procedure at 1415. In other examples, some wireless communications system may preconfigure a default initial NBWP, such that base station 108 may not transmit any initial NBWP transition information at all. In yet other examples, base station 108 may transmit initial NBWP transition information at 1420 via RRC signaling, DCI, or a MAC CE. Initial NBWP transition information may include an indication of an index associated with the first NBWP, a center frequency associated with the first NBWP and a bandwidth associated with the first NBWP, a hashing function between an index associated with the first NBWP and an IMSI or a RNTI of the UE, probability distribution for random selection of a first NBWP, a frequency location for each of one or more NBWPs (e.g., information on the larger set of NBWPs that includes the first NBWP), etc., any of which information may be used by UE 106 for identification or selection of a first NBWP for an initial transition as discussed herein.

At 1425, UE 106 may transition from monitoring the first set of physical resource blocks (e.g., the first BWP) to monitoring the first NBWP (e.g., the first subset of physical resource blocks) based on the cell acquisition at 1415 (e.g., where the first NBWP is associated with less bandwidth than the first BWP). In some cases, the initial transition may be based on a NBWP index or center frequency and bandwidth associated with the first NBWP indicated by base station 108 (e.g., indicated via RRC signaling at 1420, SIB at 1410 and/or 1420, etc.). In some cases, the initial transition may be based on a hashing function or probability distribution (e.g., which may be preconfigured by the wireless communications system, may be received from base station 108 via RRC signaling at 1420, may be received from base station 108 SIB at 1410 and/or 1420, etc.). Accordingly, UE 106 and base station 108 may communicate via the first NBWP (e.g., UE 106 may communicate with base station 108 based on data received via the first NBWP).

At 1430, in some cases, base station 108 may transmit subsequent NBWP transition information to UE 106. As discussed in the various examples described herein, base station 108 may transmit subsequent NBWP transition information using different methods (e.g., such as via RRC, MAC CE, DCI, etc.) or in some cases may not transmit subsequent NBWP transition information at all. For example, in some cases, base station 108 may semi-persistently (e.g., via RRC signaling) or aperiodically (e.g., within a grant for uplink or downlink communications) indicate a NBWP index or a center frequency and bandwidth associated with a second NBWP. Alternatively (e.g., for periodic or random transitions to subsequent NBWPs), base station 108 may not transmit any additional NBWP transition information (e.g., any subsequent NBWP transition information) to UE 106, and UE 106 may transition in block 1435 to the second NBWP based on a hashing function or probability distribution (e.g., which may be preconfigured by the wireless communications system, may be received from base station 108 via RRC signaling at 1420, may be received from base station 108 SIB at 1410 and/or 1420, etc.). Accordingly, UE 106 and base station 108 may communicate via the second NBWP (e.g., UE 106 may communicate with base station 108 based on data received via the second NBWP).

As discussed above, the base station may transmit one or more lean SSs periodically, for an indefinite time duration. However, such a periodic lean SS implementation continuously uses resources indefinitely and consumes power, e.g., regardless of the conditions of the UE. As such, periodic transmission of a lean SS may not be an optimal approach in some configurations.

According to an aspect of the disclosure, aperiodic transmission of one or more lean SSs may be implemented. In an aspect, the aperiodic lean SS transmission may enable the base station (e.g., base station 708) to allocate resources for one or more lean SSs and to transmit the one or more lean SSs to one or more UEs (e.g., UEs 706), for example, in an ad-hoc manner, instead of transmitting the lean SS for an indefinite duration of time. For example, the resources for lean SSs may be allocated in such a way that the lean SSs are transmitted for particular instances corresponding to the resources, instead of being repeatedly allocated for every periodicity. For example, the base station may apply the resource allocation for aperiodic transmission of lean SSs to particular UE conditions, such as UE mobility, obstructions associated with the UE, etc. In an aspect, the base station may perform beam refinement using the aperiodic lean SS transmission between sessions of periodic lean SS transmissions. In an aspect, the base station may configure the lean SS for the aperiodic lean SS transmission to be different from a lean SS for the periodic lean SS transmission, e.g., to satisfy certain requirements such as requirements associated with beam switching.

In an aspect, in the aperiodic lean SS configuration, one or more instances of lean SSs may be transmitted via one or more symbols, which may also be referred to as lean SS symbols. Further, these lean SS symbols may be allocated in one or more slots. For example, the aperiodic lean SS transmission may take place over one or more slots, but within a fixed time duration or a fixed number of slots.

As discussed above, the base station and the UE may utilize an SSB (e.g., a full SSB, such as SSB 710 of FIG. 7) for downlink beam management. For example, an initial beam establishment procedure may be performed using the full SSB, where the SSB is transmitted on multiple beams in a TDM manner. The UE may measure the beams associated with the SSB and select the best beam (e.g., beams with the highest signal strength or power) as the UE's transmit and/or receive beams. Beam adjustment and recovery procedures may use either the SSB or CSI-RS. For base station transmit beam refinements, the UE measures multiple SSB or CSI-RS instances (with each instance being sent on different beams), and reports back its measurements to the base station. The base station uses that report to select the transmit beam. For UE receive beam refinement, the UE may measure multiple repeated CSI-RS instances (sent on the same beam) and select its receive beam accordingly.

In an aspect, the base station may allocate the resources (e.g., symbols within a slot) for the aperiodic lean SS transmission based on a configuration of a transmission pattern for the aperiodic lean SS transmission. The configuration may include one or more parameters determined solely by the base station or may be determined based at least in part on one or more parameters received from a UE. The one or more parameters received from the UE may include, for example, UE conditions. The configuration may be determined and provided to the UE using various techniques. In an aspect, the base station may provide the configuration to the UE via at least one of a downlink message or an implicit indication associated with another signal configured for the at least one UE, where the configuration is pre-configured for the at least one UE and the base station or is generated by the base station. For example, the configuration for the transmission pattern of the lean SS may be pre-configured, e.g., adopted in standards and implemented in the wireless communication system, for example, via RRC signaling, and the pre-configured configuration may be provided to the UE via DCI, and/or may be provided to the UE in an RRC configuration message sent to the UE at the time or after a connection with the base station is established. In another example, the base station may determine the configuration for the transmission pattern and provide the UE with the configuration for the transmission pattern via an explicit downlink signal, such as an RRC configuration signal, a MAC-CE, DCI, etc. In another example, the configuration for the transmission pattern may be implicitly indicated (e.g., linked to some other reference signal/resource set, such as a periodic lean SS and the SSB). In this example, some parameters for the configuration may be overwritten using DCI.

In an aspect, the aperiodic lean SS transmission may be configured (e.g., the configuration for the transmission pattern of the lean SSs) for one or more BWPs. For example, the BWP for the lean SSs may be different than the BWP utilized for the SSB used to establish a connection. In an aspect, the aperiodic lean SS transmission may be configured as UE-specific (e.g., for a particular UE and/or a group of UEs) or cell specific. For example, a particular UE may be informed through RRC messages about configured lean SSs specifically for the particular UE. These RRC messages may contain an RNTI of a UE or a group of UEs along with lean SS parameters.

In an aspect, the aperiodic lean SS transmission may be activated/deactivated by a signal indicating whether to activate or deactivate the aperiodic lean SS transmission. In an aspect, the signal indicating whether to activate or deactivate the aperiodic lean SS transmission may include one or more of a MAC-CE, DCI, an RRC signal, or a paging message. For example, the aperiodic lean SS transmission may be activated/deactivated dynamically (e.g., using MAC-CE or DCI) and/or semi-statically (e.g., using RRC signaling) and/or using a paging message. For example, when the base station generates and/or transmits the signal, the signal may activate or deactivate the aperiodic lean SS transmission, depending on whether the signal indicates to activate or deactivate the aperiodic lean SS transmission. The signal may activate or deactivate the aperiodic lean SS transmission for at least one UE, a group of UEs that include the UE, for one or more particular BWPs, and/or for the whole cell (e.g., for the base station). Accordingly, the aperiodic lean SS transmission may be turned on/off by the base station via dynamic or semi-static signaling or a paging message.

In an aspect, the aperiodic lean SS transmission may be activated/deactivated based on a request from the UE. In another example, the UE may transmit a signal (e.g., a physical uplink control channel (PUCCH) and/or physical uplink shared channel (PUSCH)) to the base station requesting activation or deactivation of the aperiodic lean SS transmission. The UE may explicitly request activation/deactivation using a bit, field, etc., and/or may implicitly request activation/deactivation (e.g., based on a feedback report, associated with a particular buffer status report (BSR), based on a request for beam management/recovery, etc.). In its request, the UE may request a particular parameter(s) for the configuration for the aperiodic lean SS transmission or a particular BWP.

In an aspect, the configuration for the transmission pattern of the aperiodic lean SS transmission may have various associated properties or parameters, as discussed below. For example, a lean SS set may include one or more lean SS symbols in a slot, with the one or more lean SS symbols in the slot spanning one or more slots.

Figure 15:
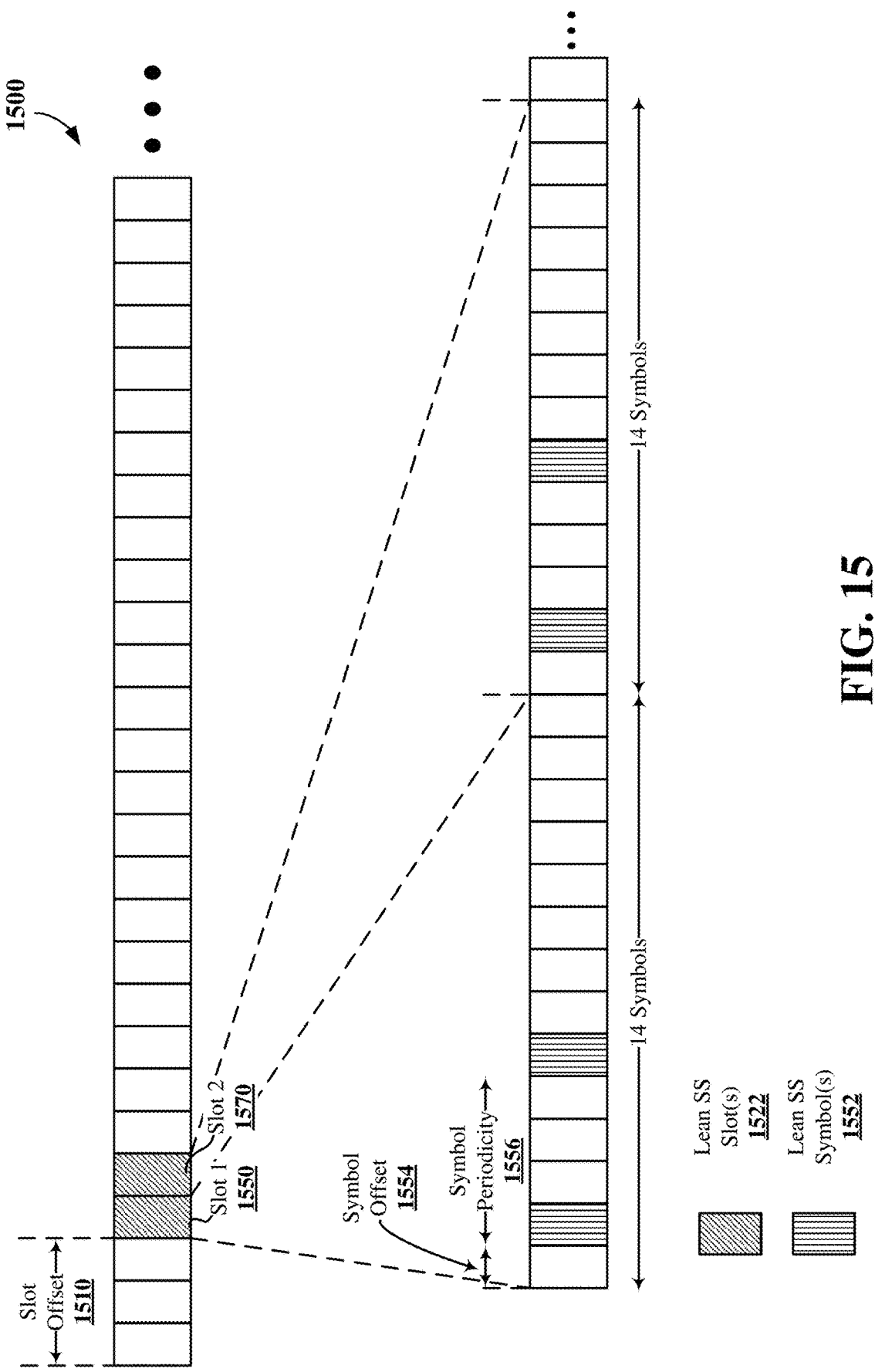
FIG. 15 illustrates an example of a lean SS configuration that supports aperiodic lean synchronization signal transmission, according to an aspect of the disclosure.

FIG. 15 illustrates an example of a lean SS configuration 1500 that supports aperiodic lean synchronization signal transmission, according to an aspect of the disclosure. In some examples, lean SS configuration 1500 may implement aspects of wireless communication systems 100, 200, 300, and/or 700. Aspects of lean SS configuration 1500 may be implemented by a base station and/or a UE, which may be examples of corresponding devices described herein.

In FIG. 15, after a slot offset 1510, aperiodic transmissions of lean SSs begin. Unlike the periodic lean SS transmission illustrated in FIG. 8, aperiodic lean SS transmission may not have a slot periodicity as the lean SS slots 1522 are not periodically repeated indefinitely. Instead, in the example illustrated in FIG. 15, after the aperiodic lean SS transmission during the lean SS slots such as the first lean SS slot 1550 and the second lean SS slot 1570, the base station may not transmit a lean SS.

Each slot has a set number of symbols. In FIG. 15, each slot has 14 symbols. For each lean SS slot, the base station may allocate resources (e.g., symbols) to transmit instances of a lean SS according to a transmission pattern based on the resource allocation, where each instance of the lean SS is transmitted within a corresponding symbol of the lean SS slot. Unlike the periodic lean SS transmission illustrated in FIG. 8, for example, the resources for the aperiodic lean SS transmission may not be repeatedly allocated periodically based on a slot periodicity but may be allocated for specific instances based on a configuration of a transmission pattern for the aperiodic lean SS transmission.

In FIG. 15, the first lean SS slot 1550 has two lean SS symbols 1552 allocated to transmit two instances of the lean SS at particular symbol locations within the first lean SS slot 1550. Further, in FIG. 15, the first symbol in each slot may be considered a symbol offset where a lean SS cannot be scheduled. For example, in the first lean SS slot 1550, the first symbol is a symbol offset 1554 where a lean SS cannot be scheduled. In FIG. 15, a symbol periodicity (e.g., symbol periodicity 1556) of 4 symbols is configured, which indicates a time offset between instances of the lean SS within a lean SS slot. Similarly, the second lean SS slot 1570 has two lean SS symbols 1552 allocated to transmit two instances of the lean SS at particular symbol locations within the second lean SS slot 1570. In some examples, the resource (e.g., lean SS symbol) allocation for the transmission of the lean SS may be the same for the first lean SS slot 1550 and the second lean SS slot 1570. The parameters for the configuration for the transmission pattern of the lean SS may include the symbol offset and/or the symbol periodicity discussed above.

In some aspects, the following properties/parameters may be included in the configuration for the transmission pattern of the lean SS. In an aspect, for each lean SS, there may be one or more instances of transmission within a slot. In an aspect, the base station may allocate the lean SS symbols for transmitting the lean SS in particular locations within a slot. For example, the base station may transmit the lean SS using any combination of one or more particular symbols with a slot, and may not transmit the lean SS using symbols different from these particular symbols within the slot. For example, a first symbol and/or a last symbol in a slot may not be used for transmitting any lean SS, but the rest of the symbols within the slot may be used for transmitting a lean SS.

In an aspect, each type of lean SS may correspond to a respective beam. For example, the base station may allocate lean SS symbols for lean SSs of different types that respectively correspond to multiple transmit beams of the base station. In an aspect, a number of lean SS symbols corresponding to a single beam may be greater than or equal to 1.

In an aspect, the configuration for the transmission pattern of the lean SS may further include the following time structure of the aperiodic lean SS transmission. In an aspect, for each beam for transmitting a corresponding lean SS, one or more instances of the corresponding lean SS may be transmitted consecutively using consecutive symbols. These consecutive symbols may be referred to as a symbol group. The instances of the lean SS may be transmitted consecutively for the purpose of UE reception beam refinement. For example, for each beam i corresponding to a respective lean SS, the number $b_i$ of consecutive symbols for transmitting instances of the respective lean SS may be greater than or equal to one. For example, the parameter for the configuration may include the number $b_i$ of consecutive symbols for transmitting instances of the respective lean SS.

In an aspect, a timing offset (e.g., offset A) may exist between a transmission of one or more instances of a lean SS and a subsequent transmission of one of more instances of another lean SS. For example, the parameter for the configuration may include the timing offset of A symbols that is specified between one symbol group and a subsequent symbol group in the aperiodic transmission of the lean SSs, where A may be an integer greater than or equal to 0. Thus, for example, if a lean SS is transmitted using one or more consecutive symbols and another lean SS is subsequently transmitted using one or more consecutive symbols, a symbol offset between these two transmissions of these two lean SSs may be the timing offset A. The timing offset may be used to properly space the transmissions of different lean SSs for different beams.

FIGS. 16A and 16B are example diagrams of a lean SS configuration that supports aperiodic lean synchronization signal transmission and an implementation of a timing offset between successive beam groups, according to aspects of the disclosure. In FIGS. 16A and 16B, each slot has 14 symbols, and the first symbol of each slot is a reserve symbol 1670 reserved for uses other than transmitting a lean SS. Further, as illustrated in FIGS. 16A and 16B, in each slot, a timing offset (e.g., offset A) exists between successive transmissions of lean SSs for different beam groups.

FIG. 16A is an example diagram 1600 of a lean SS configuration that supports aperiodic lean synchronization signal transmission and a timing offset when a number of symbols per symbol group for each lean SS is one, according to an aspect of the disclosure. In FIG. 16A, 8 different lean SSs for 8 different beams may be transmitted over two slots using respective lean SS symbols, where each lean SS is transmitted once via a single symbol. Thus, $b_i$ in FIG. 16A is 1, where i ranges from 1 to 8 for 8 different beams. In particular, in FIG. 16A, in the first slot 1610, a lean SS corresponding to a beam 1 is transmitted via a lean SS symbol 1672 in a second symbol, a lean SS corresponding to a beam 2 is transmitted via a lean SS symbol 1674 in a fifth symbol, a lean SS corresponding to a beam 3 is transmitted via a lean SS symbol 1676 in a eighth symbol, a lean SS corresponding to a beam 4 is transmitted via a lean SS symbol 1678 in an eleventh symbol, and a lean SS corresponding to a beam 5 is transmitted via a lean SS symbol 1680 in an fourteenth symbol. In the second slot 1620, a lean SS corresponding to a beam 6 is transmitted via a lean SS symbol 1682 in a second symbol, a lean SS corresponding to a beam 7 is transmitted via a lean SS symbol 1684 in a fifth symbol, and a lean SS corresponding to a beam 8 is transmitted via a lean SS symbol 1686 in an eighth symbol. Hence, lean SSs for five beam groups are transmitted in the first slot 1610, and lean SSs for three beam groups are transmitted in the second slot 1620. Further, in FIG. 16A, for each slot, the timing offset A is 2, representing an offset of two symbols between successive transmissions of lean SSs for different beam groups. Thus, in the first slot 1610, the timing offset of 2 symbols exists between the second symbol and the fifth symbol, between the fifth symbol and the eighth symbol, between the eighth symbol and the eleventh symbol, and between the eleventh symbol and the fourteenth symbol. In the second slot 1620, the timing offset of 2 symbols exists between the second symbol and the fifth symbol and between the fifth symbol and the eighth symbol. As shown in FIG. 16A, the timing offset A may not be applied when transitioning from the first slot 1610 to the second slot 1620, and thus the timing offset A is not applied between the fourteenth symbol of the first slot 1610 and the second symbol of the second slot 1620. The aperiodic lean SS transmission ends after the second slot 1620.

FIG. 16B illustrates an example of a lean SS configuration that supports aperiodic lean synchronization signal transmission and a timing offset when a number of symbols per symbol group for each lean SS is four, according to an aspect of the disclosure. In FIG. 16B, 4 different lean SSs for 4 different beams may be transmitted over two slots using respective lean SS symbols, where each lean SS is transmitted consecutively four times via four symbols respectively. Thus, $b_i$ in FIG. 16B is 4, where i ranges from 1 to 4 for 4 different beams. In particular, in FIG. 16B, in the first slot 1640, four instances of a lean SS corresponding to a beam 1 are transmitted via four lean SS symbols 1672 in a second symbol through a fifth symbol and four instances of a lean SS corresponding to a beam 2 are transmitted via four lean SS symbols 1674 in an eighth symbol through an eleventh symbol. In the second slot 1650, four instances of a lean SS corresponding to a beam 3 are transmitted via four lean SS symbols 1676 in a second symbol through a fifth symbol and four instances of a lean SS corresponding to a beam 4 are transmitted via four lean SS symbols 1678 in an eighth symbol through an eleventh symbol. Hence, lean SSs for two beam groups are transmitted in the first slot 1640, and lean SSs for another two beam groups are transmitted in the second slot 1650. Further, in FIG. 16B, for each slot, the timing offset A is 2, representing an offset of two symbols between successive transmissions of lean SSs for different beam groups. Thus, in the first slot 1610, the timing offset of 2 symbols exists between the fifth symbol where the transmission of the lean SS corresponding to the beam 1 ends and the eighth symbol where the transmission of the lean SS corresponding to the beam 2 begins. In the second slot 1620, the timing offset of 2 symbols exists between the fifth symbol where the transmission of the lean SS corresponding to the beam 3 ends and the eighth symbol where the transmission of the lean SS corresponding to the beam 4 begins. The aperiodic lean SS transmission ends after the second slot 1650.

In an aspect, a time density may be configured (e.g., as a parameter for the configuration), where the time density may represent a number of instances of a lean SS being transmitted non-consecutively within a slot. Hence, for example, if a time density is 2 for 3 different lean SSs for 3 respective beams, 2 instances of each of the 3 different lean SSs are transmitted within a slot. For example, different time densities may be defined per slot for different requirements of coarse frequency correction. If there are multiple lean SSs for multiple beams, one time density may be configured for all of the multiple lean SSs or multiple time densities may be configured respectively for the multiple lean SSs. In an example where a time density for a lean SS is 1, only one instance of the lean SS is transmitted within a slot. If the time density for a lean SS is greater than or equal to 2, then two or more instances of the lean SS are transmitted within a slot based on the time density and according to a time density offset (e.g., time density offset B), where the time density offset may represent an offset (e.g., in symbols) between successive transmissions of the multiple instances of the lean SS within a slot. For example, the time density offset B may be an integer greater than or equal to 1. The time density offset may also be a parameter in the configuration. In an example where a time density for a lean SS is 2, two instances of the lean SS are transmitted within a slot, with a time density offset between successive transmissions of the two instances of the lean SS within the slot. In an example where a time density for a lean SS is 3, three instances of the lean SS are transmitted within a slot, with a time density offset between successive transmissions of the three instances of the lean SS within the slot. Further, a timing offset A may exist for a first instance of multiple instances of the lean SSs when the multiple instances of each lean SS is transmitted non-consecutively within a slot, where the timing offset A exists between a transmission of a first instance of one lean SS and a subsequent transmission of a first instance of a subsequent lean SS corresponding to a different beam.

Figure 17:
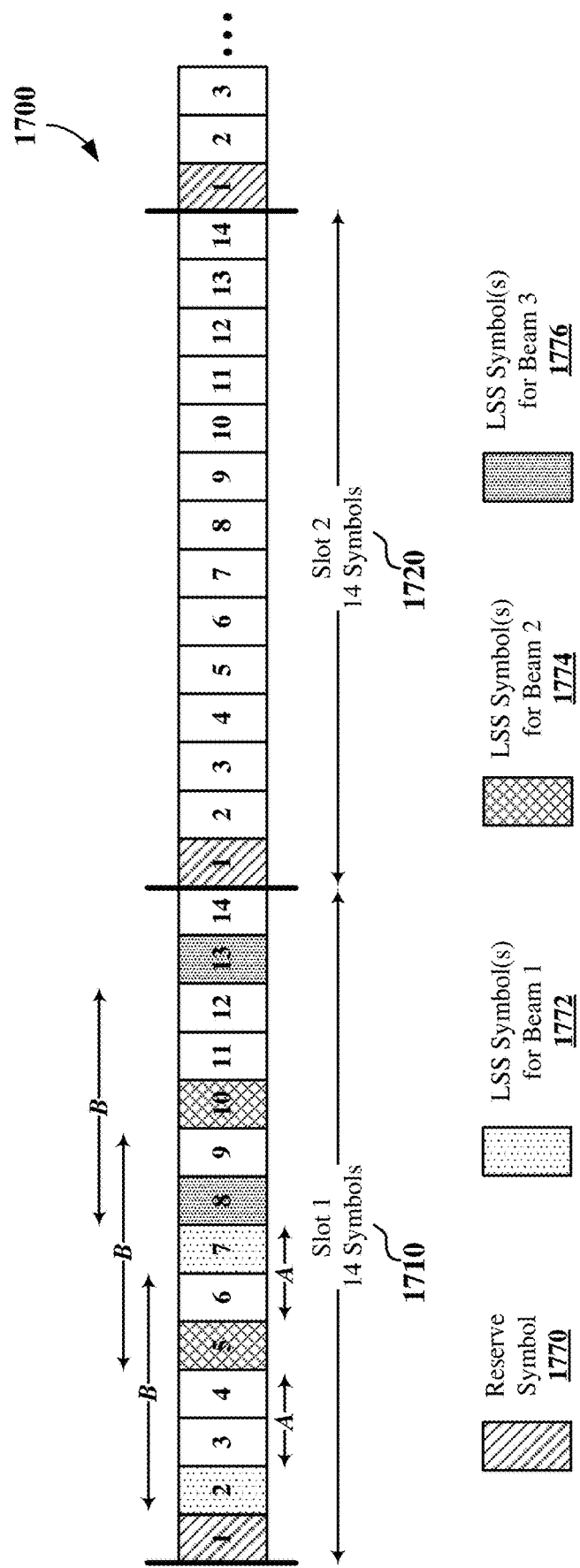
FIG. 17 is an example diagram of a lean SS configuration that supports aperiodic lean synchronization signal transmission and implementation of a timing offset, a time density, and a time density offset, according to an aspect of the disclosure.

FIG. 17 is an example diagram 1700 of a lean SS configuration that supports aperiodic lean synchronization signal transmission and implementation of a timing offset, a time density, and a time density offset, according to an aspect of the disclosure. In FIG. 17, each slot has 14 symbols, and the first symbol of each slot is a reserve symbol 1770 reserved for uses other than transmitting a lean SS. In FIG. 17, 3 different lean SSs for 3 different beams may be transmitted over one slot using respective lean SS symbols, where each lean SS is transmitted non-consecutively twice (e.g., in two instances) via two symbols within a first slot 1710. Thus, because two instances of each lean SS are transmitted non-consecutively within a single slot, in FIG. 17, a time density for each lean SS is 2 and $b_i$ in FIG. 17 is 1, where i ranges from 1 to 3. In FIG. 17, the time density for each lean SS is the same. However, as discussed above, in another configuration not illustrated in FIG. 17, different lean SSs may be associated with different time densities. Further, in FIG. 17, two instances of each lean SS are transmitted within the first slot 1710 based on the time density of 2 and with a time density offset B between the successive transmissions of the two instances of each lean SS. In particular, in the first slot 1710, with the time density of 2 and the time density offset B of 5 symbols, a first instance of a lean SS corresponding to a beam 1 is transmitted via a lean SS symbol 1772 in a second symbol and a second instance of the lean SS corresponding to the beam 1 is transmitted via the lean SS symbol 1772 in a seventh symbol, a first instance of a lean SS corresponding to a beam 2 is transmitted via a lean SS symbol 1774 in a fifth symbol and a second instance of the lean SS corresponding to the beam 2 is transmitted via the lean SS symbol 1774 in a tenth symbol, and a first instance of a lean SS corresponding to a beam 3 is transmitted via a lean SS symbol 1776 in an eighth symbol and a second instance of the lean SS corresponding to the beam 3 is transmitted via the lean SS symbol 1776 in a thirteenth symbol. Further, with the timing offset A of 2 symbols, in the first slot 1710, the offset of 2 symbols exists between the first instance of the lean SS corresponding to the beam 1 in the second symbol and the first instance of the lean SS corresponding to the beam 2 in the fifth symbol, and between the first instance of the lean SS corresponding to the beam 2 in the fifth symbol and the first instance of the lean SS corresponding to beam 3 in the eighth symbol. In FIG. 17, the aperiodic lean SS transmission ends after the first slot 1710, and thus no lean SS may be transmitted in the second slot 1720 and subsequent slots, unless the base station determines to re-activate the aperiodic lean SS transmission.

In an aspect, a time repetition offset may be configured (e.g., as a parameter for the configuration), where the time repetition offset may indicate when a repetition of a transmission of one or more instances of at least one lean SS in a first slot may be performed, e.g., in a subsequent slot. For example, the time repetition offset may be configured to help perform fine frequency estimation. The time repetition offset may be configured as a number C of slots or a number D of symbols. If the time repetition offset indicates a number C of slots, then a transmission of one or more instances of at least one lean SS in the first slot may be repeated C slots after the first slot. If the time repetition offset indicates a number D of symbols, then a transmission of one or more instances of at least one lean SS in the first slot may be repeated D symbols after a first transmission of the transmission of one or more instances of at least one lean SS in the first slot. In an aspect, the time repetition offset may be the same for all lean SSs corresponding to respective beams. Alternatively, in an aspect, different time repetition offsets may be assigned for different lean SSs.

FIGS. 18A and 18B are example diagrams of a lean SS configuration that supports aperiodic lean synchronization signal transmission and an implementation of a timing offset and a time repetition offset, according to aspects of the disclosure. In FIGS. 18A and 18B, each slot has 14 symbols, and the first symbol of each slot is a reserve symbol 1870 reserved for uses other than transmitting a lean SS. Further, as illustrated in FIGS. 18A and 18B, in each slot, a timing offset (e.g., offset A) exists between successive transmissions of lean SSs for different beam groups.

FIG. 18A is an example diagram 1800 of a lean SS configuration that supports aperiodic lean synchronization signal transmission and an implementation of a timing offset and a time repetition offset, according to an aspect of the disclosure. In FIG. 18A, 4 different lean SSs for 4 different beams may be transmitted in a first slot 1810 using respective lean SS symbols, where each lean SS is transmitted once via a single symbol. Thus, $b_i$ in FIG. 18A is 1, where i ranges from 1 to 4. In particular, in FIG. 18A, in the first slot 1810, a lean SS corresponding to a beam 1 is transmitted via a lean SS symbol 1872 in a second symbol, a lean SS corresponding to a beam 2 is transmitted via a lean SS symbol 1874 in a fifth symbol, a lean SS corresponding to a beam 3 is transmitted via a lean SS symbol 1876 in an eighth symbol, and a lean SS corresponding to a beam 4 is transmitted via a lean SS symbol 1878 in an eleventh symbol. Further, this transmission of the lean SSs in the first slot 1810 may be repeated in a second slot 1820, according to the time repetition offset. In FIG. 18A, the time repetition offset may be set to C=1 slot or equivalently D=14 symbols. If the time repetition offset is set to C=1 slot, the transmission of the lean SSs in the first slot 1810 is repeated 1 slot later (e.g., 1 slot after a first transmission of the lean SS in the second symbol of the first slot 1810), in the second slot 1820. Similarly, if the time repetition offset is set to D=14 symbols, the transmission of the lean SSs in the first slot 1810 is repeated 14 symbols after a first transmission of the lean SSs which occurs in the second symbol of the first slot 1810. In both cases (C=1 slot and D=14 symbols), the transmission is repeated in the second slot 1820 with a 1 slot offset or equivalently a 14 symbol offset under the basis that one slot contains 14 symbols. In particular, in the second slot 1820, a lean SS corresponding to a beam 1 is transmitted via a lean SS symbol 1872 in a second symbol, a lean SS corresponding to a beam 2 is transmitted via a lean SS symbol 1874 in a fifth symbol, a lean SS corresponding to a beam 4 is transmitted via a lean SS symbol 1876 in an eighth symbol, and a lean SS corresponding to a beam 4 is transmitted via a lean SS symbol 1878 in an eleventh symbol.

Further, in FIG. 18A, for each slot, the timing offset A is 2, representing an offset of two symbols between successive transmissions of lean SSs for different beam groups. Thus, in the first slot 1810, the timing offset of 2 symbols exists between the second symbol and the fifth symbol, between the fifth symbol and the eighth symbol, and between the eighth symbol and the eleventh symbol. The aperiodic lean SS transmission ends after the second slot 1820.

FIG. 18B is an example diagram 1830 of a lean SS configuration that supports aperiodic lean synchronization signal transmission and an implementation of a timing offset and a time repetition offset, according to an aspect of the disclosure. In FIG. 18B, 4 different lean SSs for 4 different beams may be transmitted in a first slot 1840 using respective lean SS symbols, where each lean SS is transmitted once via a single symbol. Thus, $b_i$ in FIG. 18B is 1, where i ranges from 1 to 4. In particular, in FIG. 18B, in the first slot 1840, a lean SS corresponding to a beam 1 is transmitted via a lean SS symbol 1872 in a second symbol, a lean SS corresponding to a beam 2 is transmitted via a lean SS symbol 1874 in a fifth symbol, a lean SS corresponding to a beam 3 is transmitted via a lean SS symbol 1876 in an eighth symbol, and a lean SS corresponding to a beam 4 is transmitted via a lean SS symbol 1878 in an eleventh symbol. Further, this transmission of the lean SSs in the first slot 1840 may be repeated in a second slot 1850, according to the time repetition offset. In FIG. 18B, the time repetition offset is set to D=16 symbols. Hence, the transmission of the lean SSs in the first slot 1840 is repeated 16 symbols after a first transmission of the lean SSs which occurs in the second symbol of the first slot 1840. In particular, in the second slot 1850, a lean SS corresponding to a beam 1 is transmitted via a lean SS symbol 1872 in a fourth symbol, a lean SS corresponding to a beam 2 is transmitted via a lean SS symbol 1874 in a seventh symbol, a lean SS corresponding to a beam 4 is transmitted via a lean SS symbol 1876 in a tenth symbol, and a lean SS corresponding to a beam 4 is transmitted via a lean SS symbol 1878 in a thirteenth symbol.

Further, in FIG. 18B, for each slot, the timing offset A is 2, representing an offset of two symbols between successive transmissions of lean SSs for different beam groups. Thus, in the first slot 1840, the timing offset of 2 symbols exists between the second symbol and the fifth symbol, between the fifth symbol and the eighth symbol, and between the eighth symbol and the eleventh symbol. The aperiodic lean SS transmission ends after the second slot 1850.

Figure 19:
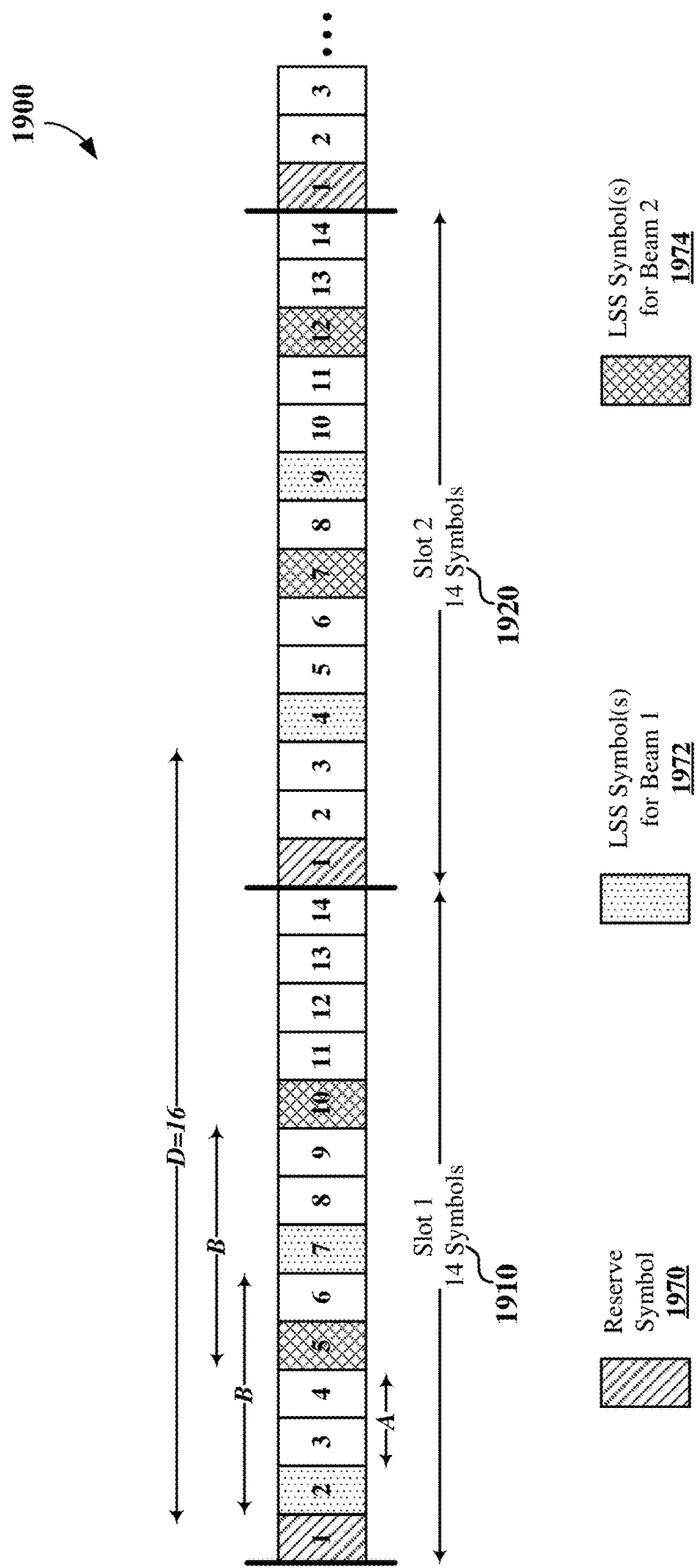
FIG. 19 is an example diagram of a lean SS configuration that supports aperiodic lean synchronization signal transmission and an implementation of a timing offset, a time density, a time density offset, and a time repetition offset, according to an aspect of the disclosure.

FIG. 19 is an example diagram 1900 of a lean SS configuration that supports aperiodic lean synchronization signal transmission and an implementation of a timing offset, a time density, a time density offset, and a time repetition offset, according to an aspect of the disclosure. In FIG. 19, each slot has 14 symbols, and the first symbol of each slot is a reserve symbol 1970 reserved for uses other than transmitting a lean SS. In FIG. 19, 2 different lean SSs for 2 different beams may be transmitted over one slot using respective lean SS symbols, where each lean SS is transmitted non-consecutively twice (e.g., in two instances) via two symbols within a first slot 1910. Thus, because two instances of each lean SS are transmitted non-consecutively within a single slot, in FIG. 19, a time density for each lean SS is 2 and $b_i$ in FIG. 19 is 1, where i ranges from 1 to 2. In FIG. 19, the time density for each lean SS is the same. However, as discussed above, in another configuration not illustrated in FIG. 19, different lean SSs may be associated with different time densities. Further, in FIG. 19, two instances of each lean SS are transmitted within the first slot 1910 based on the time density of 2 and with a time density offset B between the successive transmissions of the two instances of each lean SS. In particular, in the first slot 1910, with the time density of 2 and the time density offset B of 5 symbols, a first instance of a lean SS corresponding to a beam 1 is transmitted via a lean SS symbol 1972 in a second symbol and a second instance of the lean SS corresponding to the beam 1 is transmitted via the lean SS symbol 1972 in a seventh symbol, while a first instance of a lean SS corresponding to a beam 2 is transmitted via a lean SS symbol 1974 in a fifth symbol and a second instance of the lean SS corresponding to the beam 2 is transmitted via the lean SS symbol 1974 in a tenth symbol. Further, with the timing offset A of 2 symbols, in the first slot 1910, the offset of 2 symbols exists between the first instance of the lean SS corresponding to the beam 1 in the second symbol and the first instance of the lean SS corresponding to the beam 2 in the fifth symbol.

Further, this transmission of the lean SSs in the first slot 1910 may be repeated in a second slot 1920, according to the time repetition offset. In FIG. 19, the time repetition offset is set to D=16 symbols. Hence, the transmission of the lean SSs in the first slot 1910 is repeated 16 symbols after a first transmission of the lean SSs which occurs in the second symbol of the first slot 1910. In particular, in the second slot 1920, a lean SS corresponding to a beam 1 is transmitted via a lean SS symbol 1972 in a fourth symbol and a ninth symbol, and a lean SS corresponding to a beam 2 is transmitted via a lean SS symbol 1974 in a seventh symbol and a twelfth symbol. In FIG. 19, the aperiodic lean SS transmission ends after the second slot 1920.

In an aspect, when the UE receives a lean SS transmission (e.g., via the aperiodic lean SS transmission), the UE may manage a connection with the base station based on the received instances of the lean SS. For example, the UE may perform beam management and/or time/frequency tracking for its established connection with the base station using the lean SS.

In an aspect, the UE may perform a beam refinement of UE reception beams based on the lean SS received via the aperiodic lean SS transmission. For example, the UE may perform the beam refinement based on consecutive transmissions of each lean SS of lean SSs corresponding to different beams, where the number $b_i$ of consecutive symbols for transmitting instances of each lean SS is greater than one. In an aspect, the UE may determine reception conditions of UE reception beams based on the reception of the instances of the lean SSs corresponding to different beams, and select a reception beam out of the UE reception beams based on the reception conditions. For example, the UE (or base station) may select a UE reception beam that provides the best reception condition (e.g., highest signal strength or received power). The UE may utilize the selected reception beam to communicate with the base station.

In an aspect, the UE may perform a beam refinement of the base station transmit beams based on the lean SS received via the aperiodic lean SS transmission. In an aspect, the base station may configure aperiodic lean SSs corresponding to multiple transmit beams such that the UE may determine the best base station transmit beam out of the multiple transmit beams. In an aspect, the UE may determine conditions of reception of instances of each lean SS of multiple lean SSs corresponding to multiple transmit beams, and transmit the conditions of the reception to the base station, such that the base station may select a transmit beam out of the multiple transmit beams based on the conditions of the reception. For example, the base station may select a base station transmit beam that provides the best reception condition (e.g., highest signal strength or received power). The base station may utilize the selected transmit beam to communicate with the UE.

Figure 20:
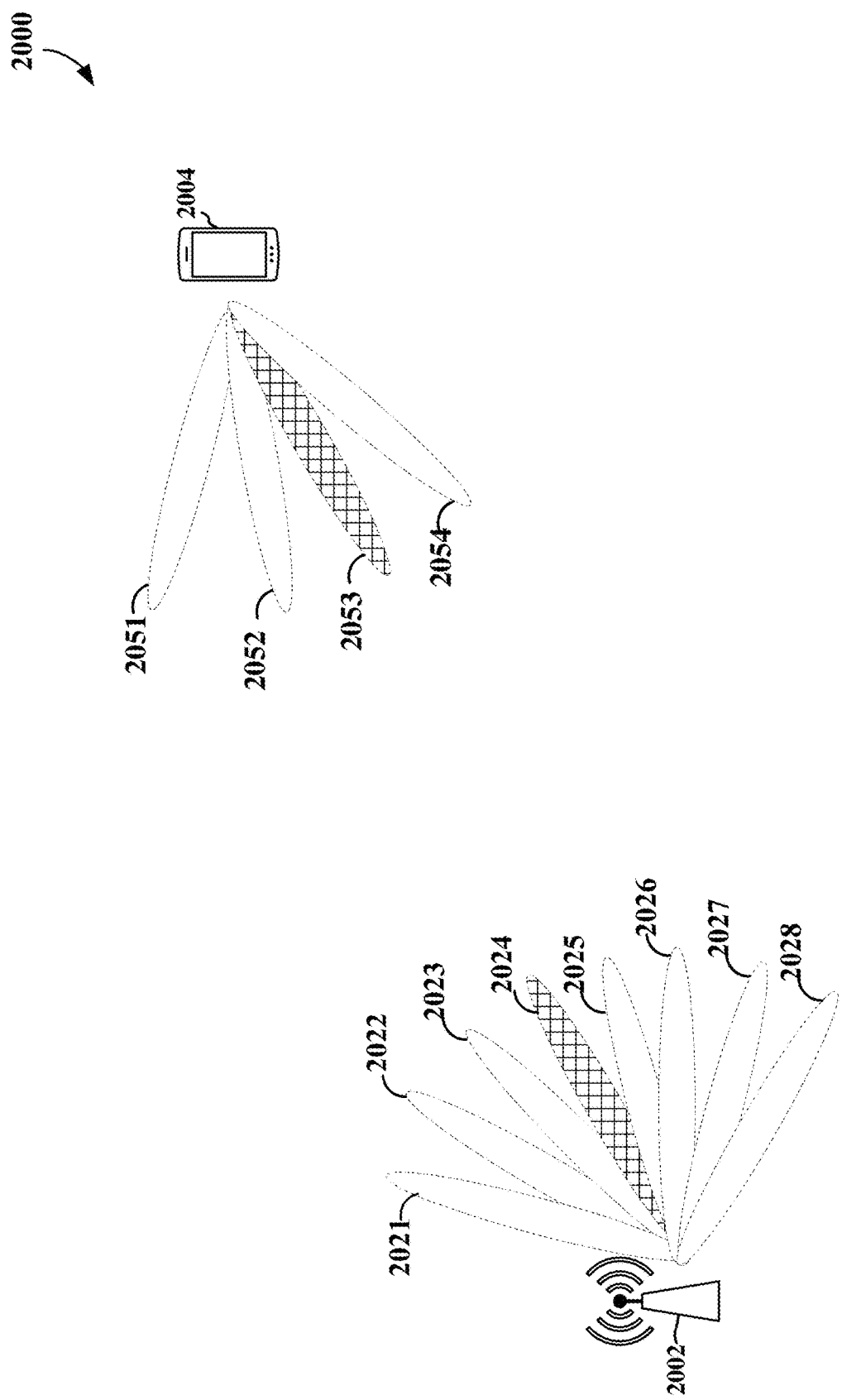
FIG. 20 is an example diagram illustrating beam refinement using the aperiodic lean SS transmission, according to an aspect of the disclosure.

FIG. 20 is an example diagram 2000 illustrating beam refinement using the aperiodic lean SS transmission, according to an aspect of the disclosure. Referring to FIG. 20, the base station 2002 may transmit a beamformed signal to the UE 2004 in multiple transmit directions using transmit beams 2021-2028. The UE 2004 may receive the beamformed signal from the base station 2002 in multiple reception directions using reception beams 2051-2054. In FIG. 20, the UE 2004 determines reception conditions of the reception beams 2051-2054 based on the reception of the instances of lean SSs transmitted from the base station 2002, and selects a reception beam 2053 based on the reception conditions. Further, in FIG. 20, the UE 2004 determines conditions of reception of instances of each lean SS of lean SSs corresponding to transmit beams 2021-2028, and transmits the conditions of reception to the base station 2002, such that the base station 2002 selects the transmit beam 2024 based on the conditions of the reception.

In an aspect, the UE may perform frequency tracking on a connection between the UE and the base station based on reception of the aperiodic lean SS transmission. For example, the base station may configure the time density and the time repetition of the aperiodic lean SS transmission such that the UE may acquire coarse and fine frequency estimates for the frequency tracking/correction.

Figure 21:
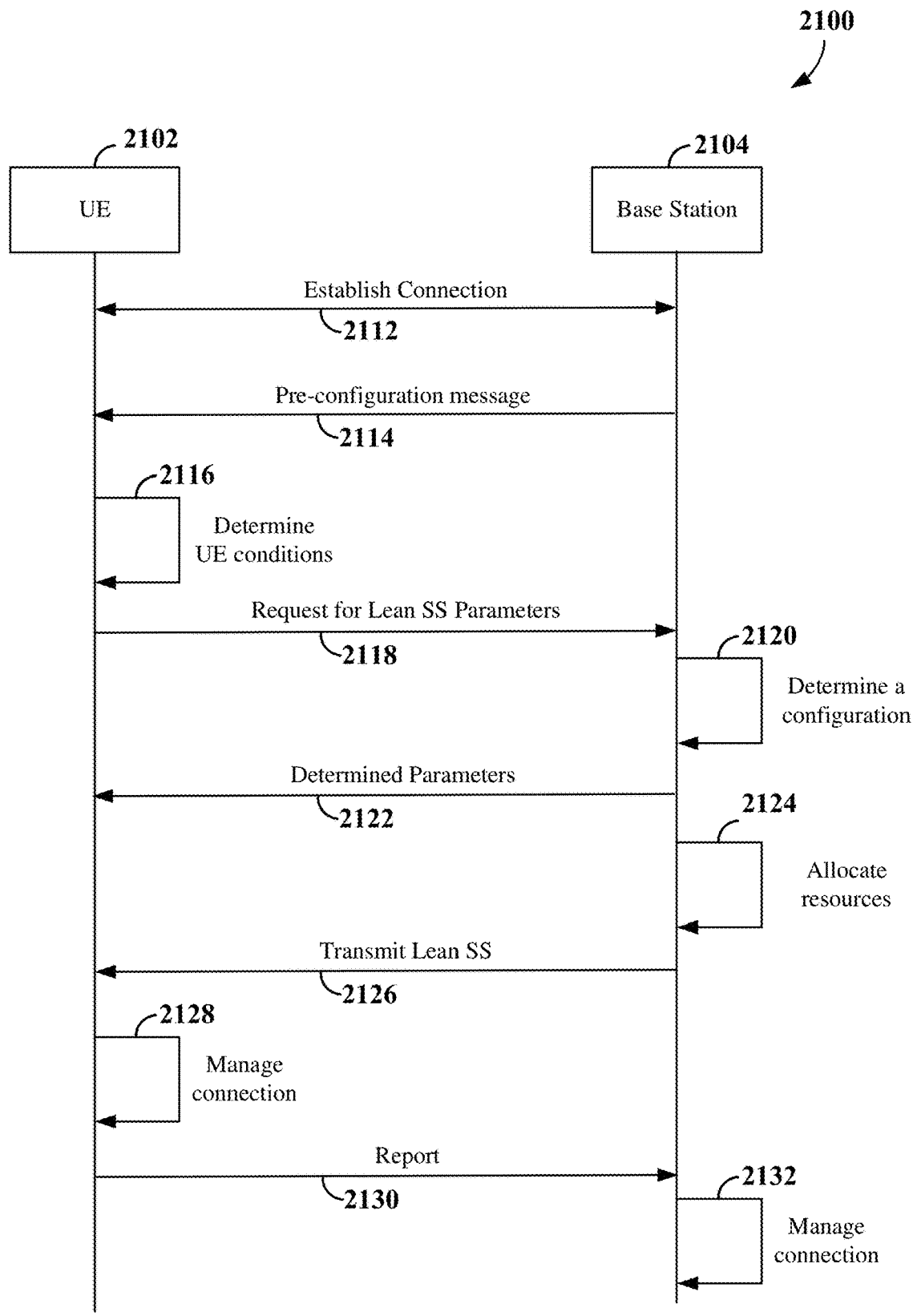
FIG. 21 is a signaling diagram illustrating exemplary signaling to perform aperiodic transmission of one or more lean synchronization signals, according to some aspects of the disclosure.

FIG. 21 is a signaling diagram illustrating exemplary signaling to perform aperiodic transmission of one or more lean synchronization signals, according to some aspects of the disclosure. In the example shown in FIG. 21, a base station 2104 performs aperiodic lean SS transmission to a UE 2102. The base station 2104 may correspond to any of the base stations (e.g., gNB, eNB, etc.) or scheduling entities as shown in FIGS. 1-3, 5, 7, and 14. In addition, the UE 2102, which may hereinafter be referred to generally as a device, may correspond to any of the UEs or scheduled entities as shown in FIGS. 1-3, 5, 7, and 14.

At 2112, the UE 2102 establishes a connection with the base station 2104. The UE 2102 may establish the connection based on SSBs received from the base station 2104, as described above.

At 2114, the base station 2104 may send a pre-configuration message including one or more parameters for a lean SS to the UE 2102. For example, as the pre-configuration message, the base station 2104 may transmit an RRC message with an RRC configuration and/or DCI and/or MAC-CE. The RRC configuration may include the one or more parameters for a lean SS. The one or more parameters may include one or more of BWP information, a symbol location, a number of beams that correspond to different lean SSs, a timing offset, a number of consecutive symbols, a time density, a time repetition value, etc.

At 2116, the UE 2102 may determine UE conditions. The UE conditions may include UE mobility (e.g., how fast the UE is moving, rotation of the UE and/or a direction the UE is facing), obstructions associated with the UE, etc. At 2118, the UE 2102 may transmit a parameter request to the base station 2104, where the parameter request includes one or more parameters for a configuration for the aperiodic lean SS transmission to request the base station 2104 may consider for a configuration, where the parameters may be based on the UE conditions.

At 2120, the base station 2104 may determine a configuration for the aperiodic lean SS transmission. The base station 2104 may determine the configuration based on the parameters received from the UE 2102 via the parameter request and/or based on other information/pre-configuration available to the base station 2104.

At 2122, the base station 2104 may transmit a message to the UE 2102, where the message includes the parameters associated with the configuration determined by the base station 2104.

At 2124, the base station 2104 may allocate resources for the aperiodic lean SS transmission based on the configuration. The examples of the resource allocation based on the configuration are discussed above with references to various parameters for the configuration. At 2126, the base station 2104 performs the aperiodic lean SS transmission to the UE 2102 using the allocated resources.

At 2128, after the UE 2102 receives the aperiodic lean SS transmission, the UE 2102 may manage the connection between the UE 2102 and the base station 2104 based on the reception of the aperiodic lean SS transmission. This may involve the UE 2102 making measurements of the aperiodic lean SS transmission. For example, as discussed above, the UE 2102 may manage the connection by performing receive beam refinement and/or frequency tracking.

At 2130, the UE 2102 may transmit a report to the base station 2104, where the report may include any measurements made for managing the connection (e.g., measurements of the aperiodic lean SS transmission).

At 2132, the base station 2104 may manage the connection between the base station 2104 and the UE 2102. For example, the base station 2104 may manage the connection by performing transmit beam refinement and/or frequency tracking.

In some examples, a UE such as a scheduled entity (e.g., UE 106) may request a lean SSB from a base station (e.g., BS 108), wherein the lean SSB request signal from the UE includes data indicating one or more desired configuration parameters for the UE. During operation, the UE may monitor existing network and/or communication conditions (e.g., internal metrics measured by the UE and/or network-configured thresholds) using communication circuitry, and process the monitored data to determine if the existing configuration of the UE is optimized for the monitored network and/or communication conditions. The UE may then transmit a lean SSB request signal indicating a request for resources for optimizing communications, such as quality-of-service (QoS) requirements, synchronization, beam management (BM), beam failure detection (BFD), beam failure recovery (BFR), and so on. The UE may utilize intelligence configured in the processor to infer optimal resources as well.

The configuration parameters that may be requested by the UE, together with the lean SSB request include, but are not limited to, a number and index of specific downlink beams, a number of lean SSB symbols per beam, periodicity and other configuration parameters of periodic lean SSB signal, specific time-density and/or time-repetition of aperiodic lean SSB signal, specific symbols in which to transmit lean SSB symbols, receiving lean SSB to operate in one or more BWPs, time and/or frequency synchronization targets, and estimates of optimized beam directions and/or their efficiency.

In some examples, the UE may be configured to trigger a lean SSB request and resource request based on an optimization configuration (e.g., UE conforming to configuration parameters), where, for example, the lean SSB request and resource request is triggered when the processor (of the UE) determines that network and/or communication conditions are below one or more optimization thresholds. Alternately or in addition, the UE may transmit the lean SSB request and resource request on a periodic or aperiodic schedule, depending on the application. By configuring the UE to measure network and/or communication conditions and transmit lean SSB requests based on those measurements, this allows the UE to react to network/communication conditions and reduce the UE's waiting time for receiving allocated resources from the base station. Further, as the UE will have more current data regarding network/communication conditions, such as throughput, channel conditions, speed and/or time/frequency synchronization requirements, compared to the base station, quicker and more accurate resource allocation may be achieved. In examples where the UE is a reduced capability device (e.g., surveillance camera) and is configured in a stationary position, further efficiencies are introduced by allowing for UE requested resources and reducing "always-on" signaling.

Figure 22:
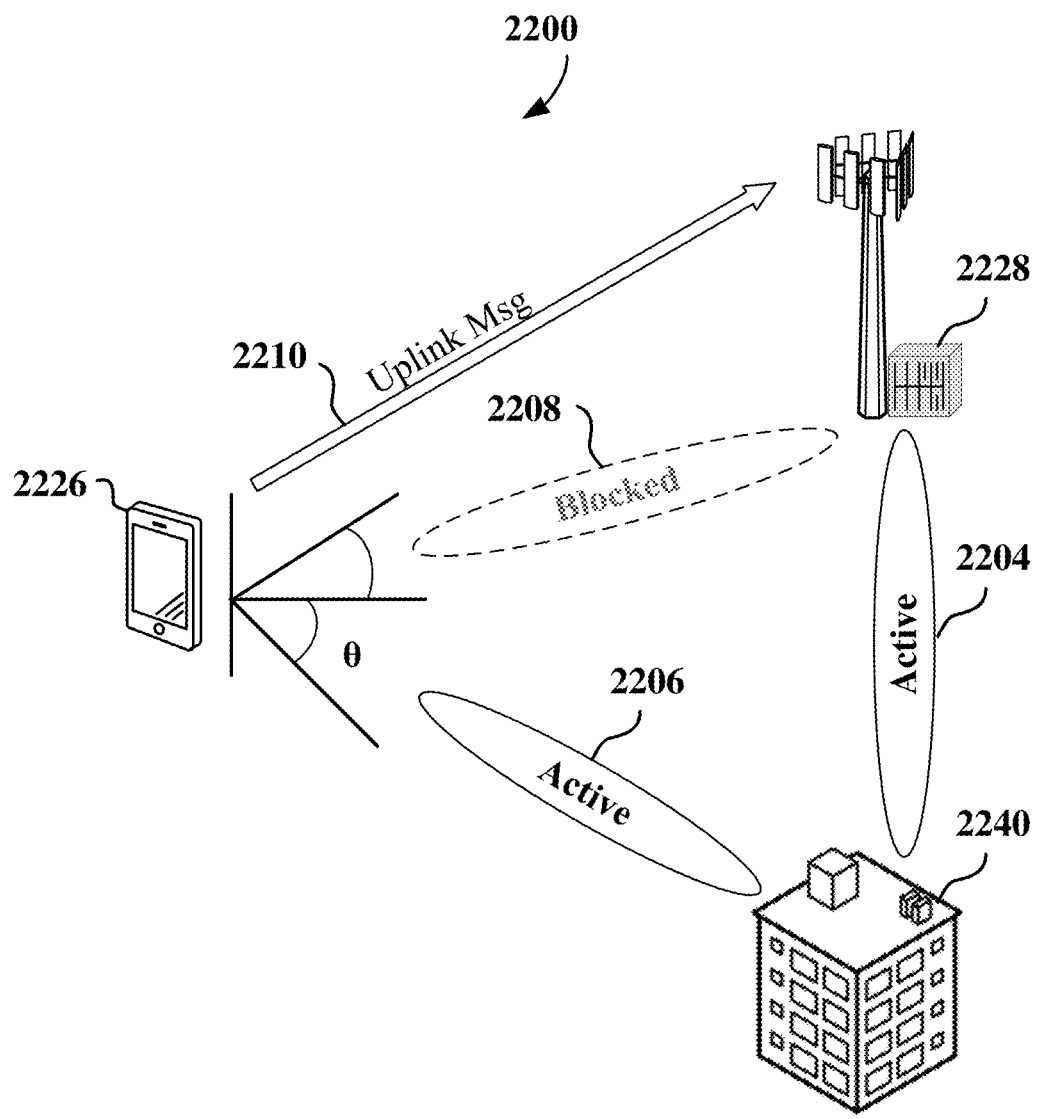
FIG. 22 illustrates an operating environment for a UE to request lean SSB resources from a base station in accordance with aspects of the present disclosure.

FIG. 22 illustrates an operating environment 2200 for a UE 2226 to request lean SSB resources from a base station 2228 according to some aspects. In this example, the UE 2226 may be a UE configured as a reduced capability UE, or other configuration that allows the UE 2226 to communicate via lean SSB. During operation, the UE 2226 may be in communication with base station 2228 via beam 2208, which subsequently becomes blocked or otherwise impeded (e.g., via an object that blocks or disrupts the communications). At this point, there may not be communication (e.g., L1 communication) scheduled on the uplink to allow the UE 2226 to indicate to the base station 2228 that the beam 2208 has been blocked.

After the UE 2226 determines the beam 2208 is blocked or impeded (e.g., via SINR, RSRP measurements), the UE 2226 may then determine if other beams are available for communication. This determination may be made from other beams that are simultaneously being transmitted with beam 2208. Alternately or in addition, the determination may be made from a beam history stored on the UE 2226 that lists or indicates previous or secondary beams (e.g., 2206) in which the UE 2226 has communicated with the base station 2228. In the example of FIG. 22, the UE 2226 identifies and/or determines beam 2206 that is suitable for communication with base station 2228. In this example, while the beam 2206 is shown as a reflection of beam 2204 from building 2230, a person of ordinary skill in the art will appreciate that beam 2206 may be received by UE 2226 via other modes of communication, including a direct connection with base station 2228.

Once the new beam (2206) is identified, the UE may then transmit a lean SSB request as an uplink message 2210 that includes requested configuration parameters (e.g., a number and index of specific downlink beams, a number of lean SSB symbols per beam, etc.) for operation. As a simplified example, the UE 2226 may send a configuration request Config_req=[Beam_Angle=θ, A-LSSB (b=2)] on the uplink message 2210 for an aperiodic lean SSB (A-LSSB) to be communicated on a beam having a beam angle θ (e.g., beam 2206), with specified beam symbols b=2. By specifying a beam angle θ, the UE 2226 is indicating to the base station 2228 that the beam angle θ is the UE's current best estimate of a favorable beam direction to receive an aperiodic lean SSB on. Similarly, the UE 2226 is requesting b=2 number of symbols per beam in an aperiodic lean SSB based on its current SNR, beam update and/or another requirement. A person of ordinary skill in the art will appreciate that other alternate and/or additional configuration parameters may be transmitted on the uplink message 2210. For example, the UE 2226 may request a periodic lean SSB with a desired configuration, an aperiodic lean SSB with a desired configuration, or a generic lean SSB request, indicating a QoS requirement, and allowing the base station 2228 to determine the lean SSB configuration, based on the QoS requirement. The base station 2228 may determine the specific configuration of the lean SSB based on UE data history (communication history) stored in a database and/or UE-reported information, where the UE data history may be associated with the UE 2226.

As mentioned above, the UE may request a lean SSB on any uplink resource, including PUSCH, PUCCH or PRACH, and may request configuration parameters explicitly, through a codebook (e.g., precoding matrix), or by transmitting a specific set of uplink signals. The UE's request for lean SSB may be made when certain communication/network conditions are met, such as UE internal metrics, or network-configured thresholds. For example, network-configured thresholds may include, but are not limited to, a determination that the UE is going out of sync in frequency or time, beam failure detection/recovery, where the UE requires to switch beams or update beam parameters, and/or if beam quality (e.g., RSRP) falls below a configured threshold. After receiving the lean SSB request from the UE, the base station may accept and allocate resources for communicating a lean SSB as per the UE's request, modify the request and allocate resources, or may ignore the UE's request.

Figure 23:
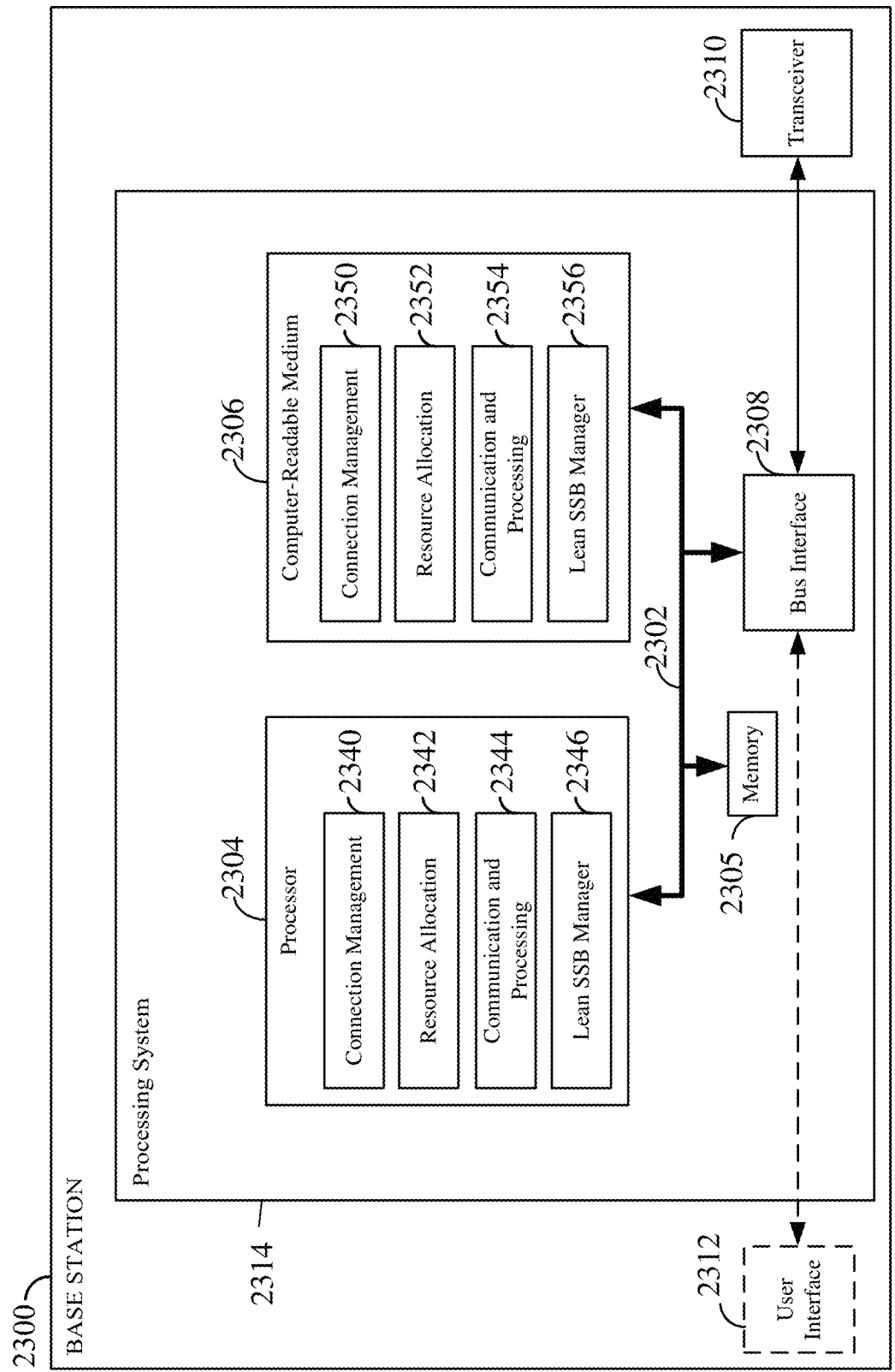
FIG. 23 is a conceptual diagram illustrating an example of a hardware implementation for an exemplary base station employing a processing system.

FIG. 23 is a conceptual diagram illustrating an example of a hardware implementation for an exemplary base station 2300 employing a processing system 2314. In accordance with various aspects of the disclosure, an element, or any portion of an element, or any combination of elements may be implemented with a processing system 2314 that includes one or more processors 2304. For example, the base station 2300 may be a base station as illustrated in any one or more of FIGS. 1-3, 5, 7, 11-14, and 20-22.

The base station 2300 may be implemented with a processing system 2314 that includes one or more processors 2304. Examples of processors 2304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 2300 may be configured to perform any one or more of the functions described herein. That is, the processor 2304, as utilized in a base station 2300, may be used to implement any one or more of the processes and procedures described below and illustrated in FIGS. 24-26.

The processor 2304 may in some instances be implemented via a baseband or modem chip and in other implementations, the processor 2304 may itself comprise a number of devices distinct and different from a baseband or modem chip (e.g., in such scenarios as may work in concert to achieve aspects discussed herein). And as mentioned above, various hardware arrangements and components out-side of a baseband modem processor can be used in implementations, including RF-chains, power amplifiers, modulators, buffers, interleavers, adders/summers, etc.

In this example, the processing system 2314 may be implemented with a bus architecture, represented generally by the bus 2302. The bus 2302 may include any number of interconnecting buses and bridges depending on the specific application of the processing system 2314 and the overall design constraints. The bus 2302 communicatively couples together various circuits including one or more processors (represented generally by the processor 2304), a memory 2305, and computer-readable media (represented generally by the computer-readable storage medium 2306). The bus 2302 may also link various other circuits such as timing sources, peripherals, voltage regulators, and power management circuits, which are well known in the art, and therefore, will not be described any further. A bus interface 2308 provides an interface between the bus 2302 and a transceiver 2310. The transceiver 2310 provides a communication interface or means for communicating with various other apparatus over a transmission medium. Depending upon the nature of the apparatus, a user interface 2312 (e.g., keypad, display, speaker, microphone, joystick) may also be provided. Of course, such a user interface 2312 is optional, and may be omitted in some examples, such as a base station.

The processor 2304 is responsible for managing the bus 2302 and general processing, including the execution of software stored on the computer-readable storage medium 2306. The software, when executed by the processor 2304, causes the processing system 2314 to perform the various functions described below for any particular apparatus. The computer-readable storage medium 2306 and the memory 2305 may also be used for storing data that is manipulated by the processor 2304 when executing software.

One or more processors 2304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 2306.

The computer-readable storage medium 2306 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 2306 may reside in the processing system 2314, external to the processing system 2314, or distributed across multiple entities including the processing system 2314. The computer-readable storage medium 2306 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the processor 2304 may include circuitry configured for various functions. For example, the processor 2304 may include connection management circuitry 2340 configured for various functions, including, for example, establishing a connection with the at least one UE based at least in part on the synchronization signal block from the base station. For example, the connection management circuitry 2340 may be configured to implement one or more of the functions described below in relation to FIGS. 24-25, including, e.g., blocks 2402 and 2502. The connection management circuitry 2340 may further be configured to execute connection management software/instructions 2350 stored in the computer-readable storage medium 2306 to perform one or more of the functions described below in relation to FIGS. 24-25, including, e.g., blocks 2402 and 2502.

In some aspects, the connection management circuitry 2340 may be configured for various functions, including, for example, transmitting a pre-configuration message including one or more parameters for a configuration. For example, the connection management circuitry 2340 may be configured to implement one or more of the functions described below in relation to FIG. 25, including, e.g., block 2504. The connection management circuitry 2340 may further be configured to execute connection management software/instructions 2350 stored in the computer-readable storage medium 2306 to perform one or more of the functions described below in relation to FIG. 25, including, e.g., block 2504.

In some aspects, the connection management circuitry 2340 may be configured for various functions, including, for example, receiving a signal requesting whether to activate or deactivate the one or more instances of the synchronization. For example, the connection management circuitry 2340 may be configured to implement one or more of the functions described below in relation to FIG. 25, including, e.g., block 2506. The connection management circuitry 2340 may further be configured to execute connection management software/instructions 2350 stored in the computer-readable storage medium 2306 to perform one or more of the functions described below in relation to FIG. 25, including, e.g., block 2506.

In some aspects, the connection management circuitry 2340 may be configured for various functions, including, for example, receiving, from the at least one UE, one or more parameters for the configuration. For example, the connection management circuitry 2340 may be configured to implement one or more of the functions described below in relation to FIG. 25, including, e.g., block 2508. The connection management circuitry 2340 may further be configured to execute connection management software/instructions 2350 stored in the computer-readable storage medium 2306 to perform one or more of the functions described below in relation to FIG. 25, including, e.g., block 2508.

In some aspects, the connection management circuitry 2340 may be configured for various functions, including, for example, determining a configuration for a transmission pattern for the at least one synchronization signal. For example, the connection management circuitry 2340 may be configured to implement one or more of the functions described below in relation to FIG. 25, including, e.g., block 2510. The connection management circuitry 2340 may further be configured to execute connection management software/instructions 2350 stored in the computer-readable storage medium 2306 to perform one or more of the functions described below in relation to FIG. 25, including, e.g., block 2510.

In some aspects, the connection management circuitry 2340 may be configured for various functions, including, for example, providing the configuration to the at least one UE via at least one of a downlink message or an implicit indication associated with another signal configured for the at least one UE, wherein the configuration is pre-configured for the at least one UE and the base station or is generated by the base station. For example, the connection management circuitry 2340 may be configured to implement one or more of the functions described below in relation to FIG. 25, including, e.g., block 2512. The connection management circuitry 2340 may further be configured to execute connection management software/instructions 2350 stored in the computer-readable storage medium 2306 to perform one or more of the functions described below in relation to FIG. 25, including, e.g., block 2512.

In some aspects of the disclosure, the processor 2304 may include resource allocation circuitry 2342 configured for various functions, including, for example, allocating a plurality of time resources for aperiodic transmission of one or more instances of at least one synchronization signal different from a synchronization signal block transmitted by the base station. For example, the resource allocation circuitry 2342 may be configured to implement one or more of the functions described below in relation to FIGS. 24-25, including, e.g., blocks 2404 and 2514. The resource allocation circuitry 2342 may further be configured to execute resource allocation software/instructions 2352 stored in the computer-readable storage medium 2306 to perform one or more of the functions described below in relation to FIGS. 24-25, including, e.g., blocks 2404 and 2514.

In some aspects, the resource allocation circuitry 2342 may be configured for various functions, including, for example, transmitting a signal indicating whether to activate or deactivate the one or more instances of the at least one synchronization signal to the at least one UE. For example, the resource allocation circuitry 2342 may be configured to implement one or more of the functions described below in relation to FIG. 25, including, e.g., block 2516. The resource allocation circuitry 2342 may further be configured to execute resource allocation software/instructions 2352 stored in the computer-readable storage medium 2306 to perform one or more of the functions described below in relation to FIG. 25, including, e.g., block 2516.

In some aspects, the resource allocation circuitry 2342 may be configured for various functions, including, for example, activating transmission of the one or more instances of the synchronization signal if the signal indicates to activate the one or more instances of the at least one synchronization signal. For example, the resource allocation circuitry 2342 may be configured to implement one or more of the functions described below in relation to FIG. 25, including, e.g., block 2554. The resource allocation circuitry 2342 may further be configured to execute resource allocation software/instructions 2352 stored in the computer-readable storage medium 2306 to perform one or more of the functions described below in relation to FIG. 25, including, e.g., block 2554.

In some aspects, the resource allocation circuitry 2342 may be configured for various functions, including, for example, deactivating the transmission of the one or more instances of the synchronization signal if the signal indicates to deactivate the one or more instances of the at least one synchronization signal. For example, the resource allocation circuitry 2342 may be configured to implement one or more of the functions described below in relation to FIG. 25, including, e.g., block 2556. The resource allocation circuitry 2342 may further be configured to execute resource allocation software/instructions 2352 stored in the computer-readable storage medium 2306 to perform one or more of the functions described below in relation to FIG. 25, including, e.g., block 2556.

In some aspects of the disclosure, the processor 2304 may include communication and processing circuitry 2344 configured for various functions, including, for example, transmitting the aperiodic transmission of the one or more instances of the at least one synchronization signal to at least one user equipment (UE) using the plurality of time resources. For example, the communication and processing circuitry 2344 may be configured to implement one or more of the functions described below in relation to FIGS. 24-25, including, e.g., blocks 2456 and 2556. The communication and processing circuitry 2344 may further be configured to execute communication management software/instructions 2354 stored in the computer-readable storage medium 2306 to perform one or more of the functions described below in relation to FIGS. 24-25, including, e.g., blocks 2456 and 2556.

In some aspects, the communication and processing circuitry 2344 may be configured for various functions, including, for example, repeating the aperiodic transmission of the one or more instances of the at least one synchronization signal in a subsequent slot at least once, wherein the repeating the transmission is initiated at a time based on the time repetition value. For example, the communication and processing circuitry 2344 may be configured to implement one or more of the functions described below in relation to FIG. 25, including, e.g., block 2560. The communication and processing circuitry 2344 may further be configured to execute communication management software/instructions 2354 stored in the computer-readable storage medium 2306 to perform one or more of the functions described below in relation to FIG. 25, including, e.g., block 2560.

In some aspects, the communication and processing circuitry 2344 may be configured for various functions, including, for example, receiving a report a report from the at least one UE, where the report may include one or more measurements of the aperiodic transmission of the one or more instances of the at least one synchronization signal. For example, the communication and processing circuitry 2344 may be configured to implement one or more of the functions described below in relation to FIG. 25, including, e.g., block 2562. The communication and processing circuitry 2344 may further be configured to execute communication management software/instructions 2354 stored in the computer-readable storage medium 2306 to perform one or more of the functions described below in relation to FIG. 25, including, e.g., block 2562.

In some aspects, the communication and processing circuitry 2344 may be configured for various functions, including, for example, receiving conditions of reception of a plurality of instances of each synchronization signal of the plurality of synchronization signals in response to transmitting the plurality of instances of each synchronization signal of the plurality of synchronization signals. For example, the communication and processing circuitry 2344 may be configured to implement one or more of the functions described below in relation to FIG. 25, including, e.g., block 2564. The communication and processing circuitry 2344 may further be configured to execute communication management software/instructions 2354 stored in the computer-readable storage medium 2306 to perform one or more of the functions described below in relation to FIG. 25, including, e.g., block 2564.

In some aspects, the communication and processing circuitry 2344 may be configured for various functions, including, for example, selecting a transmit beam among the plurality of transmit beams based on the conditions. For example, the communication and processing circuitry 2344 may be configured to implement one or more of the functions described below in relation to FIG. 25, including, e.g., block 2566. The communication and processing circuitry 2344 may further be configured to execute communication management software/instructions 2354 stored in the computer-readable storage medium 2306 to perform one or more of the functions described below in relation to FIG. 25, including, e.g., block 2566.

In some aspects, the communication and processing circuitry 2344 may be configured for various functions, including, for example, utilizing the selected transmit beam for communication with the UE. For example, the communication and processing circuitry 2344 may be configured to implement one or more of the functions described below in relation to FIG. 25, including, e.g., block 2586. The communication and processing circuitry 2344 may further be configured to execute communication management software/instructions 2354 stored in the computer-readable storage medium 2306 to perform one or more of the functions described below in relation to FIG. 25, including, e.g., block 2568.

In some aspects, the communication and processing circuitry 2344 may be configured for various functions, including, for example, establishing a connection with a UE based on a first synchronization signal and based at least in part on a capability of the UE. For example, the communication and processing circuitry 2344 may be configured to implement one or more of the functions described below in relation to FIG. 26, including, e.g., block 2602. The communication and processing circuitry 2344 may further be configured to execute communication management software/instructions 2354 stored in the computer-readable storage medium 2306 to perform one or more of the functions described below in relation to FIG. 26, including, e.g., block 2602

In some aspects, the communication and processing circuitry 2344 may be configured for various functions, including, for example, receiving a request from the UE for a second synchronization signal based on at least one of a network condition or a communication condition, wherein the request for the second synchronization signal comprises configuration parameters based at least on part of the capability of the UE. For example, the communication and processing circuitry 2344 may be configured to implement one or more of the functions described below in relation to FIG. 26, including, e.g., block 2604. The communication and processing circuitry 2344 may further be configured to execute communication management software/instructions 2354 stored in the computer-readable storage medium 2306 to perform one or more of the functions described below in relation to FIG. 26, including, e.g., block 2604.

In some aspects, the communication and processing circuitry 2344 may be configured for various functions, including, for example, processing the configuration parameters included in the request and UE data history associated with the UE. For example, the communication and processing circuitry 2344 may be configured to implement one or more of the functions described below in relation to FIG. 26, including, e.g., block 2606. The communication and processing circuitry 2344 may further be configured to execute communication management software/instructions 2354 stored in the computer-readable storage medium 2306 to perform one or more of the functions described below in relation to FIG. 26, including, e.g., block 2606.

In some aspects, the resource allocation circuitry 2342 may be configured for various functions, including, for example, allocating one or more resources for transmitting the second synchronization signal based at least in part on the request for the second synchronization signal. For example, the resource allocation circuitry 2342 may be configured to implement one or more of the functions described below in relation to FIG. 26, including, e.g., block 2608. The resource allocation circuitry 2342 may further be configured to execute resource allocation software/instructions 2352 stored in the computer-readable storage medium 2306 to perform one or more of the functions described below in relation to FIG. 26, including, e.g., block 2608.

In some aspects, the resource allocation circuitry 2342 may be configured for various functions, including, for example, allocating one or more resources for transmitting the second synchronization signal without considering the request for the second synchronization signal. For example, the resource allocation circuitry 2342 may be configured to implement one or more of the functions described below in relation to FIG. 26, including, e.g., block 2610. The resource allocation circuitry 2342 may further be configured to execute resource allocation software/instructions 2352 stored in the computer-readable storage medium 2306 to perform one or more of the functions described below in relation to FIG. 26, including, e.g., block 2610.

In some aspects of the disclosure, the processor 2304 may include lean SSB manager circuitry 2346 configured for various functions, including, for example, transmitting the second synchronization signal to the UE. For example, the resource allocation circuitry 2342 may be configured to implement one or more of the functions described below in relation to FIG. 26, including, e.g., block 2612. The lean SSB manager circuitry 2346 may further be configured to execute lean SSB manager software/instructions 2356 stored in the computer-readable storage medium 2306 to perform one or more of the functions described below in relation to FIG. 26, including, e.g., block 2612.

Figure 24:
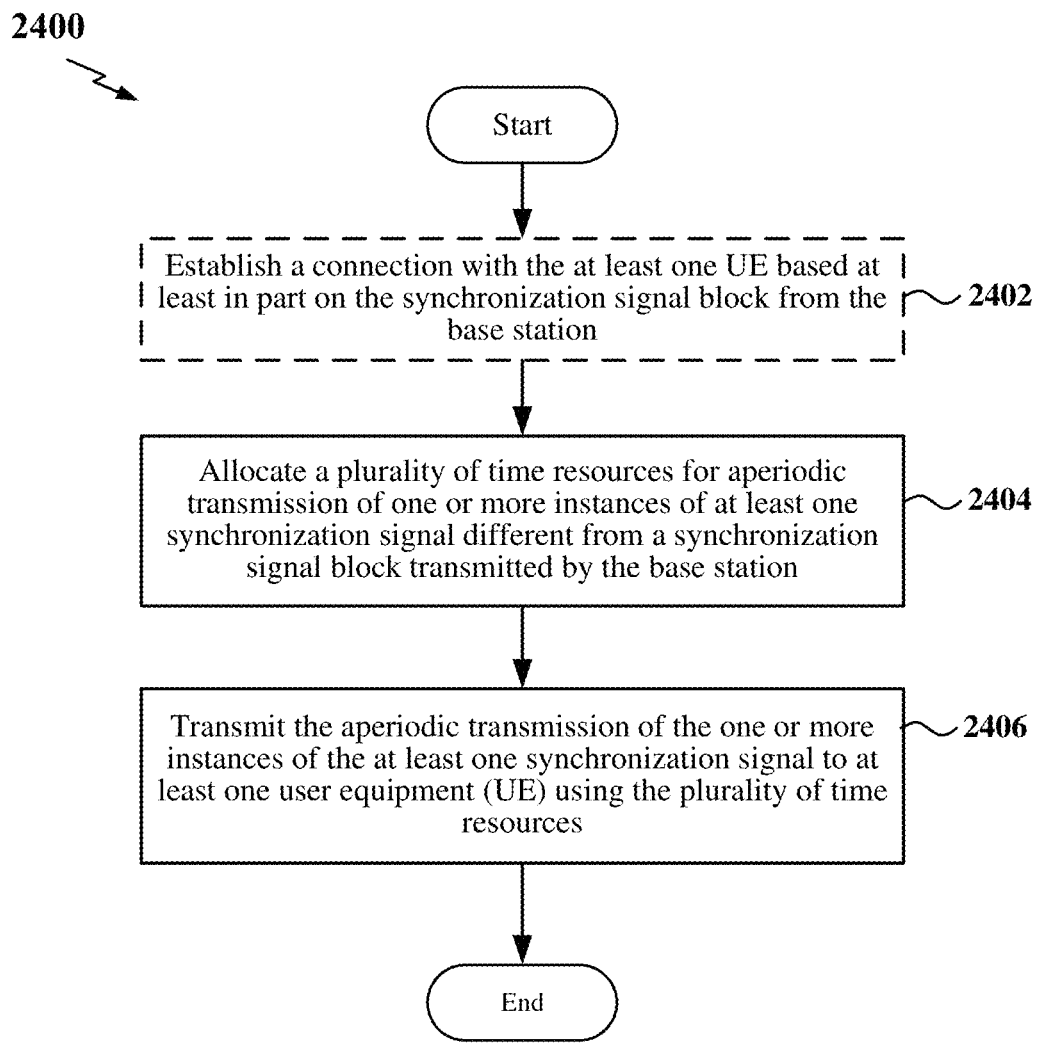
FIG. 24 is a flow chart illustrating an exemplary process for aperiodic lean SS transmission according to some aspects of the disclosure.

FIG. 24 is a flow chart illustrating an exemplary process 2400 for aperiodic lean SS transmission in accordance with some aspects of the present disclosure. As described below, some or all illustrated features may be omitted in a particular implementation within the scope of the present disclosure, and some illustrated features may not be required for implementation of all embodiments. In some examples, the process 2400 may be carried out by the base station 2300 illustrated in FIG. 23. In some examples, the process 2400 may be carried out by any suitable apparatus or means for carrying out the functions or algorithm described below.

At block 2402, the base station may establish a connection with the at least one UE based at least in part on the synchronization signal block from the base station. At block 2404, the base station allocates a plurality of time resources for aperiodic transmission of one or more instances of at least one synchronization signal different from a synchronization signal block transmitted by the base station. At block 2406, the base station transmits the aperiodic transmission of the one or more instances of the at least one synchronization signal to at least one user equipment (UE) using the plurality of time resources.

In one configuration, the base station 2300 for wireless communication includes means for establishing a connection with the at least one UE based at least in part on the synchronization signal block from the base station, means for allocating a number of time resources for aperiodic transmission of one or more instances of at least one synchronization signal different from a synchronization signal block transmitted by the base station, and means for transmitting the aperiodic transmission of the one or more instances of the at least one synchronization signal to at least one user equipment (UE) using the defined number of time resources. In one aspect, the aforementioned means may be the processor(s) 2304 shown in FIG. 23 configured to perform the functions recited by the aforementioned means. In another aspect, the aforementioned means may be a circuit or any apparatus configured to perform the functions recited by the aforementioned means.

Figure 25A:
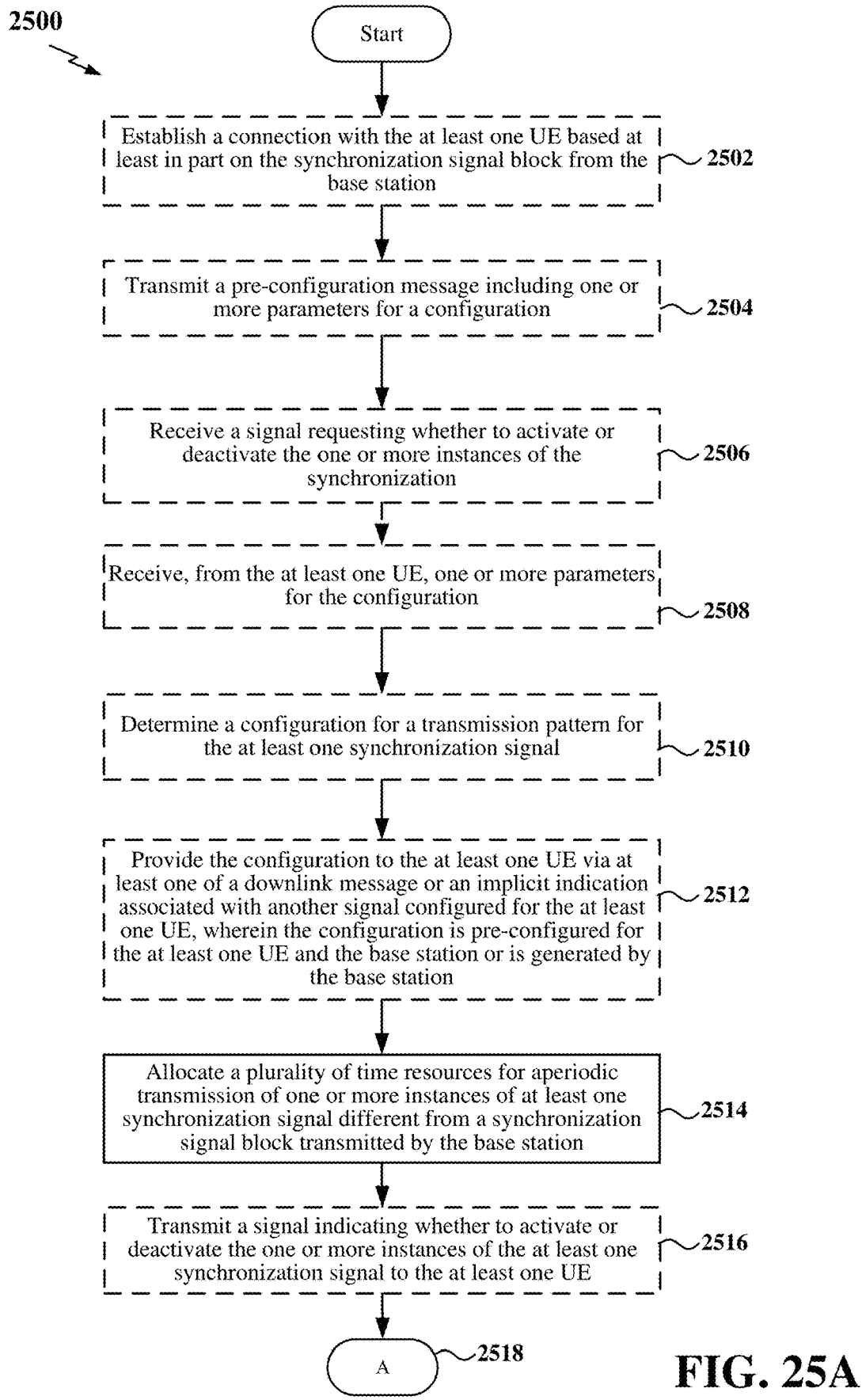
FIG. 25A is a flow chart illustrating an exemplary process for aperiodic lean SS transmission according to some aspects of the disclosure.

FIG. 25A is a flow chart illustrating an exemplary process 2500 for aperiodic lean SS transmission in accordance with some aspects of the present disclosure. As described below, some or all illustrated features may be omitted in a particular implementation within the scope of the present disclosure, and some illustrated features may not be required for implementation of all embodiments. In some examples, the process 2500 may be carried out by the base station 2300 illustrated in FIG. 23. In some examples, the process 2500 may be carried out by any suitable apparatus or means for carrying out the functions or algorithm described below.

At block 2502, the base station may establish a connection with the at least one UE based at least in part on the synchronization signal block from the base station.

At block 2504, the base station may transmit a pre-configuration message to the at least one UE, where the pre-configuration message may include one or more parameters for configuration for a transmission pattern of at least one synchronization signal.

At block 2506, the base station may receive a signal requesting whether to activate or deactivate the one or more instances of the synchronization At block 2508, the base station may receive, from the at least one UE, one or more parameters for a configuration. In an aspect, the signal at block 2506 and the one or more parameters at block 2508 may be received together as one signal.

At block 2510, the base station may determine the configuration for a transmission pattern for the at least one synchronization signal. In an aspect, the configuration is determined based on the one or more parameters received from the at least one UE. In an aspect, the one or more parameters may include one or more conditions associated with the at least one UE.

At block 2512, the base station may provide the configuration to the at least one UE via at least one of a downlink message or an implicit indication associated with another signal configured for the at least one UE, wherein the configuration is pre-configured for the at least one UE and the base station or is generated by the base station.

At block 2514, the base station may allocate a plurality of time resources for aperiodic transmission of one or more instances of at least one synchronization signal different from a synchronization signal block transmitted by the base station. In an aspect, a number of the plurality of time resources may correspond to a number of slots for transmitting the at least one synchronization signal. In an aspect, the plurality of time resources may be allocated based on the configuration.

At block 2516, the base station may transmit a signal indicating whether to activate or deactivate the one or more instances of the at least one synchronization signal to the at least one UE. In an aspect, the signal comprises at least one of an RRC signal, a MAC-CE, DCI, or a paging message to the UE.

At block 2518, the base station may continue performing additional features, as discussed below.

Figure 25B:
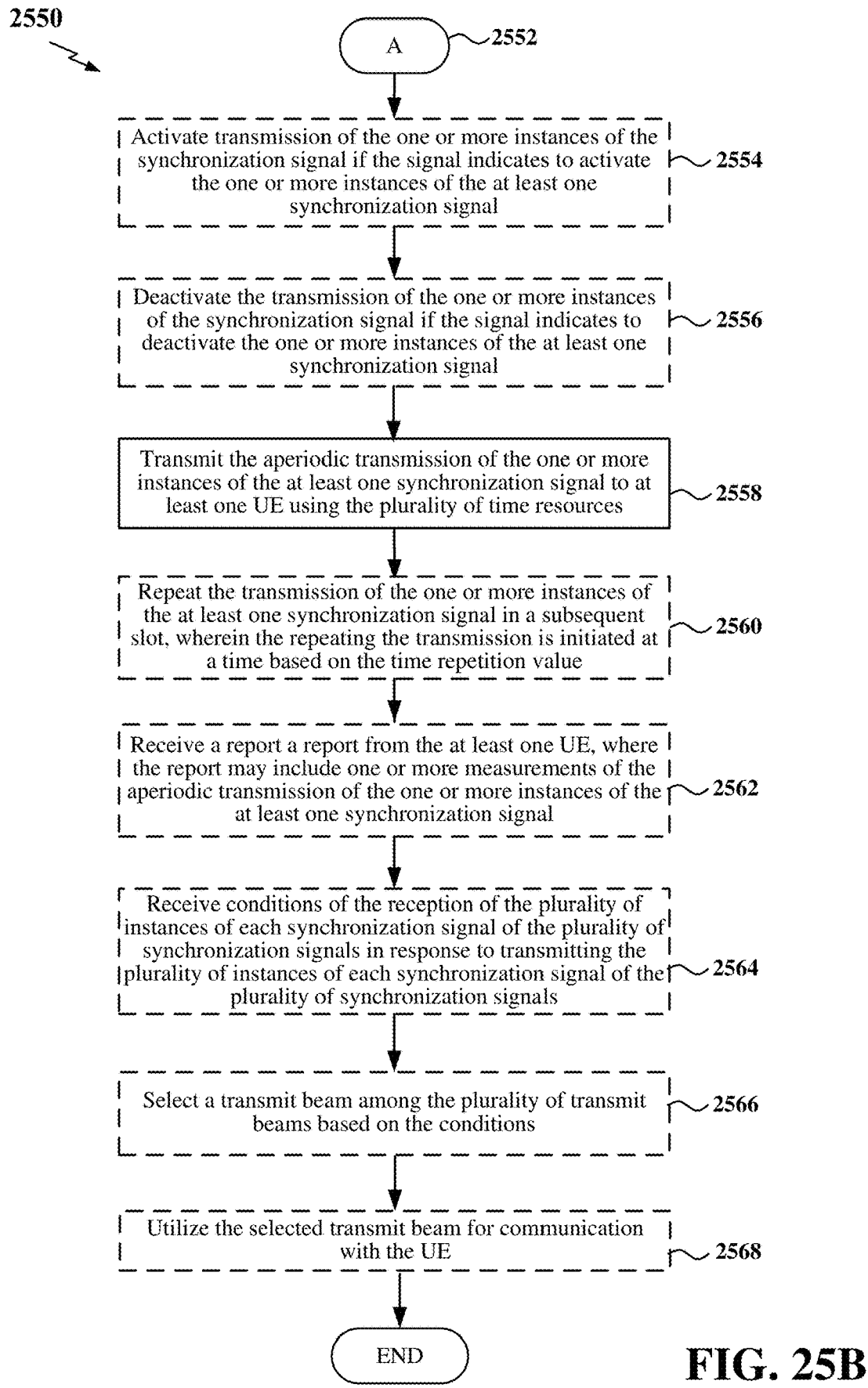
FIG. 25B is a flow chart illustrating an exemplary process for aperiodic lean SS transmission continuing from the exemplary process of FIG. 24A, in accordance with some aspects of the present disclosure.

FIG. 25B is a flow chart illustrating an exemplary process 2550 for aperiodic lean SS transmission continuing from the exemplary process 2500 of FIG. 25A, in accordance with some aspects of the present disclosure. As described below, some or all illustrated features may be omitted in a particular implementation within the scope of the present disclosure, and some illustrated features may not be required for implementation of all embodiments. In some examples, the process 2550 may be carried out by the base station 2300 illustrated in FIG. 23. In some examples, the process 2550 may be carried out by any suitable apparatus or means for carrying out the functions or algorithm described below.

At block 2552, the base station may continue from block 2518 of the exemplary process 2500 of FIG. 25A.

At block 2554, the base station may activate transmission of the one or more instances of the synchronization signal if the signal from block 2506 or 2516 indicates to activate the one or more instances of the at least one synchronization signal. At block 2556, the base station may deactivate the transmission of the one or more instances of the synchronization signal if the signal from block 2506 or 2516 indicates to deactivate the one or more instances of the at least one synchronization signal. In an aspect, the signal activates or deactivates the transmission of the one or more instances of the synchronization signal for at least one of the at least one UE, or a group of UEs that include the at least one UE, or for one or more bandwidth parts, or for the base station, or a combination thereof.

At block 2558, the base station may transmit the aperiodic transmission of the one or more instances of the at least one synchronization signal to at least one user equipment (UE) using the plurality of time resources. In an aspect, the one or more instances of the at least one synchronization signal are transmitted using a subset of the plurality of time resources indicated in the configuration.

In an aspect, the configuration may indicate that the at least one synchronization signal includes a plurality of synchronization signals, each synchronization signal of the plurality of synchronization signals corresponding to a respective transmit beam of a plurality of transmit beams associated with the base station, and the transmitting the one or more instances of the at least one synchronization signal may include transmitting one or more instances of each synchronization signal of the plurality of synchronization signals.

In an aspect, the configuration may include a timing offset exists between a transmission of one or more instances of a synchronization signal of the plurality of synchronization signal and a subsequent transmission of one or more instances of another synchronization signal of the plurality of synchronization signal.

In an aspect, the configuration may include a number of consecutive time resources for a plurality of instances of each synchronization signal of the plurality of synchronization signals, and wherein the transmitting the one or more instances of the at least one synchronization signal may include transmitting consecutively the plurality of instances of each synchronization signal of the plurality of synchronization signals based on the number of consecutive time resources.

In an aspect, the configuration may include a time density for the at least one synchronization signal, and a number of instances for each synchronization signal of the at least one synchronization signal per slot may be based on the time density. In an aspect, the transmitting the one or more instances of the at least one synchronization signal further may include transmitting a plurality of instances of each synchronization signal of the at least one synchronization signal with a time density offset between two successive transmissions of the plurality of instances of each synchronization signal of the at least one synchronization signal within a slot, wherein each synchronization signal of the at least one synchronization signal is associated with a respective beam of at least one transmit beam associated with the base station.

At block 2560, in an aspect, the configuration may include a time repetition value for the at least one synchronization signal, and the base station may repeat the aperiodic transmission of the one or more instances of the at least one synchronization signal in a subsequent slot at least once, wherein the repeating the transmission is initiated at a time based on the time repetition value.

At block 2562, the base station may receive a report from the at least one UE, where the report may include one or more measurements of the aperiodic transmission of the one or more instances of the at least one synchronization signal.

At block 2564, the base station may receive conditions of reception of a plurality of instances of each synchronization signal of the plurality of synchronization signals in response to transmitting the plurality of instances of each synchronization signal of the plurality of synchronization signals. At block 2566, the base station may select a transmit beam among the plurality of transmit beams based on the conditions. At block 2568, the base station may utilize the selected transmit beam for communication with the UE.

In an aspect, the at least one synchronization signal may be located within a first bandwidth part, the first bandwidth part being different from a second bandwidth part for the synchronization signal block. In an aspect, a bandwidth part associated with each of the at least one synchronization signal may specify a corresponding UE or a corresponding group of UEs. In an aspect, the one or more instances of the at least one synchronization signal may be transmitted using a subset of the number of time resources indicated in the configuration.

In one configuration, the base station 2300 for wireless communication includes means for establishing a connection with the at least one UE based at least in part on the synchronization signal block from the base station, means for allocating a number of time resources for aperiodic transmission of one or more instances of at least one synchronization signal different from a synchronization signal block transmitted by the base station, and means for transmitting the aperiodic transmission of the one or more instances of the at least one synchronization signal to at least one user equipment (UE) using the defined number of time resources.

The base station 2300 may further include means for establishing a connection with the at least one UE based at least in part on the synchronization signal block from the base station, means for transmitting a signal indicating whether to activate or deactivate the one or more instances of the at least one synchronization signal to the at least one UE, means for receiving a signal requesting whether to activate or deactivate the one or more instances of the synchronization, means for activating transmission of the one or more instances of the synchronization signal if the signal indicates to activate the one or more instances of the at least one synchronization signal, means for deactivating the transmission of the one or more instances of the synchronization signal if the signal indicates to deactivate the one or more instances of the at least one synchronization signal, means for receiving, from the at least one UE, one or more parameters for the configuration, means for determining a configuration for a transmission pattern for the at least one synchronization signal, and means for providing the configuration to the at least one UE via at least one of a downlink message or an implicit indication associated with another signal configured for the at least one UE, wherein the configuration is pre-configured for the at least one UE and the base station or is generated by the base station. The base station 2300 may further include means for repeating the transmission of the one or more instances of the at least one synchronization signal in a subsequent slot, wherein the repeating the transmission is initiated at a time based on the time repetition value, means for receiving conditions of reception of a plurality of instances of each synchronization signal of the plurality of synchronization signals in response to transmitting the plurality of instances of each synchronization signal of the plurality of synchronization signals, means for selecting a transmit beam among the plurality of transmit beams based on the conditions, and means for utilizing the selected beam for communication with the UE. The base station 2300 may further include means for receiving a report from the at least one UE, where the report may include one or more measurements of the aperiodic transmission of the one or more instances of the at least one synchronization signal. In one aspect, the aforementioned means may be the processor(s) 2304 shown in FIG. 23 configured to perform the functions recited by the aforementioned means. In another aspect, the aforementioned means may be a circuit or any apparatus configured to perform the functions recited by the aforementioned means.

Figure 26:
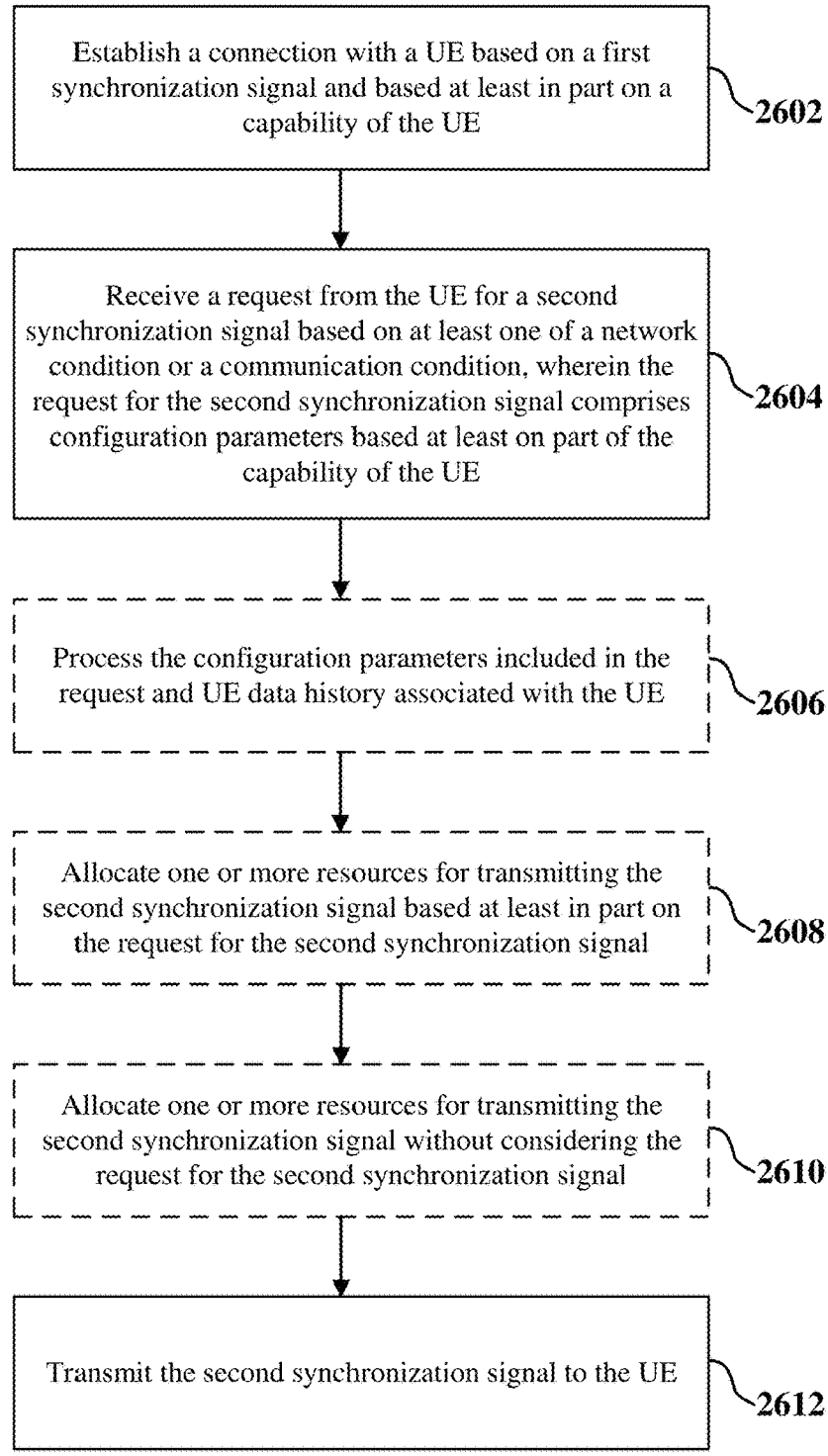
FIG. 26 is a flow chart of a method of communicating lean SSB at a base station in accordance with aspects of the present disclosure.

FIG. 26 is a flow chart 2600 of a method of communicating lean SSB at a base station according to some aspects. As described below, some or all illustrated features may be omitted in a particular implementation within the scope of the present disclosure, and some illustrated features may not be required for implementation of all embodiments. In some examples, the process 2600 may be carried out by the base station 2300 illustrated in FIG. 23. In some examples, the process 2600 may be carried out by any suitable apparatus or means for carrying out the functions or algorithm described below.

At block 2602, the base station (e.g., 108) may establish a connection with a UE (e.g., 106) based on a first synchronization signal (e.g., SSB) and based at least in part on a capability of the UE.

At block 2604, the base station may receive a request from the UE for a second synchronization signal (e.g., lean SSB) based on at least one of a network condition or a communication condition, wherein the request for the second synchronization signal may include configuration parameters based at least on part of the capability of the UE.

In an aspect, receiving the request for a second synchronization signal (e.g., at block 2604) may include receiving the request via an uplink transmission. In an aspect, the uplink transmission may include one of a PUSCH, a PUCCH or a PRACH.

At block 2606, in an aspect, the base station may process the configuration parameters included in the request and UE data history associated with the UE At block 2608, in an aspect, the base station may allocate one or more resources for transmitting the second synchronization signal based at least in part on the request for the second synchronization signal. In an aspect, allocating the one or more resources based at least in part on the request for the second synchronization signal may include modifying the request for the second synchronization signal and allocating the one or more resources based on the modified request for the second synchronization signal.

At block 2608, in an aspect, the base station may allocate one or more resources for transmitting the second synchronization signal without considering the request for the second synchronization signal.

At block 2612, the base station may transmit the second synchronization signal (e.g., lean SSB) to the UE.

In an aspect, transmitting the second synchronization signal (e.g., at block 2610) may include transmitting the second synchronization signal to the UE based on at least one of the processing of the configuration parameters and UE data history. In an aspect, transmitting the second synchronization signal (e.g., at block 2610) may include transmitting the second synchronization signal to the UE based on base station configuration parameters independent of the received configuration parameters.

In an aspect, the request for the second synchronization signal may include a request for a periodic synchronization signal. In an aspect, the request for the second synchronization signal may include a request for an aperiodic synchronization signal. In an aspect, the request for the second synchronization signal may include a request for a generic synchronization signal. In an aspect, the request for the second synchronization signal may include quality-of-service requirement data for the UE.

In an aspect, the configuration parameters may include one or more of a number and index of specific downlink beams, a number of synchronization symbols per beam, periodicity parameters of the second synchronization signal, a time-density of the second synchronization signal, a time-repetition of the synchronization signal, specific symbols in which to transmit the synchronization signal, one or more bandwidth parts in which to receive the second synchronization signal, a time and/or frequency synchronization target, and an estimate of optimized beam direction and/or beam efficiency. In an aspect, the configuration parameters may include a codebook. In an aspect, the configuration parameters may include a set of uplink signals. In an aspect, the configuration parameters may include one of a frequency synchronization threshold or time synchronization threshold of the UE. In an aspect, the configuration parameters may include one of a beam failure detection threshold or a beam failure recovery threshold of the UE. In an aspect, the configuration parameters may include a channel quality threshold of the UE.

In one configuration, the base station 2300 for wireless communication includes means for establishing a connection with a UE based on a first synchronization signal and based at least in part on a capability of the UE, means for receiving a request from the UE for a second synchronization signal based on at least one of a network condition or a communication condition, wherein the request for the second synchronization signal comprises configuration parameters based at least on part of the capability of the UE, and means for transmitting the second synchronization signal to the UE. In an aspect, the base station 2300 may further include means for processing the configuration parameters included in the request and UE data history associated with the UE. In an aspect, the base station 2300 may further include means for allocating one or more resources for transmitting the second synchronization signal based at least in part on the request for the second synchronization signal. In an aspect, the base station 2300 may further include means for allocating one or more resources for transmitting the second synchronization signal without considering the request for the second synchronization signal. In one aspect, the aforementioned means may be the processor(s) 2304 shown in FIG. 23 configured to perform the functions recited by the aforementioned means. In another aspect, the aforementioned means may be a circuit or any apparatus configured to perform the functions recited by the aforementioned means.

Of course, in the above examples, the circuitry included in the processor 2304 is merely provided as an example, and other means for carrying out the described functions may be included within various aspects of the present disclosure, including but not limited to the instructions stored in the computer-readable storage medium 2306, or any other suitable apparatus or means described in any one of the FIGS. 1-3, 5, 7, 11-14, and 20-22, and utilizing, for example, the processes and/or algorithms described herein in relation to FIGS. 24-26.

Figure 27:
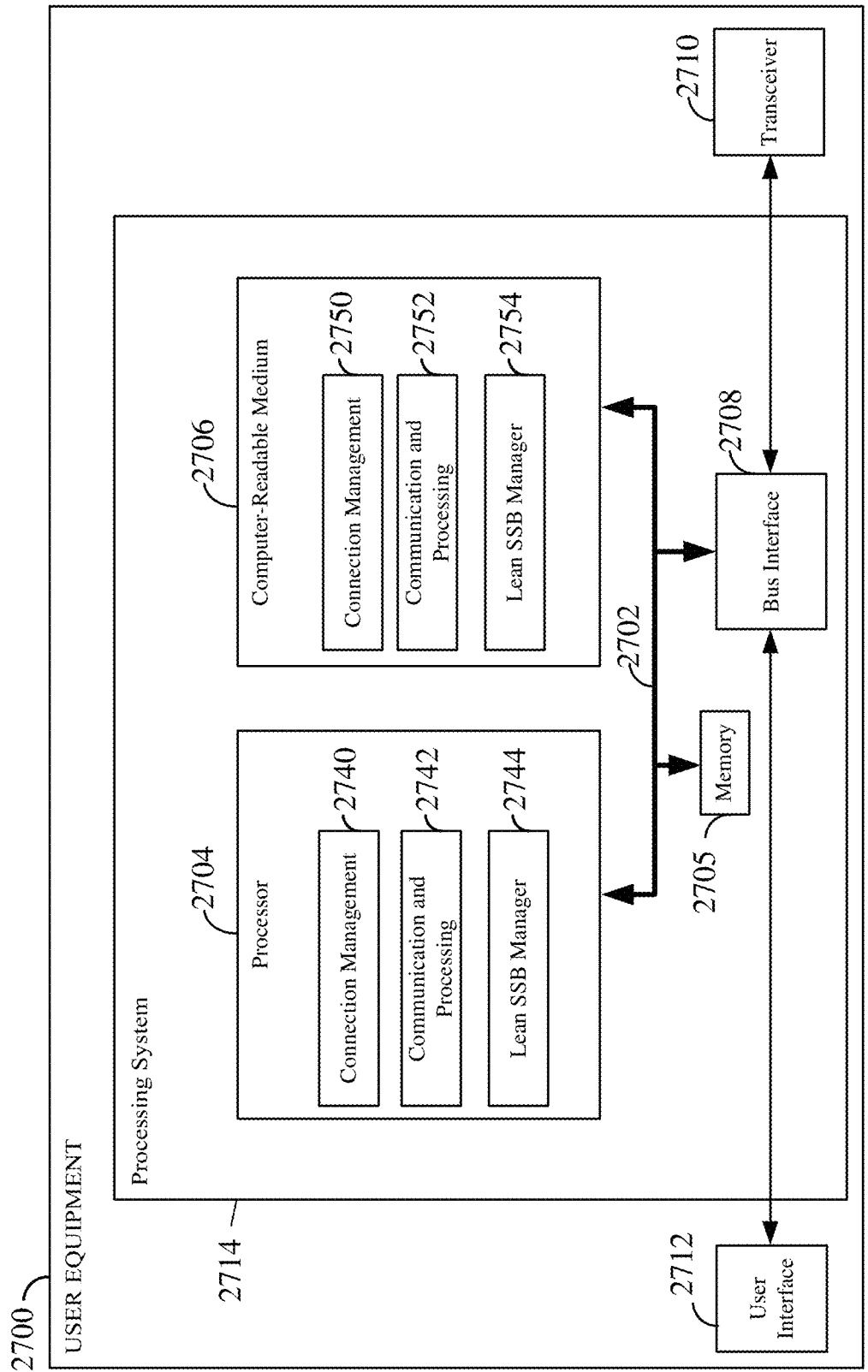
FIG. 27 is a conceptual diagram illustrating an example of a hardware implementation for an exemplary user equipment employing a processing system.

FIG. 27 is a conceptual diagram illustrating an example of a hardware implementation for an exemplary UE 2700 employing a processing system 2714. In accordance with various aspects of the disclosure, an element, or any portion of an element, or any combination of elements may be implemented with a processing system 2714 that includes one or more processors 2704. For example, the UE 2700 may be a UE or a scheduled entity as illustrated in any one or more of FIGS. 1-3, 5, 7, 11-14, and 20-22.

The processing system 2714 may be substantially the same as the processing system 714 illustrated in FIG. 16, including a bus interface 2708, a bus 2702, memory 2705, a processor 2704, and a computer-readable storage medium 2706. Furthermore, the UE 2700 may include a user interface 2712 and a transceiver 2710 substantially similar to those described above in FIG. 16. That is, the processor 2704, as utilized in a UE 2700, may be used to implement any one or more of the processes described below and illustrated in FIGS. 28-30.

In some aspects of the disclosure, the processor 2704 may include circuitry configured for various functions. For example, the processor 2704 may include connection management circuitry 2740 configured for various functions, including, for example, establishing the connection with the base station based at least in part on the synchronization signal block from the base station. For example, the connection management circuitry 2740 may be configured to implement one or more of the functions described below in relation to FIGS. 28-29, including, e.g., blocks 2802 and 2902. The connection management circuitry 2740 may further be configured to execute connection management software/instructions 2750 stored in the computer-readable storage medium 2706 to perform one or more of the functions described below in relation to FIGS. 28-29, including, e.g., blocks 2802 and 2902.

In some aspects, the connection management circuitry 2740 may be configured for various functions, including, for example, communicating with the base station to manage a connection with the base station based at least in part on the received one or more instances of the synchronization signal. For example, the connection management circuitry 2740 may be configured to implement one or more of the functions described below in relation to FIGS. 28-29, including, e.g., blocks 2806 and 2914. The connection management circuitry 2740 may further be configured to execute connection management software/instructions 2750 stored in the computer-readable storage medium 2706 to perform one or more of the functions described below in relation to FIGS. 28-29, including, e.g., blocks 2806 and 2914.

In some aspects, the connection management circuitry 2740 may be configured for various functions, including, for example, transmitting a request to the base station, where the report may include one or more measurements of the aperiodic transmission of the one or more instances of the at least one synchronization signal. For example, the connection management circuitry 2740 may be configured to implement one or more of the functions described below in relation to FIG. 29, including, e.g., block 2916. The connection management circuitry 2740 may further be configured to execute connection management software/instructions 2750 stored in the computer-readable storage medium 2706 to perform one or more of the functions described below in relation to FIG. 29, including, e.g., block 2916.

In some aspects of the disclosure, the processor 2704 may include communication and processing circuitry 2742 configured for various functions, including, for example, receiving aperiodic transmission of one or more instances of at least one synchronization signal from a base station via a plurality of time resources, the at least one synchronization signal being different from a synchronization signal block transmitted by the base station. For example, the communication and processing circuitry 2742 may be configured to implement one or more of the functions described below in relation to FIGS. 28-29, including, e.g., blocks 2804 and 2910. The communication and processing circuitry 2742 may further be configured to execute communication and processing software/instructions 2752 stored in the computer-readable storage medium 2706 to perform one or more of the functions described below in relation to FIGS. 28-29, including, e.g., blocks 2804 and 2910.

In some aspects, the communication and processing circuitry 2742 may be configured for various functions, including, for example, transmitting a signal requesting whether to activate or deactivate the one or more instances of the synchronization. For example, the communication and processing circuitry 2742 may be configured to implement one or more of the functions described below in relation to FIG. 29, including, e.g., block 2910. The communication and processing circuitry 2742 may further be configured to execute communication and processing software/instructions 2752 stored in the computer-readable storage medium 2706 to perform one or more of the functions described below in relation to FIG. 29, including, e.g., block 2910.

In some aspects, the communication and processing circuitry 2742 may be configured for various functions, including, for example, transmitting a signal requesting whether to activate or deactivate the one or more instances of the synchronization. For example, the communication and processing circuitry 2742 may be configured to implement one or more of the functions described below in relation to FIG. 29, including, e.g., block 2904. The communication and processing circuitry 2742 may further be configured to execute communication and processing software/instructions 2752 stored in the computer-readable storage medium 2706 to perform one or more of the functions described below in relation to FIG. 29, including, e.g., block 2904.

In some aspects, the communication and processing circuitry 2742 may be configured for various functions, including, for example, transmitting, to the base station, one or more parameters for the configuration. For example, the communication and processing circuitry 2742 may be configured to implement one or more of the functions described below in relation to FIG. 29, including, e.g., block 2906. The communication and processing circuitry 2742 may further be configured to execute communication and processing software/instructions 2752 stored in the computer-readable storage medium 2706 to perform one or more of the functions described below in relation to FIG. 29, including, e.g., block 2906.

In some aspects, the communication and processing circuitry 2742 may be configured for various functions, including, for example, receiving the configuration via at least one of a downlink message or an implicit indication associated with another signal configured for the UE, wherein the configuration is pre-configured for the UE and the base station or is generated by the base station. For example, the communication and processing circuitry 2742 may be configured to implement one or more of the functions described below in relation to FIG. 29, including, e.g., block 2908. The communication and processing circuitry 2742 may further be configured to execute communication and processing software/instructions 2752 stored in the computer-readable storage medium 2706 to perform one or more of the functions described below in relation to FIG. 29, including, e.g., block 2908.

In some aspects, the communication and processing circuitry 2742 may be configured for various functions, including, for example, repeating the reception of the one or more instances of the at least one synchronization signal in a subsequent slot, wherein the repeating the reception based on a the time repetition value for the at least one synchronization signal value. For example, the communication and processing circuitry 2742 may be configured to implement one or more of the functions described below in relation to FIG. 29, including, e.g., block 2912. The communication and processing circuitry 2742 may further be configured to execute communication and processing software/instructions 2752 stored in the computer-readable storage medium 2706 to perform one or more of the functions described below in relation to FIG. 29, including, e.g., block 2912.

In some aspects, the communication and processing circuitry 2742 may be configured for various functions, including, for example, establishing a connection with a network based on a first synchronization signal and based at least in part on a capability of the UE. For example, the communication and processing circuitry 2742 may be configured to implement one or more of the functions described below in relation to FIG. 30, including, e.g., block 3002. The communication and processing circuitry 2742 may further be configured to execute communication and processing software/instructions 2752 stored in the computer-readable storage medium 2706 to perform one or more of the functions described below in relation to FIG. 30, including, e.g., block 3002.

In some aspects of the disclosure, the processor 2704 may include lean SSB manager circuitry 2744 configured for various functions, including, for example, transmitting a request for a second synchronization signal in response to at least one of a network condition or a communication condition, wherein the request for the second synchronization signal comprises configuration parameters based at least on part of the capability of the UE. For example, the lean SSB manager circuitry 2744 may be configured to implement one or more of the functions described below in relation to FIGS. 30, including, e.g., block 3006. The lean SSB manager circuitry 2744 may further be configured to execute lean SSB manager software/instructions 2754 stored in the computer-readable storage medium 2706 to perform one or more of the functions described below in relation to FIGS. 30, including, e.g., block 3006.

In some aspects, the lean SSB manager circuitry 2744 may be configured for various functions, including, for example, receiving the second synchronization signal in response to the request, wherein the second synchronization signal may be received according to at least a portion of the configuration parameters. For example, the lean SSB manager circuitry 2744 may be configured to implement one or more of the functions described below in relation to FIGS. 30, including, e.g., block 3008. The lean SSB manager circuitry 2744 may further be configured to execute lean SSB manager software/instructions 2754 stored in the computer-readable storage medium 2706 to perform one or more of the functions described below in relation to FIGS. 30, including, e.g., block 3008.

Figure 28:
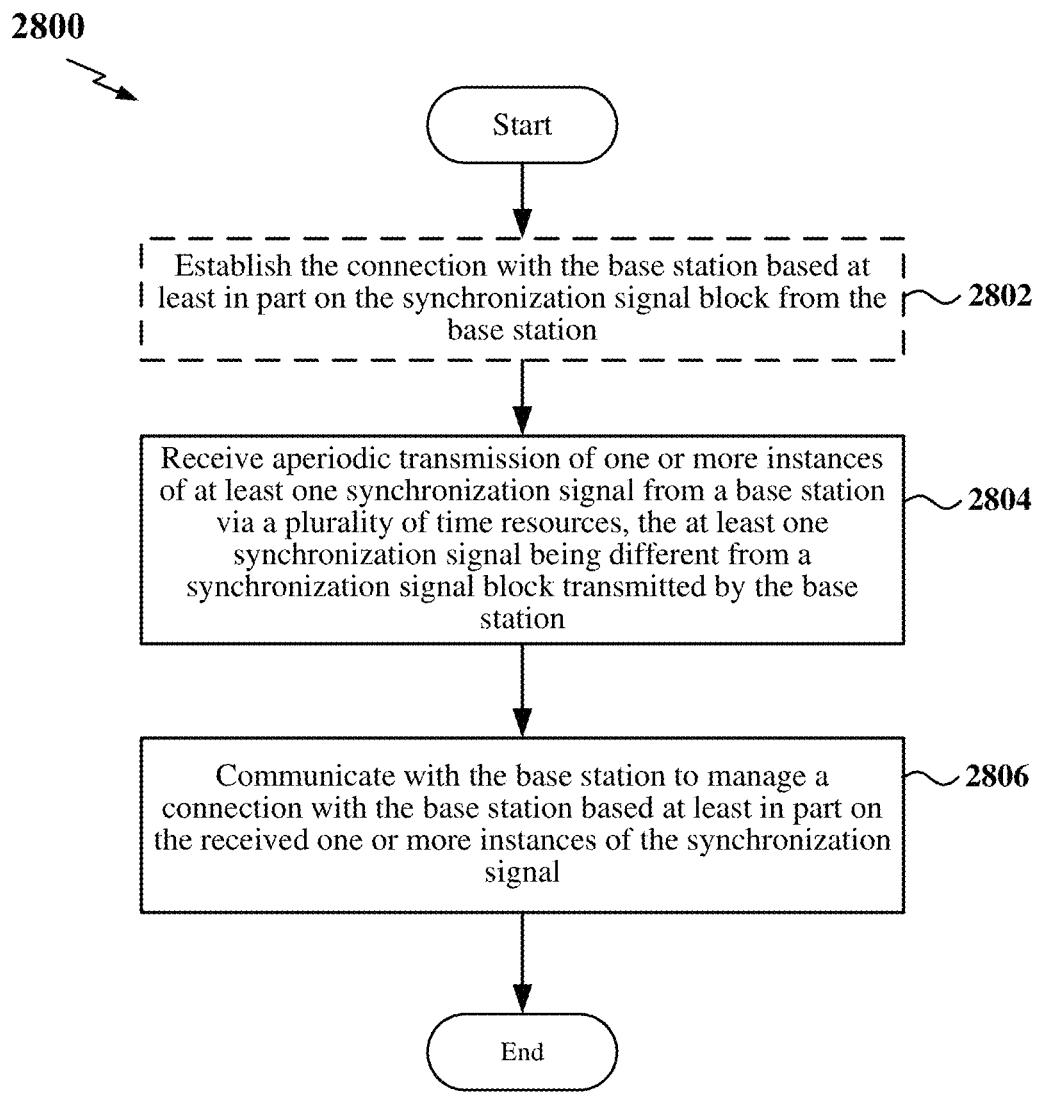
FIG. 28 is a flow chart illustrating an exemplary process for aperiodic lean SS transmission according to some aspects of the disclosure.

FIG. 28 is a flow chart illustrating an exemplary process 2800 for aperiodic lean SS transmission in accordance with some aspects of the present disclosure. As described below, some or all illustrated features may be omitted in a particular implementation within the scope of the present disclosure, and some illustrated features may not be required for implementation of all embodiments. In some examples, the process 2800 may be carried out by the UE 2700 illustrated in FIG. 27. In some examples, the process 2800 may be carried out by any suitable apparatus or means for carrying out the functions or algorithm described below.

At block 2802, the UE may establish the connection with the base station based at least in part on the synchronization signal block from the base station.

At block 2804, the UE may receive aperiodic transmission of one or more instances of at least one synchronization signal from a base station via a number of time resources, the at least one synchronization signal being different from a synchronization signal block transmitted by the base station.

At block 2806, the UE may communicate with the base station to manage a connection with the base station based at least in part on the received one or more instances of the synchronization signal.

In one configuration, the UE 2700 for wireless communication includes means for establishing the connection with the base station based at least in part on the synchronization signal block from the base station, means for receiving aperiodic transmission of one or more instances of at least one synchronization signal from a base station via a plurality of time resources, the at least one synchronization signal being different from a synchronization signal block transmitted by the base station, and means for communicating with the base station to manage a connection with the base station based at least in part on the received one or more instances of the synchronization signal. In one aspect, the aforementioned means may be the processor(s) 2704 shown in FIG. 27 configured to perform the functions recited by the aforementioned means. In another aspect, the aforementioned means may be a circuit or any apparatus configured to perform the functions recited by the aforementioned means.

Figure 29:
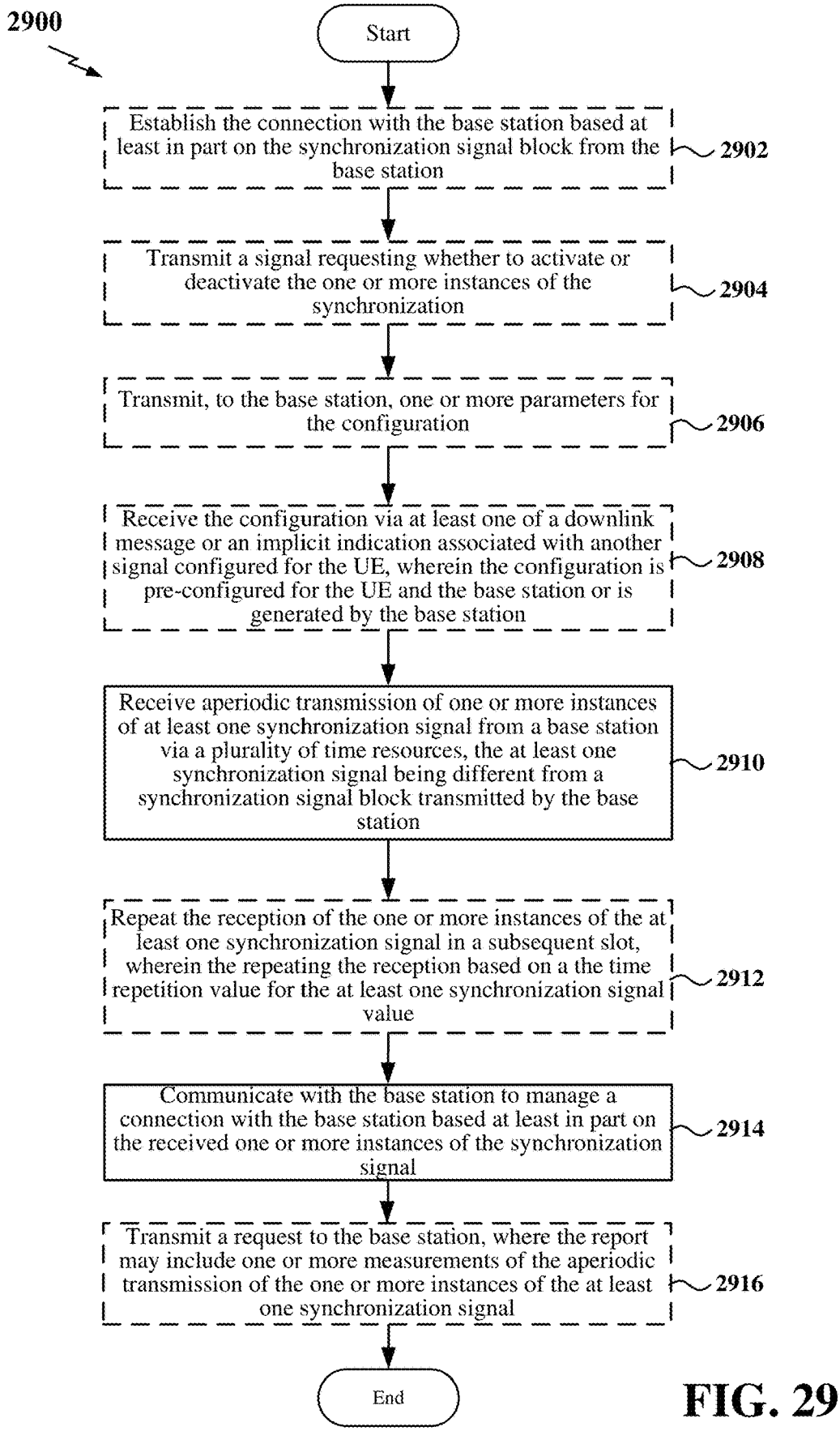
FIG. 29 is a flow chart illustrating an exemplary process for aperiodic lean SS transmission according to some aspects of the disclosure

FIG. 29 is a flow chart illustrating an exemplary process 2900 for aperiodic lean SS transmission in accordance with some aspects of the present disclosure. As described below, some or all illustrated features may be omitted in a particular implementation within the scope of the present disclosure, and some illustrated features may not be required for implementation of all embodiments. In some examples, the process 2900 may be carried out by the UE 2700 illustrated in FIG. 27. In some examples, the process 2900 may be carried out by any suitable apparatus or means for carrying out the functions or algorithm described below.

At block 2902, the UE may establish the connection with the base station based at least in part on the synchronization signal block from the base station.

At block 2904, the UE may transmit a signal requesting whether to activate or deactivate the one or more instances of the synchronization.

At block 2906, the UE may transmit, to the base station, one or more parameters for the configuration. In an aspect, the one or more parameters may include one or more conditions associated with the UE.

At block 2908, the UE may receive the configuration via at least one of a downlink message or an implicit indication associated with another signal configured for the UE, wherein the configuration is pre-configured for the UE and the base station or is generated by the base station.

At block 2910, the UE may receive aperiodic transmission of one or more instances of at least one synchronization signal from a base station via a number of time resources, the at least one synchronization signal being different from a synchronization signal block transmitted by the base station. In an aspect, the number of the plurality of time resources may correspond to a number of slots for receiving the at least one synchronization signal.

In an aspect, the plurality of time resources may be allocated based on a configuration for a transmission pattern for the at least one synchronization signal to be transmitted by the base station. In an aspect, the configuration may be determined based on the one or more parameters.

In an aspect, the one or more instances of the at least one synchronization signal are received using a subset of the plurality of time resources indicated in the configuration.

In an aspect, the configuration may indicate that the at least one synchronization signal includes a plurality of synchronization signals, each synchronization signal of the plurality of synchronization signals corresponding to a respective transmit beam of a plurality of transmit beams associated with the base station, and the receiving the one or more instances of the at least one synchronization signal may include receiving one or more instances of each synchronization signal of the plurality of synchronization signals.

In an aspect, the configuration may include a timing offset that exists between a transmission of one or more instances of a synchronization signal of the plurality of synchronization signal and a subsequent transmission of one or more instances of another synchronization signal of the plurality of synchronization signal.

In an aspect, the configuration may include a number of consecutive time resources for a plurality of instances of each synchronization signal of the plurality of synchronization signals, and the receiving the one or more instances of the at least one synchronization signal may include receiving consecutively the plurality of instances of each synchronization signal of the plurality of synchronization signals based on the number of consecutive time resources.

In an aspect, the configuration may include a time density and the one or more instances of the at least one synchronization signal is received based on a time density for the at least one synchronization signal, wherein a number of instances for each synchronization signal of the at least one synchronization signal per slot is based on the time density. In an aspect, the receiving the one or more instances of the at least one synchronization signal may include receiving a plurality of instances of each synchronization signal of the at least one synchronization signal with a time density offset between two successive transmissions of the plurality of instances of each synchronization signal of the at least one synchronization signal.

At block 2912, in an aspect, the configuration may include a time repetition value for the at least one synchronization signal, and the UE may repeat the reception of the one or more instances of the at least one synchronization signal in a subsequent slot, wherein the repeating the reception based on a the time repetition value for the at least one synchronization signal value.

At block 2914, the UE may communicate with the base station to manage a connection with the base station based at least in part on the received one or more instances of the synchronization signal. In an aspect, the established connection may be managed further based on the configuration.

In an aspect, the managing the established connection may include determining reception conditions of a plurality of reception beams associated with the UE based on reception of a plurality of instances of each synchronization signal of the plurality of synchronization signals, and selecting a reception beam for communication from the plurality of reception beams based on the reception conditions.

In an aspect, the managing the established connection may include determining conditions of reception of a plurality of instances of each synchronization signal of the plurality of synchronization signals, and transmitting the condition to the base station to cause the base station to select a transmit beam among the plurality of transmit beams associated based on the conditions.

In an aspect, the managing the established connection may include performing frequency tracking based on the reception of the one or more instances of the at least one synchronization signal.

In an aspect, the at least one synchronization signal may be located within a first bandwidth part, the first bandwidth part being different from a second bandwidth part for the synchronization signal block. In an aspect, a bandwidth part associated with each of the at least one synchronization signal may specify a corresponding UE or a corresponding group of UEs. In an aspect, each of the at least one synchronization signal may occupy a respective symbol in the time resources.

At 2916, the UE may transmit a report to the base station, where the report may include one or more measurements of the aperiodic transmission of the one or more instances of the at least one synchronization signal.

In one configuration, the UE 2700 for wireless communication includes means for establishing the connection with the base station based at least in part on the synchronization signal block from the base station, means for receiving aperiodic transmission of one or more instances of at least one synchronization signal from a base station via a plurality of time resources, the at least one synchronization signal being different from a synchronization signal block transmitted by the base station, and means for communicating with the base station to manage a connection with the base station based at least in part on the received one or more instances of the synchronization signal. The UE 2700 may further include means for transmitting a signal requesting whether to activate or deactivate the one or more instances of the synchronization, means for transmitting, to the base station, one or more parameters for the configuration, means for receiving the configuration via at least one of a downlink message or an implicit indication associated with another signal configured for the UE, wherein the configuration is pre-configured for the UE and the base station or is generated by the base station, and means for repeating the reception of the one or more instances of the at least one synchronization signal in a subsequent slot, wherein the repeating the reception based on a the time repetition value for the at least one synchronization signal value. The UE 2700 may further include means for transmitting a report to the base station, where the report may include one or more measurements of the aperiodic transmission of the one or more instances of the at least one synchronization signal. In one aspect, the aforementioned means may be the processor (s) 2704 shown in FIG. 27 configured to perform the functions recited by the aforementioned means. In another aspect, the aforementioned means may be a circuit or any apparatus configured to perform the functions recited by the aforementioned means.

Figure 30:
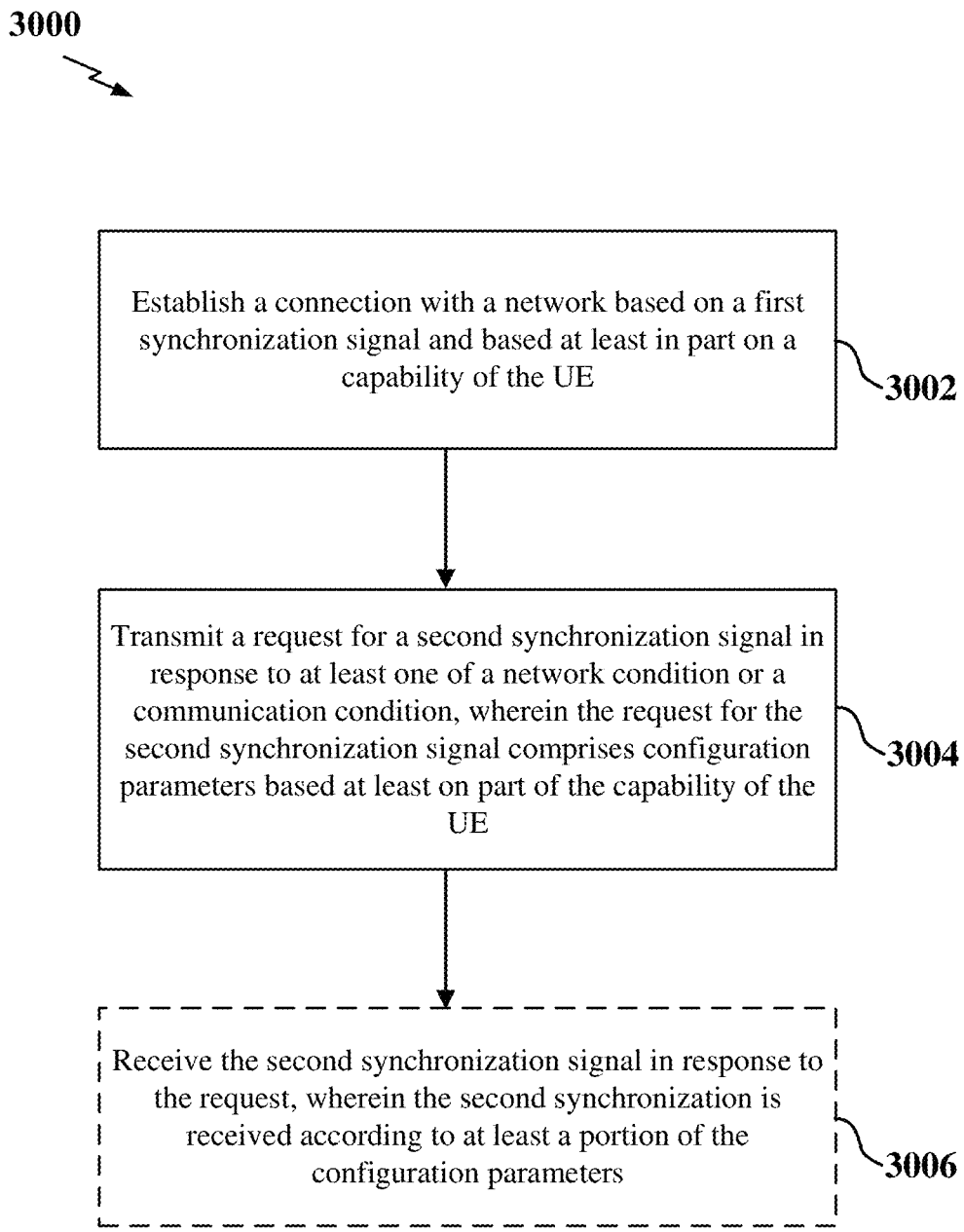
FIG. 30 is a flow chart of a method of communicating lean SSB at a UE in accordance with aspects of the present disclosure.

FIG. 30 is a flow chart 3000 of a method of communicating lean SSB at a UE according to some aspects. As described below, some or all illustrated features may be omitted in a particular implementation within the scope of the present disclosure, and some illustrated features may not be required for implementation of all embodiments. In some examples, the process 2900 may be carried out by the UE 2700 illustrated in FIG. 27. In some examples, the process 2900 may be carried out by any suitable apparatus or means for carrying out the functions or algorithm described below.

At block 3002, the UE (e.g., UE 106) may establish a connection with a network (e.g., base station 108) based on a first synchronization signal (e.g., lean SSB) and based at least in part on a capability of the UE (e.g., reduced-capability scheduled entity).

At block 3004, the UE may transmit a request for a second synchronization signal (e.g., lean SSB) in response to the determining of the at least one network condition and communication condition, wherein the request for the second synchronization signal comprises configuration parameters based at least on part of the capability of the UE.

In an aspect, the request for the second synchronization signal may include a request for a periodic synchronization signal. In an aspect, the request for the second synchronization signal may include a request for an aperiodic synchronization signal. In an aspect, the request for the second synchronization signal may include a request for a generic synchronization signal. In an aspect, the request for the second synchronization signal may include quality-of-service requirement data for the UE.

In an aspect, transmitting the request for a second synchronization signal (e.g., at block 3004) may include transmitting the request via an uplink transmission. In an aspect, the uplink transmission may include one of a PUSCH, a PUCCH or a PRACH.

In an aspect, the configuration parameters may include one or more of a number and index of specific downlink beams, a number of synchronization symbols per beam, periodicity parameters of the second synchronization signal, a time-density of the second synchronization signal, a time-repetition of the synchronization signal, specific symbols in which to transmit the synchronization signal, one or more bandwidth parts in which to receive the second synchronization signal, a time and/or frequency synchronization target, and an estimate of optimized beam direction and/or beam efficiency. In an aspect, the configuration parameters may include a codebook. In an aspect, the configuration parameters may include a set of uplink signals. In an aspect, the configuration parameters may include one of a frequency synchronization threshold or time synchronization threshold of the UE. In an aspect, the configuration parameters may include one of a beam failure detection threshold or a beam failure recovery threshold of the UE. In an aspect, the configuration parameters may include a channel quality threshold of the UE.

At 3006, in an aspect, the UE may receive the second synchronization signal in response to the request, wherein the second synchronization signal may be received according to at least a portion of the configuration parameters. In an aspect, the second synchronization signal may be received according to network-configured data in addition to the at least a portion of the configuration parameters.

In one configuration, the UE 2700 for wireless communication includes means for means for establishing a connection with a network based on a first synchronization signal and based at least in part on a capability of the UE, and means for transmitting a request for a second synchronization signal in response to at least one of a network condition or a communication condition, wherein the request for the second synchronization signal comprises configuration parameters based at least on part of the capability of the UE. In an aspect, the UE 2700 may include means for receiving the second synchronization signal in response to the request, wherein the second synchronization signal is received according to at least a portion of the configuration parameters. In one aspect, the aforementioned means may be the processor(s) 2704 shown in FIG. 27 configured to perform the functions recited by the aforementioned means. In another aspect, the aforementioned means may be a circuit or any apparatus configured to perform the functions recited by the aforementioned means.

Of course, in the above examples, the circuitry included in the processor 2704 is merely provided as an example, and other means for carrying out the described functions may be included within various aspects of the present disclosure, including but not limited to the instructions stored in the computer-readable storage medium 2706, or any other suitable apparatus or means described in any one of the FIGS. 1-3, 5, 7, 11-14, and 20-22, and utilizing, for example, the processes and/or algorithms described herein in relation to FIGS. 28-30.

The following provides an overview of several aspects of the present disclosure.

Aspect 1: A method for wireless communication by a base station, comprising: allocating a plurality of time resources for aperiodic transmission of one or more instances of at least one synchronization signal different from a synchronization signal block transmitted by the base station; and transmitting the aperiodic transmission of the one or more instances of the at least one synchronization signal to at least one user equipment (UE) using the plurality of time resources.

Aspect 2: The method of aspect 1, further comprising: establishing a connection with the at least one UE based at least in part on the synchronization signal block from the base station.

Aspect 3: The method of aspect 1 or 2, wherein a number of the plurality of time resources corresponds to a number of slots for transmitting the at least one synchronization signal.

Aspect 4: The method of any of aspects 1 through 3, further comprising: determining a configuration for a transmission pattern for the at least one synchronization signal, wherein the plurality of time resources are allocated based on the configuration.

Aspect 5: The method of aspect 4, further comprising: receiving, from the at least one UE, one or more parameters for the configuration, wherein the configuration is determined based on the one or more parameters.

Aspect 6: The method of aspect 5, wherein the one or more parameters include one or more conditions associated with the at least one UE.

Aspect 7: The method of aspect 4, further comprising: providing the configuration to the at least one UE via at least one of a downlink message or an implicit indication associated with another signal configured for the at least one UE, wherein the configuration is pre-configured for the at least one UE and the base station or is generated by the base station.

Aspect 8: The method of aspect 7, wherein the downlink message includes one or more parameters of the configuration to replace corresponding one or more pre-configured parameters of the configuration.

Aspect 9: The method of any of aspects 4 through 8, wherein the one or more instances of the at least one synchronization signal are transmitted using a subset of the plurality of time resources indicated in the configuration.

Aspect 10: The method of any of aspects 4 through 9, wherein the configuration indicates that the at least one synchronization signal includes a plurality of synchronization signals, each synchronization signal of the plurality of synchronization signals corresponding to a respective transmit beam of a plurality of transmit beams associated with the base station, and wherein transmitting the one or more instances of the at least one synchronization signal comprises: transmitting one or more instances of each synchronization signal of the plurality of synchronization signals.

Aspect 11: The method of aspect 10, wherein the configuration includes a timing offset between a transmission of one or more instances of a synchronization signal of the plurality of synchronization signal that is associated with a transmit beam of the plurality of transmit beams and a subsequent transmission of one or more instances of another synchronization signal of the plurality of synchronization signal that is associated with another transmit beam of the plurality of transmit beams.

Aspect 12: The method of aspect 10 or 11, wherein the configuration includes a number of consecutive time resources for a plurality of instances of each synchronization signal of the plurality of synchronization signals, and wherein the transmitting the one or more instances of the at least one synchronization signal comprises: transmitting consecutively the plurality of instances of each synchronization signal of the plurality of synchronization signals based on the number of consecutive time resources.

Aspect 13: The method of any of aspects 10 through 12, wherein the configuration includes a number of consecutive time resources for a plurality of instances of each synchronization signal of the plurality of synchronization signals, and wherein the transmitting the one or more instances of the at least one synchronization signal comprises: transmitting consecutively the plurality of instances of each synchronization signal of the plurality of synchronization signals based on the number of consecutive time resources.

Aspect 14: The method of any of aspects 10 through 13, further comprising: receiving conditions of reception of a plurality of instances of each synchronization signal of the plurality of synchronization signals in response to transmitting the plurality of instances of each synchronization signal of the plurality of synchronization signals; selecting a transmit beam among the plurality of transmit beams based on the conditions; and utilizing the selected transmit beam for communication with the UE.

Aspect 15: The method of aspect 4, wherein the configuration includes a time density for the at least one synchronization signal, and wherein a number of instances per slot for each synchronization signal of the at least one synchronization signal is based on the time density.

Aspect 16: The method of aspect 15, wherein the transmitting the one or more instances of the at least one synchronization signal further comprises: transmitting a plurality of instances of each synchronization signal of the at least one synchronization signal with a respective time density offset between two successive transmissions of the plurality of instances of each synchronization signal of the at least one synchronization signal within a slot, wherein each synchronization signal of the at least one synchronization signal is associated with a respective beam of at least one transmit beam associated with the base station.

Aspect 17: The method of aspect 16, wherein the at least one transmit beam includes a plurality of transmit beams and the at least one synchronization signal includes a plurality of synchronization signals respectively associated with a plurality of beams that are respectively associated with a plurality of time density offsets.

Aspect 18: The method of aspect 4, wherein the configuration includes a time repetition value for the at least one synchronization signal, and wherein the method further comprises repeating the aperiodic transmission of the one or more instances of the at least one synchronization signal in a subsequent slot at least once, wherein the repeating the transmission is initiated at a time based on the time repetition value.

Aspect 19: The method of aspect 18, wherein the time repetition value is based on at least one of a number of slots or a number of symbols.

Aspect 20: The method of any of aspects 1 through 19, wherein the at least one synchronization signal is located within a first bandwidth part, the first bandwidth part being different from a second bandwidth part for the synchronization signal block.

Aspect 21: The method of any of aspects 1 through 20, wherein a bandwidth part associated with each of the at least one synchronization signal specifies a corresponding UE or a corresponding group of UEs.

Aspect 22: The method of any of aspects 1 through 21, further comprising: generating a signal indicating whether to activate or deactivate the one or more instances of the at least one synchronization signal to the at least one UE; activating transmission of the one or more instances of the at least one synchronization signal if the signal indicates to activate the one or more instances of the at least one synchronization signal; and deactivating the transmission of the one or more instances of the at least one synchronization signal if the signal indicates to deactivate the one or more instances of the at least one synchronization signal.

Aspect 23: The method of aspect 22, wherein the signal comprises at least one of a radio resource control (RRC) signal, a medium access control (MAC) control element (CE), downlink control information (DCI) or a paging message to the UE.

Aspect 24: The method of aspect 22 or 23, wherein the signal activates or deactivates the transmission of the one or more instances of the at least one synchronization signal for at least one of the at least one UE, or a group of UEs that include the at least one UE, or for one or more bandwidth parts, or for a cell with which the base station is associated, or a combination thereof.

Aspect 25: The method of any of aspects 1 through 24, further comprising: receiving a signal requesting whether to activate or deactivate the one or more instances of the at least one synchronization signal; determining whether to activate or deactivate the one or more instances of the synchronization based on the signal; activating transmission of the one or more instances of the at least one synchronization signal if the base station determines to activate the one or more instances of the at least one synchronization signal; and deactivating the transmission of the one or more instances of the at least one synchronization signal if the base station determines to deactivate the one or more instances of the at least one synchronization signal.

Aspect 26: The method of aspect 25, wherein the signal includes a configuration for transmitting the one or more instances of the at least one synchronization signal when the signal indicates to activate the one or more instances of the at least one synchronization signal.

Aspect 27: The method of any of aspects 1 through 26, wherein each of the at least one synchronization signal occupies a respective symbol in the time resources.

Aspect 28: The method of any of aspects 1 through 27, further comprising: receiving a report from the at least one UE, where the report includes one or more measurements of the aperiodic transmission of the one or more instances of the at least one synchronization signal.

Aspect 29: A base station comprising: a transceiver configured to communicate with a radio access network, a memory, and a processor communicatively coupled to the transceiver and the memory, wherein the processor and the memory are configured to perform any one of aspects 1 through 28.

Aspect 30: A base station configured for wireless communication comprising at least one means for performing any one of aspects 1 through 28.

Aspect 31: A non-transitory processor-readable storage medium having instructions for a base station thereon, wherein the instructions, when executed by a processing circuit, cause the processing circuit to perform any one of aspects 1 through 28.

Aspect 32: A method for wireless communication by a user equipment (UE), comprising: receiving aperiodic transmission of one or more instances of at least one synchronization signal from a base station via a plurality of time resources, the at least one synchronization signal being different from a synchronization signal block transmitted by the base station; and communicate with the base station to manage a connection with the base station based at least in part on the received one or more instances of the synchronization signal.

Aspect 33: The method of aspect 32, further comprising: establishing the connection with the base station based at least in part on the synchronization signal block from the base station.

Aspect 34: The method of aspect 32 or 33, wherein a number of the plurality of time resources corresponds to a number of slots for receiving the at least one synchronization signal.

Aspect 35: The method of any of aspects 32 through 34, wherein the plurality of time resources are allocated based on a configuration for a transmission pattern for the at least one synchronization signal to be transmitted by the base station.

Aspect 36: The method of aspect 35, further comprising: transmitting, to the base station, one or more parameters for the configuration, wherein the configuration is determined based on the one or more parameters.

Aspect 37: The method of aspect 36, wherein the one or more parameters include one or more conditions associated with the UE.

Aspect 38: The method of aspect 35, further comprising: receiving the configuration via at least one of a downlink message or an implicit indication associated with another signal configured for the UE, wherein the configuration is pre-configured for the UE and the base station or is generated by the base station, wherein the established connection is managed further based on the configuration.

Aspect 39: The method of aspect 38, wherein the downlink message includes one or more parameters of the configuration to replace corresponding one or more pre-configured parameters of the configuration.

Aspect 40: The method of any of aspects 35 through 39, wherein the one or more instances of the at least one synchronization signal are received using a subset of the plurality of time resources indicated in the configuration.

Aspect 41: The method of any of aspects 35 through 40, wherein the configuration indicates that the at least one synchronization signal includes a plurality of synchronization signals, each synchronization signal of the plurality of synchronization signals corresponding to a respective transmit beam of a plurality of transmit beams associated with the base station, and wherein the receiving the one or more instances of the at least one synchronization signal comprises: receiving one or more instances of each synchronization signal of the plurality of synchronization signals.

Aspect 42: The method of aspect 41, wherein the configuration includes a timing offset that between a transmission of one or more instances of a synchronization signal of the plurality of synchronization signal that is associated with a transmit beam of the plurality of transmit beams and a subsequent transmission of one or more instances of another synchronization signal of the plurality of synchronization signal that is associated with another transmit beam of the plurality of transmit beams.

Aspect 43: The method of aspect 41 or 42, wherein the configuration includes a number of consecutive time resources for a plurality of instances of each synchronization signal of the plurality of synchronization signals, and wherein the receiving the one or more instances of the at least one synchronization signal comprises: receiving consecutively the plurality of instances of each synchronization signal of the plurality of synchronization signals based on the number of consecutive time resources.

Aspect 44: The method of any of aspects 41 through 43, wherein the managing the established connection comprises: determining reception conditions of a plurality of reception beams associated with the UE based on reception of a plurality of instances of each synchronization signal of the plurality of synchronization signals; and selecting a reception beam for communication from the plurality of reception beams based on the reception conditions.

Aspect 45: The method of any of aspects 41 through 44, wherein the managing the established connection comprises: determining conditions of reception of a plurality of instances of each synchronization signal of the plurality of synchronization signals; and transmitting the conditions to the base station to cause the base station to select a transmit beam among the plurality of transmit beams based on the conditions.

Aspect 46: The method of any of aspects 32 through 45, the managing the established connection comprises: performing frequency tracking based on the reception of the one or more instances of the at least one synchronization signal.

Aspect 47: The method of aspect 35, wherein the configuration includes a time density and the one or more instances of the at least one synchronization signal is received based on a time density for the at least one synchronization signal, and wherein a number of instances for each synchronization signal of the at least one synchronization signal per slot is based on the time density.

Aspect 48: The method of aspect 47, wherein the receiving the one or more instances of the at least one synchronization signal comprises: receiving a plurality of instances of each synchronization signal of the at least one synchronization signal with a time density offset between two successive transmissions of the plurality of instances of each synchronization signal of the at least one synchronization signal within a slot, wherein each synchronization signal of the at least one synchronization signal is associated with a respective beam of at least one transmit beam associated with the base station.

Aspect 49: The method of aspect 48, wherein the at least one transmit beam includes a plurality of transmit beams and the at least one synchronization signal includes a plurality of synchronization signals respectively associated with a plurality of beams that are respectively associated with a plurality of time density offsets.

Aspect 50: The method of aspect 35, wherein the configuration includes a time repetition value for the at least one synchronization signal, and wherein the method further comprises: repeating the reception of the one or more instances of the at least one synchronization signal in a subsequent slot at least once, wherein the repeating the reception based on the time repetition value for the at least one synchronization signal value.

Aspect 51: The method of aspect 50, wherein the time repetition value is based on at least one of a number of slots or a number of symbols.

Aspect 52: The method of any of aspects 32 through 51, wherein the at least one synchronization signal is located within a first bandwidth part, the first bandwidth part being different from a second bandwidth part for the synchronization signal block.

Aspect 53: The method of any of aspects 32 through 52, wherein a bandwidth part associated with each of the at least one synchronization signal specifies a corresponding UE or a corresponding group of UEs.

Aspect 54: The method of any of aspects 32 through 53, further comprising: transmitting a signal requesting whether to activate or deactivate the one or more instances of the synchronization.

Aspect 55: The method of aspect 54, wherein the signal includes a configuration for transmitting the one or more instances of the at least one synchronization signal by the base station when the signal indicates to activate the one or more instances of the at least one synchronization signal.

Aspect 56: The method of any of aspects 32 through 55, wherein each of the at least one synchronization signal occupies a respective symbol in the time resources.

Aspect 57: The method of any of aspects 32 through 56, further comprising: transmitting a report to the base station, where the report includes one or more measurements of the aperiodic transmission of the one or more instances of the at least one synchronization signal.

Aspect 58: A user equipment (UE) comprising: a transceiver configured to communicate with a radio access network, a memory, and a processor communicatively coupled to the transceiver and the memory, wherein the processor and the memory are configured to perform any one of aspects 32 through 57.

Aspect 59: A UE configured for wireless communication comprising at least one means for performing any one of aspects 32 through 57.

Aspect 60: A non-transitory processor-readable storage medium having instructions for a UE thereon, wherein the instructions, when executed by a processing circuit, cause the processing circuit to perform any one of aspects 32 through 57.

Aspect 61: A method of wireless communication at a user equipment (UE), the method comprising: establishing a connection with a network based on a first synchronization signal based at least in part on a capability of the UE; and transmitting a request for a second synchronization signal in response to at least one of a network condition or a communication condition, wherein the request for the second synchronization signal comprises configuration parameters based at least on part of the capability of the UE.

Aspect 62: The method of aspect 61, wherein the request for the second synchronization signal comprises at least one of: a request for a periodic synchronization signal, a request for an aperiodic synchronization signal, a request for a generic synchronization signal, or quality-of-service requirement data for the UE.

Aspect 63: The method of aspect 61 or 62, wherein transmitting the request for a second synchronization signal comprises transmitting the request via an uplink transmission.

Aspect 64: The method of aspect 63, wherein the uplink transmission comprises one of a physical uplink shared channel (PUSCH), physical uplink control channel (PUCCH) or physical random-access channel (PRACH).

Aspect 65: The method of any one of aspects 61 through 64, wherein the configuration parameters comprise at least one of: one or more of a number and index of specific downlink beams, a number of synchronization symbols per beam, periodicity parameters of the second synchronization signal, a time-density of the second synchronization signal, a time-repetition of the synchronization signal, specific symbols in which to transmit the synchronization signal, one or more bandwidth parts in which to receive the second synchronization signal, a time and/or frequency synchronization target, and an estimate of optimized beam direction and/or beam efficiency, a code book, a set of uplink signals, one of a frequency synchronization threshold or time synchronization threshold of the UE, one of a beam failure detection threshold or a beam failure recovery threshold of the UE, or a channel quality threshold of the UE.

Aspect 66: The method of any one of aspects 61 through 65, further comprising receiving the second synchronization signal in response to the request, wherein the second synchronization signal may be received according to at least a portion of the configuration parameters.

Aspect 67: The method of aspect 66, wherein the second synchronization signal may be received according to network-configured data in addition to the at least a portion of the configuration parameters.

Aspect 68: A user equipment (UE) comprising: a transceiver configured to communicate with a radio access network, a memory, and a processor communicatively coupled to the transceiver and the memory, wherein the processor and the memory are configured to perform any one of aspects 61 through 67.

Aspect 69: A UE configured for wireless communication comprising at least one means for performing any one of aspects 61 through 67.

Aspect 70: A non-transitory processor-readable storage medium having instructions for a UE thereon, wherein the instructions, when executed by a processing circuit, cause the processing circuit to perform any one of aspects 61 through 67.

Aspect 71: A method of wireless communication at a base station, the method comprising: establishing a connection with a user equipment (UE) based on a first synchronization signal based at least in part on a capability of the UE; receiving a request from the UE for a second synchronization signal based on at least one of a network condition and a communication condition, wherein the request for the second synchronization signal comprises configuration parameters based at least on part of the capability of the UE; and transmitting the second synchronization signal to the UE.

Aspect 72: The method of aspect 71, wherein the request for the second synchronization signal comprises at least one of: a request for a periodic synchronization signal, a request for an aperiodic synchronization signal, a request for a generic synchronization signal, or quality-of-service requirement data for the UE.

Aspect 73: The method of aspect 71 or 72, wherein receiving the request for a second synchronization signal comprises receiving the request via an uplink transmission.

Aspect 74: The method of aspect 73, wherein the uplink transmission comprises one of a physical uplink shared channel (PUSCH), physical uplink control channel (PUCCH) or physical random-access channel (PRACH).

Aspect 75: The method of any one of aspects 71 through 74, wherein the configuration parameters comprise at least one of: one or more of a number and index of specific downlink beams, a number of synchronization symbols per beam, periodicity parameters of the second synchronization signal, a time-density of the second synchronization signal, a time-repetition of the synchronization signal, specific symbols in which to transmit the synchronization signal, one or more bandwidth parts in which to receive the second synchronization signal, a time and/or frequency synchronization target, and an estimate of optimized beam direction and/or beam efficiency, a codebook, a set of uplink signals, one of a frequency synchronization threshold or time synchronization threshold of the UE, one of a beam failure detection threshold or a beam failure recovery threshold of the UE, or a channel quality threshold of the UE.

Aspect 76: The method of any one of aspects 71 through 75, further comprising: processing the configuration parameters included in the request and UE data history associated with the UE, wherein transmitting the second synchronization signal comprises transmitting the second synchronization signal to the UE based on at least one of the processing of the configuration parameters and UE data history.

Aspect 77: The method of any one of aspects 71 through 75, further comprising processing the received configuration parameters included in the request and UE data history associated with the UE, wherein transmitting the second synchronization signal comprises transmitting the second synchronization signal to the UE based on base station configuration parameters independent of the received configuration parameters.

Aspect 78: The method of any one of aspects 71 through 77, further comprising either: allocating one or more resources for transmitting the second synchronization signal based at least in part on the request for the second synchronization signal, or allocating one or more resources for transmitting the second synchronization signal without considering the request for the second synchronization signal.

Aspect 79: A user equipment (UE) comprising: a transceiver configured to communicate with a radio access network, a memory, and a processor communicatively coupled to the transceiver and the memory, wherein the processor and the memory are configured to perform any one of aspects 71 through 78.

Aspect 80: A UE configured for wireless communication comprising at least one means for performing any one of aspects 71 through 78.

Aspect 81: A non-transitory processor-readable storage medium having instructions for a UE thereon, wherein the instructions, when executed by a processing circuit, cause the processing circuit to perform any one of aspects 71 through 78.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 5, 7, 11-14, and 20-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A base station for wireless communication, comprising:
at least one processor;
a transceiver communicatively coupled to the at least one processor; and
a memory communicatively coupled to the at least one processor,
wherein the at least one processor is configured to:
allocate a plurality of time resources for aperiodic transmission of one or more instances of at least one synchronization signal different from a synchronization signal block transmitted by the base station, each of the at least one synchronization signal spanning over a respective single orthogonal frequency division multiplexed (OFDM) symbol; and
transmit the aperiodic transmission of the one or more instances of the at least one synchronization signal to at least one user equipment (UE) using the plurality of time resources, wherein each of the at least one synchronization signal is unrelated to another synchronization signal and is transmitted regardless of whether any other synchronization signal is transmitted.

2. The base station of claim 1, wherein the at least one processor is further configured to:
determine a configuration for a transmission pattern for the at least one synchronization signal,
wherein the plurality of time resources are allocated based on the configuration.

3. The base station of claim 2, wherein the configuration indicates that the at least one synchronization signal includes a plurality of synchronization signals, each synchronization signal of the plurality of synchronization signals corresponding to a respective transmit beam of a plurality of transmit beams associated with the base station, and wherein the at least one processor configured to transmit the one or more instances of the at least one synchronization signal is configured to:

transmit one or more instances of each synchronization signal of the plurality of synchronization signals.

4. The base station of claim 3, wherein the configuration includes a timing offset between a transmission of one or more instances of a synchronization signal of the plurality of synchronization signal that is associated with a transmit beam of the plurality of transmit beams and a subsequent transmission of one or more instances of another synchronization signal of the plurality of synchronization signal that is associated with another transmit beam of the plurality of transmit beams.

5. The base station of claim 3, wherein the configuration includes a number of consecutive time resources for a plurality of instances of each synchronization signal of the plurality of synchronization signals, and wherein the at least one processor configured to transmit the one or more instances of the at least one synchronization signal is configured to:

transmit consecutively the plurality of instances of each synchronization signal of the plurality of synchronization signals based on the number of consecutive time resources.

6. The base station of claim 3, wherein the at least one processor is further configured to:

receive conditions of reception of a plurality of instances of each synchronization signal of the plurality of synchronization signals in response to transmitting the plurality of instances of each synchronization signal of the plurality of synchronization signals;

select a transmit beam among the plurality of transmit beams based on the conditions; and utilize the selected transmit beam for communication with the UE.

7. The base station of claim 2, wherein the configuration includes a time density for the at least one synchronization signal, and wherein a number of instances per slot for each synchronization signal of the at least one synchronization signal is based on the time density.

8. The base station of claim 7, wherein the at least one processor configured to transmit the one or more instances of the at least one synchronization signal is configured to:

transmit a plurality of instances of each synchronization signal of the at least one synchronization signal with a respective time density offset between two successive transmissions of the plurality of instances of each synchronization signal of the at least one synchronization signal within a slot, wherein each synchronization signal of the at least one synchronization signal is associated with a respective beam of at least one transmit beam associated with the base station.

9. The base station of claim 8, wherein the at least one transmit beam includes a plurality of transmit beams and the at least one synchronization signal includes a plurality of synchronization signals respectively associated with a plurality of beams that are respectively associated with a plurality of time density offsets.

10. The base station of claim 2, wherein the configuration includes a time repetition value for the at least one synchronization signal, and wherein the at least one processor is further configured to:

repeat the aperiodic transmission of the one or more instances of the at least one synchronization signal in a subsequent slot at least once, wherein the repeating the transmission is initiated at a time based on the time repetition value.

11. The base station of claim 1, wherein the at least one processor is further configured to:

receive a signal requesting whether to activate or deactivate the one or more instances of the at least one synchronization signal;

determine whether to activate or deactivate the one or more instances of the synchronization based on the signal;

activate transmission of the one or more instances of the at least one synchronization signal if the base station determines to activate the one or more instances of the at least one synchronization signal; and deactivate the transmission of the one or more instances of the at least one synchronization signal if the base station determines to deactivate the one or more instances of the at least one synchronization signal.

12. A user equipment (UE) for wireless communication, comprising:

at least one processor;

a transceiver communicatively coupled to the at least one processor; and a memory communicatively coupled to the at least one processor, wherein the at least one processor is configured to:

receive aperiodic transmission of one or more instances of at least one synchronization signal from a base station via a plurality of time resources, the at least one synchronization signal being different from a synchronization signal block transmitted by the base station, each of the at least one synchronization signal spanning over a respective single orthogonal frequency division multiplexed (OFDM) symbol, each of the at least one synchronization signal is unrelated to another synchronization signal and is received regardless of whether any other synchronization signal is received; and communicate with the base station to manage a connection with the base station based at least in part on the received one or more instances of the synchronization signal.

13. The UE of claim 12, wherein the plurality of time resources are allocated based on a configuration for a transmission pattern for the at least one synchronization signal to be transmitted by the base station.

14. The UE of claim 13, wherein the configuration indicates that the at least one synchronization signal includes a plurality of synchronization signals, each synchronization signal of the plurality of synchronization signals corresponding to a respective transmit beam of a plurality of transmit beams associated with the base station, and wherein the at least one processor configured to receive the one or more instances of the at least one synchronization signal is configured to:

receive one or more instances of each synchronization signal of the plurality of synchronization signals.

15. The UE of claim 14, wherein the configuration includes a timing offset that between a transmission of one or more instances of a synchronization signal of the plurality of synchronization signal that is associated with a transmit beam of the plurality of transmit beams and a subsequent transmission of one or more instances of another synchronization signal of the plurality of synchronization signal that is associated with another transmit beam of the plurality of transmit beams.

16. The UE of claim 14, wherein the configuration includes a number of consecutive time resources for a plurality of instances of each synchronization signal of the plurality of synchronization signals, and
wherein the at least one processor configured to receive the one or more instances of the at least one synchronization signal is configured to:
receive consecutively the plurality of instances of each synchronization signal of the plurality of synchronization signals based on the number of consecutive time resources.

17. The UE of claim 14, wherein the at least one processor configured to manage the established connection is configured to:
determine reception conditions of a plurality of reception beams associated with the UE based on reception of a plurality of instances of each synchronization signal of the plurality of synchronization signals; and
select a reception beam for communication from the plurality of reception beams based on the reception conditions.

18. The UE of claim 14, wherein the at least one processor configured to manage the established connection is configured to:
determine conditions of reception of a plurality of instances of each synchronization signal of the plurality of synchronization signals; and
transmit the conditions to the base station to cause the base station to select a transmit beam among the plurality of transmit beams based on the conditions.

19. The UE of claim 13, wherein the configuration includes a time density and the one or more instances of the at least one synchronization signal is received based on a time density for the at least one synchronization signal, and
wherein a number of instances for each synchronization signal of the at least one synchronization signal per slot is based on the time density.

20. The UE of claim 18, wherein the at least one processor configured to receive the one or more instances of the at least one synchronization signal is configured to:
receive a plurality of instances of each synchronization signal of the at least one synchronization signal with a time density offset between two successive transmissions of the plurality of instances of each synchronization signal of the at least one synchronization signal within a slot, wherein each synchronization signal of the at least one synchronization signal is associated with a respective beam of at least one transmit beam associated with the base station.

21. The UE of claim 13, wherein the configuration includes a time repetition value for the at least one synchronization signal, and
wherein the at least one processor is further configured to:
repeat the reception of the one or more instances of the at least one synchronization signal in a subsequent slot at least once, wherein the repeating the reception based on the time repetition value for the at least one synchronization signal value.

22. A user equipment (UE), comprising:
a transceiver;
a memory; and
a processor communicatively coupled to the transceiver and the memory, wherein the processor and the memory are configured to:
establish a connection with a network based on a first synchronization signal and based at least in part on a capability of the UE; and
transmit a request for a second synchronization signal in response to at least one of a network condition or a communication condition, wherein the request for the second synchronization signal comprises configuration parameters based at least on part of the capability of the UE.

23. The UE of claim 22, wherein the request for the second synchronization signal comprises at least one of:
a request for a periodic synchronization signal,
a request for an aperiodic synchronization signal,
a request for a generic synchronization signal, or
quality-of-service requirement data for the UE.

24. The UE of claim 22, wherein the configuration parameters comprise at least one of:
one or more of a number and index of specific downlink beams, a number of synchronization symbols per beam, periodicity parameters of the second synchronization signal, a time-density of the second synchronization signal, a time-repetition of the synchronization signal, specific symbols in which to transmit the synchronization signal, one or more bandwidth parts in which to receive the second synchronization signal, a time and/or frequency synchronization target, and an estimate of optimized beam direction and/or beam efficiency,
a code book,
a set of uplink signals,
one of a frequency synchronization threshold or time synchronization threshold of the UE,
one of a beam failure detection threshold or a beam failure recovery threshold of the UE, or
a channel quality threshold of the UE.

25. The UE of claim 22, wherein the processor and the memory are configured to receive the second synchronization signal in response to the request, wherein the second synchronization signal is received according to at least a portion of the configuration parameters.

26. A base station, comprising:
a transceiver;
a memory; and
a processor communicatively coupled to the transceiver and the memory, wherein the processor and the memory are configured to:
establish a connection with a UE based on a first synchronization signal and based at least in part on a capability of the UE;
receive a request from the UE for a second synchronization signal based on at least one of a network condition or a communication condition, wherein the request for the second synchronization signal comprises configuration parameters based at least on part of the capability of the UE; and
transmit the second synchronization signal to the UE.

27. The base station of claim 26, wherein the request for the second synchronization signal comprises at least one of:
a request for a periodic synchronization signal,
a request for an aperiodic synchronization signal,
a request for a generic synchronization signal, or
quality-of-service requirement data for the UE.

28. The base station of claim 26, wherein the configuration parameters comprise at least one of:
one or more of a number and index of specific downlink beams, a number of synchronization symbols per beam, periodicity parameters of the second synchronization signal, a time-density of the second synchronization signal, a time-repetition of the synchronization signal, specific symbols in which to transmit the synchronization signal, one or more bandwidth parts in which to receive the second synchronization signal, a time and/or frequency synchronization target, and an estimate of optimized beam direction and/or beam efficiency, a codebook, a set of uplink signals, one of a frequency synchronization threshold or time synchronization threshold of the UE, one of a beam failure detection threshold or a beam failure recovery threshold of the UE, or a channel quality threshold of the UE.

29. The base station of claim 26, wherein the processor and the memory are configured to:
    process the configuration parameters included in the request and UE data history associated with the UE,
    wherein the processor and the memory configured to transmit the second synchronization signal are configured to transmit the second synchronization signal to the UE based on at least one of the processing of the received configuration parameters and UE data history.

30. The base station of claim 26, wherein the processor and the memory are configured to:
    process the configuration parameters included in the request and UE data history associated with the UE,
    wherein the processor and the memory configured to transmit the second synchronization signal are configured to transmit the second synchronization signal to the UE based on base station configuration parameters independent of the received configuration parameters.

* * * * *